United States Patent
Higashi

(10) Patent No.: US 10,301,484 B2
(45) Date of Patent: May 28, 2019

(54) VARNISH FOR FORMATION OF CHARGE-TRANSPORTING THIN FILM

(71) Applicant: NISSAN CHEMICAL INDUSTRIES, LTD., Tokyo (JP)

(72) Inventor: Masayuki Higashi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/544,804

(22) PCT Filed: Jan. 19, 2016

(86) PCT No.: PCT/JP2016/051340
§ 371 (c)(1),
(2) Date: Jul. 19, 2017

(87) PCT Pub. No.: WO2016/117521
PCT Pub. Date: Jul. 28, 2016

(65) Prior Publication Data
US 2018/0002539 A1 Jan. 4, 2018

(30) Foreign Application Priority Data

Jan. 20, 2015 (JP) .................. 2015-008827
May 12, 2015 (JP) .................. 2015-097267
Jun. 29, 2015 (JP) .................. 2015-129769

(51) Int. Cl.
| | |
|---|---|
| H01B 1/00 | (2006.01) |
| C09D 5/24 | (2006.01) |
| C09D 7/40 | (2018.01) |
| H01B 1/12 | (2006.01) |
| C09K 11/06 | (2006.01) |
| C09D 179/02 | (2006.01) |
| C09D 181/00 | (2006.01) |
| C09D 201/00 | (2006.01) |
| C08K 5/3435 | (2006.01) |
| C08K 5/42 | (2006.01) |
| C08L 65/00 | (2006.01) |
| C08L 79/00 | (2006.01) |
| H01L 51/50 | (2006.01) |
| H05B 33/10 | (2006.01) |

(52) U.S. Cl.
CPC .............. *C09D 5/24* (2013.01); *C08K 5/3435* (2013.01); *C08K 5/42* (2013.01); *C08L 65/00* (2013.01); *C08L 79/00* (2013.01); *C09D 7/40* (2018.01); *C09D 179/02* (2013.01); *C09D 181/00* (2013.01); *C09D 201/00* (2013.01); *C09K 11/06* (2013.01); *H01B 1/121* (2013.01); *H01L 51/50* (2013.01); *H05B 33/10* (2013.01)

(58) Field of Classification Search
CPC ....... H01B 1/121; H01L 51/50; C08K 5/3435; C08K 5/42; C08L 65/00; C08L 79/00; C09D 5/24
See application file for complete search history.

(56) References Cited

U.S. PATENT DOCUMENTS

| | | | |
|---|---|---|---|
| 9,543,521 B2 * | 1/2017 | Kaihovirta | .......... C08K 5/005 |
| 2001/0024738 A1 | 9/2001 | Hawker et al. | |
| 2008/0029742 A1 | 2/2008 | Yoshimoto et al. | |
| 2011/0215303 A1 * | 9/2011 | Yamada | ............ G03G 15/00 257/40 |
| 2012/0187387 A1 * | 7/2012 | Sekiguchi | .......... H01L 51/5032 257/40 |

FOREIGN PATENT DOCUMENTS

| | | |
|---|---|---|
| EP | 3 121 163 A1 | 1/2017 |
| JP | 2002-151272 A | 5/2002 |

(Continued)

OTHER PUBLICATIONS

Endo et al "Synthesis and polymerization of 4-(glycidyloxy)-2,2,6,6-tetramethylpiperidine-1-oxyl", Macromolecules 1993, 26, 3227-3229. (Year: 1993).*
Bicer et al "Preparation and invenstigation of a novel organic polymer . . . ", International Journal of Electrochemistry, vol. 2013, Article ID 732749 (6 pages) (Year: 2013).*
International Search Report, issued in PCT/JP2016/051349 (PCT/ISA/210), dated Apr. 19, 2016.
Written Opinion of the International Searchin Authority, issued in PCT/JP2016/051340 (PCT/ISA/237), dated Apr. 19, 2016.
Chao et al., "Novel electroactive poly(arylene ether sulfone) copolymers containing pendant oligoaniline groups: Synthesis and properties," Journal of Polymer Science Part A: Polymer Chemistry, vol. 49, No. 7, 2011, pp. 1605-1614.

(Continued)

*Primary Examiner* — Mark Kopec
(74) *Attorney, Agent, or Firm* — Birch, Stewart, Kolasch & Birch, LLP

(57) ABSTRACT

Provided is a varnish for the formation of a charge-transporting thin film, said varnish including an organic solvent, a charge-transporting substance, and a 2,2,6,6-tetraalkylpiperidine-N-oxyl derivative represented by formula (T1)

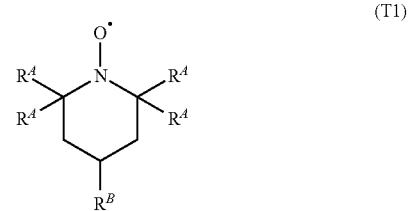

(T1)

(in the formula, each $R^A$ independently represents a C1-20 alkyl group, and $R^B$ represents a hydrogen atom, a hydroxy group, an amino group, a carboxyl group, a cyano group, an oxo group, an isocyanato group, a C1-20 alkoxy group, a C2-20 alkylcarbonyloxy group, a C7-20 arylcarbonyloxy group, a C2-20 alkylcarbonylamino group or a C7-20 arylcarbonylamino group).

16 Claims, No Drawings

(56) References Cited

FOREIGN PATENT DOCUMENTS

| | | |
|---|---|---|
| JP | 2006-128325 A | 5/2006 |
| JP | 2006-352000 A | 12/2006 |
| JP | 2008-297256 A | 12/2008 |
| JP | 2011-156065 A | 9/2011 |
| JP | 2015-140332 A | 8/2015 |
| JP | 2015-151356 A | 8/2015 |
| WO | WO 2006/025342 A1 | 3/2006 |
| WO | WO 2010/042344 A2 | 4/2010 |
| WO | WO 2011/013760 A1 | 2/2011 |
| WO | WO 2015-141585 A1 | 9/2015 |

OTHER PUBLICATIONS

Chinese Office Action and Search Report for Chinese Application No. 201680006464.0, dated Aug. 29, 2018, (No English language translation).

* cited by examiner

VARNISH FOR FORMATION OF CHARGE-TRANSPORTING THIN FILM

TECHNICAL FIELD

The present invention relates to a charge-transporting thin film-forming varnish.

BACKGROUND ART

Charge-transporting thin films made of organic compounds are used as light-emitting layers and charge-injecting layers in organic electroluminescent (EL) devices. Processes for forming such charge-transporting thin films are broadly divided into dry processes such as vapor deposition and wet processes such as spin coating. On comparing dry processes and wet processes, the latter are better able to efficiently produce thin films having a high flatness over a large area. Therefore, in the field of organic electroluminescence where thin films of larger surface area are desired, thin films are often formed by wet processes.

In light of this, the inventors have developed varnishes for the formation of charge-transporting thin films, which varnishes are intended for the production, by a wet process, of charge-transporting thin films applicable to various types of electronic devices (see, for example, Patent Document 1).

However, given recent trends in the field of organic electroluminescence toward lighter, thinner and more flexible devices, substrates made of organic compounds have come to be used in place of glass substrates. These developments have led to a desire for varnishes that can be baked at lower temperatures than conventional products and which, even in such cases, give thin films having a good charge transportability.

PRIOR ART DOCUMENTS

Patent Documents

Patent Document 1: JP-A 2002-151272

SUMMARY OF THE INVENTION

Problems to be Solved by the Invention

The present invention was arrived at in light of the above circumstances. One object of the invention is to provide a 2,2,6,6-tetraalkylpiperidine-N-oxyl derivative-containing charge transporting thin film-forming varnish which, even when baked at low temperature, has a high charge transportability and, when used as the hole-injecting layer in an organic EL device, is able to lower the driving voltage and enhance the brightness characteristics of the device while retaining the current efficiency of the device. Further objects of the invention are to provide a method that lowers the driving voltage, a method that increases the brightness and a method that increases the brightness life of organic EL devices in which such a charge-transporting thin-film-forming varnish is used.

Means for Solving the Problems

The inventors have conducted extensive investigations in order to attain the above objects. As a result, they have discovered that 2,2,6,6-tetraalkylpiperidine-N-oxyl derivatives have both an excellent solubility in organic solvents and an excellent ability to oxidize charge-transporting substances, and that by using a charge-transporting thin film obtained from a varnish prepared by dissolving such a derivative together with a charge-transporting in an organic solvent as the hole-injecting layer in an organic EL device, even when the varnish is baked at a low temperature, it is possible to lower the driving voltage and enhance the brightness characteristics of the device without a loss in the current efficiency of the device. These discoveries ultimately led to the present invention. In this invention, "to bake at a low temperature" means to bake at a temperature of not above 200° C.

Accordingly, the invention provides:

1. A charge-transporting thin film-forming varnish comprising a 2,2,6,6-tetraalkylpiperidine-N-oxyl derivative of formula (T1), a charge-transporting substance and an organic solvent

[Chemical Formula 1]

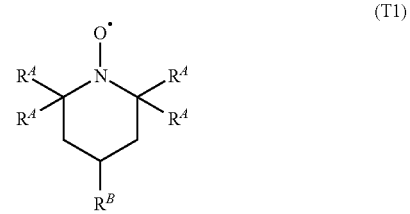

(T1)

(wherein each $R^A$ is independently an alkyl group of 1 to 20 carbon atoms; and $R^B$ is a hydrogen atom, a hydroxyl group, an amino group, a carboxyl group, a cyano group, an oxo group, an isocyanato group, an alkoxy group of 1 to 20 carbon atoms, an alkylcarbonyloxy group of 2 to 20 carbon atoms, an arylcarbonyloxy group of 7 to 20 carbon atoms, an alkylcarbonylamino group of 2 to 20 carbon atoms or an arylcarbonylamino group of 7 to 20 carbon atoms);

2. The charge-transporting thin film-forming varnish of 1 above, wherein the 2,2,6,6-tetraalkylpiperidine-N-oxyl derivative is 2,2,6,6-tetramethylpiperidine-N-oxyl;

3. The charge-transporting thin film-forming varnish of 1 or 2 above, wherein the charge-transporting substance comprises a charge-transporting compound having a molecular weight of from 200 to 9,500;

4. The charge-transporting thin film-forming varnish of any of 1 to 3 above, wherein the charge-transporting substance comprises at least one compound selected from the group consisting of arylamine derivatives and thiophene derivatives having a molecular weight of from 200 to 9,500;

5. The charge-transporting thin film-forming varnish of any of 1 to 4 above, further comprising a fluorine atom-containing oligoaniline derivative;

6. The charge-transporting thin film-forming varnish of 5 above, wherein the fluorine atom-containing oligoaniline derivative is a compound of formula (6)

[Chemical Formula 2]

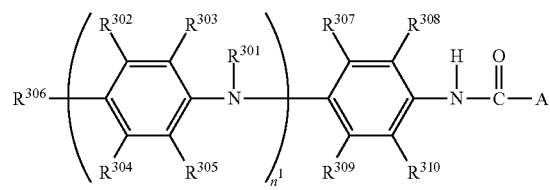

(6)

(wherein R³⁰¹ is a hydrogen atom, an alkyl group of 1 to 20 carbon atoms which may be substituted with Z wherein Z is a hydrogen atom, a nitro group, a cyano group, an aldehyde group, a hydroxyl group, a thiol group, a sulfonic acid group or a carboxyl group, an aryl group of 6 to 20 carbon atoms which may be substituted with Z' or a heteroaryl group of 2 to 20 carbon atoms which may be substituted with Z' wherein Z' is a halogen atom, a nitro group, a cyano group, an aldehyde group, a hydroxyl group, a thiol group, a sulfonic acid group or a carboxyl group;

R³⁰² to R³¹⁰ are each independently a hydrogen atom, a halogen atom, a nitro group, a cyano group, or an alkyl group of 1 to 20 carbon atoms, alkenyl group of 2 to 20 carbon atoms, alkynyl group of 2 to 20 carbon atoms, aryl group of 6 to 20 carbon atoms or heteroaryl group of 2 to 20 carbon atoms which may be substituted with a halogen atom;

A is a fluoroalkyl group of 1 to 20 carbon atoms, fluorocycloalkyl group of 3 to 20 carbon atoms, fluorobicycloalkyl group of 4 to 20 carbon atoms, fluoroalkenyl group of 2 to 20 carbon atoms or fluoroalkynyl group of 2 to 20 carbon atoms which may be substituted with a cyano group, a chlorine atom, a bromine atom, an iodine atom, a nitro group or a fluoroalkoxy group of 1 to 20 carbon atoms, a fluoroaryl group of 6 to 20 carbon atoms which may be substituted with a cyano group, a chlorine atom, a bromine atom, an iodine atom, a nitro group, an alkyl group of 1 to 20 carbon atoms, a fluoroalkyl group of 1 to 20 carbon atoms or a fluoroalkoxy group of 1 to 20 carbon atoms, an aryl group of 6 to 20 carbon atoms which is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms and may be substituted with a cyano group, a halogen atom or a fluoroalkoxy group of 1 to 20 carbon atoms, a fluoroaralkyl group of 7 to 20 carbon atoms which may be substituted with a cyano group, a chlorine atom, a bromine atom, an iodine atom, a nitro group, a fluoroalkoxy group of 1 to 20 carbon atoms, a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms, or an aralkyl group of 7 to 20 carbon atoms which is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms and may be substituted with a cyano group, a halogen atom or a fluoroalkoxy group of 1 to 20 carbon atoms; and n' is an integer from 1 to 20);

7. The charge-transporting thin film-forming varnish of any of 1 to 6 above, further comprising a dopant;

8. The charge-transporting thin film-forming varnish of 7 above, wherein the dopant comprises an arylsulfonic acid;

9. A charge-transporting thin film produced using the charge-transporting thin film-forming varnish of any of 1 to 8 above;

10. An organic EL device comprising the charge-transporting thin film of 9 above;

11. A method for producing a charge-transporting thin film, characterized by using the charge-transporting thin film-forming varnish of any of 1 to 8 above;

12. A method for manufacturing an organic EL device, characterized by using the charge-transporting thin film-forming varnish of any of 1 to 8 above;

13. A method for reducing the driving voltage of an organic EL device having a charge-transporting thin film produced using a charge-transporting thin film-forming varnish, which method is characterized by using the charge-transporting thin film-forming varnish of any of 1 to 8 above as said charge-transporting thin film-forming varnish;

14. A method for increasing the brightness of an organic EL device having a charge-transporting thin film produced using a charge-transporting thin film-forming varnish, which method is characterized by using the charge-transporting thin film-forming varnish of any of 1 to 8 above as said charge-transporting thin film-forming varnish; and 15. A method for increasing the brightness longevity of an organic EL device having a charge-transporting thin film produced using a charge-transporting thin film-forming varnish, which method is characterized by using the charge-transporting thin film-forming varnish of any of 1 to 8 above as said charge-transporting thin film-forming varnish.

Advantageous Effects of the Invention

By using the charge-transporting thin film-forming varnish of the invention, compared with varnishes that do not contain a 2,2,6,6-tetraalkylpiperidine-N-oxyl derivative of formula (T1) and varnishes that contain other organic oxidizing agents, even when the varnish is baked at a low temperature, a charge-transporting thin film that exhibits a high charge transportability can be obtained. Moreover, when this thin film is used as a hole-injecting layer, the driving voltage of the organic EL device can be lowered and the brightness characteristics can be increased.

Thin films obtained from the charge-transporting thin film-forming varnish of the invention are also expected to be used as antistatic films and as hole-collecting layers in organic thin-film solar cells.

EMBODIMENT FOR CARRYING OUT THE INVENTION

The charge-transporting thin-film-forming varnish of the present invention includes a 2,2,6,6-tetraalkylpiperidine-N-oxyl derivative of formula (T1).

[Chemical Formula 3]

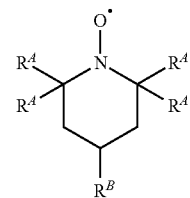

(T1)

In formula (T1), each $R^A$ is independently an alkyl group of 1 to 20 carbon atoms; and $R^B$ is a hydrogen atom, a hydroxyl group, an amino group, a carboxyl group, a cyano group an oxo group, an isocyanato group, an alkoxy group of 1 to 20 carbon atoms, an alkylcarbonyloxy group of 2 to 20 carbon atoms, an arylcarbonyloxy group of 7 to 20 carbon atoms, an alkylcarbonylamino group of 2 to 20 carbon atoms, or an arylcarbonylamino group of 7 to 20 carbon atoms.

In this formula, each $R^A$ is independently an alkyl group of 1 to 20 carbon atoms. The alkyl group of 1 to 20 carbon atoms may be linear, branched or cyclic. Illustrative examples include linear or branched alkyl groups of 1 to 20 carbon atoms, such as methyl, ethyl, n-propyl, isopropyl, n-butyl, isobutyl, s-butyl, t-butyl, n-pentyl, n-hexyl, n-heptyl, n-octyl, n-nonyl and n-decyl groups; and cyclic alkyl groups of 3 to 20 carbon atoms, such as cyclopropyl, cyclobutyl, cyclopentyl, cyclohexyl, cycloheptyl, cyclooctyl, cyclononyl, cyclodecyl, bicyclobutyl, bicyclopentyl, bicyclohexyl, bicycloheptyl, bicyclooctyl, bicyclononyl and bicyclodecyl groups.

Of these, linear alkyl groups of 1 to 20 carbon atoms are preferred, methyl and ethyl groups are more preferred, and a methyl group is most preferred, as the alkyl group.

From the standpoint of the ease of synthesizing the derivative, it is preferable for all the $R^A$ groups to be the same.

$R^B$ is a hydrogen atom, a hydroxyl group, an amino group, a carboxyl group, a cyano group an oxo group, an isocyanato group, an alkoxy group of 1 to 20 carbon atoms, an alkylcarbonyloxy group of 2 to 20 carbon atoms, an arylcarbonyloxy group of 7 to 20 carbon atoms, an alkylcarbonylamino group of 2 to 20 carbon atoms, or an arylcarbonylamino group of 7 to 20 carbon atoms.

The alkyl moiety in the alkoxy group of 1 to 20 carbon atoms, the alkylcarbonyloxy group of 2 to 20 carbon atoms and the alkylcarbonylamino group of 2 to 20 carbon atoms is exemplified in the same way as the above-mentioned alkyl groups.

Examples of the aryl moiety in the arylcarbonyloxy group of 7 to 20 carbon atoms and the arylcarbonylamino group of 7 to 20 carbon atoms include phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl groups.

Of these, a hydrogen atom is preferred as $R^B$.

Illustrative examples of the 2,2,6,6-tetralkylpiperidine-N-oxyl derivative of formula (T1) include, but are not limited to, 2,2,6,6-tetramethylpiperidine-N-oxyl (abbreviated below as "TEMPO") and 2,2,6,6-tetraethylpiperidine-N-oxyl.

The 2,2,6,6-tetraalkylpiperidine-N-oxyl derivative used in this invention may be a commercial product or may be one synthesized by a known method (such as the methods described in, for example, WO 2014/7144, JP-A H07-278107, JP-A H06-100538, JP-A 2003-55347, and J. Am. Chem. Soc. 2006, 128(26), pp. 8412-8413 and the supporting information therefor).

The 2,2,6,6-tetraalkylpiperidine-N-oxyl derivative content in the varnish of the invention is from about 1 wt % to about 10 wt %, and preferably from about 3 wt % to about 8 wt %, based on the charge-transporting substance (when a dopant is included, based on the charge-transporting substance and the dopant).

The charge-transporting substance included in the charge-transporting thin film-forming varnish of the invention may be one that is used in, for example, the organic EL field. This is exemplified by various types of charge-transporting compounds, including arylamine derivatives such as oligoaniline derivatives, N,N'-diarylbenzidine derivatives and N,N,N',N'-tetraarylbenzidine derivatives; thiophene derivatives such as oligothiophene derivatives, thienothiophene derivatives and thienobenzothiophene derivatives; and pyrrole derivatives such as oligopyrroles. Of these, arylamine derivatives and thiophene derivatives are preferred, and arylamine derivatives are more preferred, because they dissolve well in organic solvents.

The charge-transporting compound has a molecular weight which, from the standpoint of preparing a uniform varnish that provides thin films having a high flatness, is generally from about 200 to about 9,500. However, to obtain thin films having a better charge transportability, the molecular weight is preferably at least 300, and more preferably at least 400; to prepare a uniform varnish that more reproducibly gives thin films having a high flatness, the molecular weight is preferably not more than 8,000, more preferably not more than 7,000, even more preferably not more than 6,000, and still more preferably not more than 5,000. To prevent the charge-transporting substance from separating out when the varnish has been formed into a thin film, the charge-transporting compound preferably does not have a molecular weight distribution (dispersity=1); that is, it preferably has a single molecular weight.

The arylamine derivative is exemplified by compounds of formula (1).

[Chemical Formula 4]

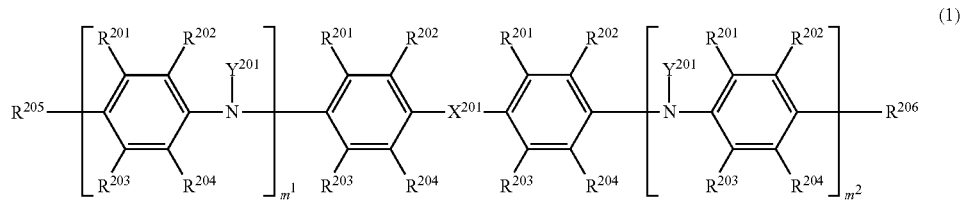

(1)

In formula (1), $X^{201}$ represents —$NY^{201}$—, —O—, —S—, —$(CR^{207}R^{208})_L$— or a single bond; when $m^1$ or $m^2$ is 0, $X^{201}$ represents —$NY^{201}$—.

Each $Y^{201}$ is independently a hydrogen atom, an alkyl group of 1 to 20 carbon atoms, alkenyl group of 2 to 20 carbon atoms or alkynyl group of 2 to 20 carbon atoms which may be substituted with $Z^{201}$, or an aryl group of 6 to 20 carbon atoms or heteroaryl group of 2 to 20 carbon atoms which may be substituted with $Z^{202}$.

The alkyl group of 1 to 20 carbon atoms is exemplified in the same way as described above.

Illustrative examples of alkenyl groups of 2 to 20 carbon atoms include ethenyl, n-1-propenyl, n-2-propenyl, 1-methylethenyl, n-1-butenyl, n-2-butenyl, n-3-butenyl, 2-methyl-1-propenyl, 2-methyl-2-propenyl, 1-ethylethenyl, 1-methyl-1-propenyl, 1-methyl-2-propenyl, n-1-pentenyl, n-1-decenyl and n-1-eicosenyl groups.

Illustrative examples of alkynyl groups of 2 to 20 carbon atoms include ethynyl, n-1-propynyl, n-2-propynyl, n-1-butynyl, n-2-butynyl, n-3-butynyl, 1-methyl-2-propynyl, n-1-pentynyl, n-2-pentynyl, n-3-pentynyl, n-4-pentynyl, 1-methyl-n-butynyl, 2-methyl-n-butynyl, 3-methyl-n-butynyl, 1,1-dimethyl-n-propynyl, n-1-hexynyl, n-1-decynyl, n-1-pentadecynyl and n-1-eicosynyl groups.

Illustrative examples of aryl groups of 6 to 20 carbon atoms include phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl groups.

Illustrative examples of heteroaryl groups of 2 to 20 carbon atoms include 2-thienyl, 3-thienyl, 2-furanyl, 3-furanyl, 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 2-imidazolyl, 4-imidazolyl, 2-pyridyl, 3-pyridyl and 4-pyridyl groups.

$R^{207}$ and $R^{208}$ are each independently a hydrogen atom, a halogen atom, a nitro group, a cyano group, an amino group, an aldehyde group, a hydroxyl group, a thiol group, a sulfonic acid group, a carboxyl group, an alkyl group of 1 to 20 carbon atoms, alkenyl group of 2 to 20 carbon atoms or alkynyl group of 2 to 20 carbon atoms which may be substituted with $Z^{201}$, an aryl group of 6 to 20 carbon atoms or heteroaryl group of 2 to 20 carbon atoms which may be substituted with $Z^{202}$, or a —$NHY^{202}$, —$NY^{203}Y^{204}$, —$C(O)Y^{205}$, —$OY^{206}$, —$SY^{207}$, —$SO_3Y^{208}$, —$C(O)OY^{209}$, —$OC(O)Y^{210}$, —$C(O)NHY^{211}$ or —$C(O)N^{212}Y^{213}$ group.

$Y^{202}$ to $Y^{213}$ are each independently an alkyl group of 1 to 20 carbon atoms, alkenyl group of 2 to 20 carbon atoms or alkynyl group of 2 to 20 carbon atoms which may be substituted with $Z^{201}$, or an aryl group of 6 to 20 carbon atoms or heteroaryl group of 2 to 20 carbon atoms which may be substituted with $Z^{202}$.

$Z^{201}$ is a halogen atom, a nitro group, a cyano group, an amino group, an aldehyde group, a hydroxyl group, a thiol group, a sulfonic acid group, a carboxyl group, or an aryl group of 6 to 20 carbon atoms or heteroaryl group of 2 to 20 carbon atoms which may be substituted with $Z^{203}$.

$Z^{202}$ is a halogen atom, a nitro group, a cyano group, an amino group, an aldehyde group, a hydroxyl group, a thiol group, a sulfonic acid group, a carboxyl group, or an alkyl group of 1 to 20 carbon atoms, alkenyl group of 2 to 20 carbon atoms or alkynyl group of 2 to 20 carbon atoms which may be substituted with $Z^{203}$.

$Z^{203}$ is a halogen atom, a nitro group, a cyano group, an amino group, an aldehyde group, a hydroxyl group, a thiol group, a sulfonic acid group or a carboxyl group.

Examples of halogen atoms include fluorine, chlorine, bromine and iodine atoms.

The alkyl groups, alkenyl groups, alkynyl groups, aryl groups and heteroaryl groups of $R^{207}$ and $R^{208}$ and $Y^{202}$ to $Y^{213}$ are exemplified in the same way as described above.

Of these, $R^{207}$ and $R^{208}$ are preferably hydrogen atoms or alkyl groups of 1 to 20 carbon atoms which may be substituted with $Z^{201}$, more preferably hydrogen atoms or methyl groups which may be substituted with $Z^{201}$, and most preferably both hydrogen atoms.

L, which represents the number of the divalent groups —($CR^{207}R^{208}$)—, is an integer from 1 to 20, preferably from 1 to 10, more preferably from 1 to 5, even more preferably 1 or 2, and most preferably 1. When L is 2 or more, the plurality of $R^{207}$ groups may be mutually the same or different, and the plurality of $R^{208}$ groups may be mutually the same or different.

In particular, $X^{201}$ is preferably —$NY^{201}$— or a single bond, with $Y^{201}$ being preferably a hydrogen atom or an alkyl group of 1 to 20 carbon atoms which may be substituted with $Z^{201}$, more preferably a hydrogen atom or a methyl group which may be substituted with $Z^{201}$, and most preferably a hydrogen atom.

$R^{201}$ to $R^{206}$ are each independently a hydrogen atom, a halogen atom, a nitro group, a cyano group, an amino group, an aldehyde group, a hydroxyl group, a thiol group, a sulfonic acid group, a carboxyl group, an alkyl group of 1 to 20 carbon atoms, alkenyl group of 2 to 20 carbon atoms or alkynyl group of 2 to 20 carbon atoms which may be substituted with $Z^{201}$, an aryl group of 6 to 20 carbon atoms or heteroaryl group of 2 to 20 carbon atoms which may be substituted with $Z^{202}$, or —$NHY^{202}$, —$NY^{203}Y^{204}$, —$C(O)Y^{205}$, —$OY^{206}$, —$SY^{207}$, —$SO_3Y^{208}$, —$C(O)OY^{209}$, —$OC(O)Y^{210}$, —$C(O)NHY^{211}$ or —$C(O)NY^{212}Y^{213}$ (wherein $Y^{202}$ to $Y^{213}$ are as defined above). These halogen atoms, alkyl groups, alkenyl groups, alkynyl groups, aryl groups and heteroaryl groups are exemplified in the same way as described above.

In particular, in formula (1), $R^{201}$ to $R^{204}$ are each preferably a hydrogen atom, a halogen atom, an alkyl group of 1 to 10 carbon atoms which may be substituted with $Z^{201}$ or an aryl group of 6 to 14 carbon atoms which may be substituted with $Z^{202}$, more preferably a hydrogen atom, a fluorine atom, or an alkyl group of 1 to 10 carbon atoms which may be substituted with a fluorine atom, and most preferably all hydrogen atoms.

$R^{205}$ and $R^{206}$ are each preferably a hydrogen atom, a halogen atom, an alkyl group of 1 to 10 carbon atoms which may be substituted with $Z^{201}$, an aryl group of 6 to 14 carbon atoms which may be substituted with $Z^{202}$, or a diphenylamino group which may be substituted with $Z^{202}$ (the phenyl group —$NY^{203}Y^{204}$ in which $Y^{203}$ and $Y^{204}$ may be substituted with $Z^{202}$), more preferably a hydrogen atom, a fluorine atom or a diphenylamino group which may be substituted with a fluorine atom, and even more preferably both hydrogen atoms or both diphenylamino groups.

Of these, combinations in which $R^{201}$ to $R^{204}$ are each a hydrogen atom, a fluorine atom, an alkyl group of 1 to 10 carbon atoms which may be substituted with a fluorine atom, $R^{205}$ and $R^{206}$ are each a hydrogen atom, a fluorine atom, or a diphenylamino group which may be substituted with a fluorine atom, $X^{201}$ is —$NY^{201}$— or a single bond, and $Y^{201}$ is a hydrogen atom or a methyl group are preferred; and combinations in which $R^{201}$ to $R^{204}$ are each a hydrogen atom, $R^{205}$ and $R^{206}$ are both hydrogen atoms or both diphenylamino groups, and $X^{201}$ is —NH— or a single bond are more preferred.

In formula (1), $m^1$ and $m^2$ are each independently an integer of 0 or more and satisfy the condition $1 \leq m^1+m^2 \leq 20$. Taking into account the balance between the charge transportability of the resulting thin film and the solubility of the arylamine derivative, they preferably satisfy the condition $2 \leq m^1+m^2 \leq 8$, more preferably satisfy the condition $2 \leq m^1+m^2 \leq 6$, and even more preferably satisfy the condition $2 \leq m^1+m^2 \leq 4$.

In $Y^{201}$ to $Y^{213}$ and $R^{201}$ to $R^{208}$, $Z^{201}$ is preferably a halogen atom or an aryl group of 6 to 20 carbon atoms which may be substituted with $Z^{203}$, more preferably a halogen atom or a phenyl group which may be substituted with $Z^{203}$, and most preferably does not exist (i.e., is non-substituting).

$Z^{202}$ is preferably a halogen atom or an alkyl group of 1 to 20 carbon atoms which may be substituted with $Z^{203}$, more preferably a halogen atom or an alkyl group of 1 to 4 carbon atoms which may be substituted with $Z^{203}$, and most preferably does not exist (i.e., is non-substituting).

$Z^{203}$ is preferably a halogen atom, more preferably fluorine, and most preferably does not exist (i.e., is non-substituting).

In $Y^{201}$ to $Y^{213}$ and $R^{201}$ to $R^{208}$, the number of carbons on the alkyl, alkenyl and alkynyl groups is preferably 10 or less, more preferably 6 or less, and even more preferably 4 or less. The number of carbon atoms on the aryl and heteroaryl groups is preferably 14 or less, more preferably 10 or less, and even more preferably 6 or less.

The arylamine derivative of formula (1) has a molecular weight which, from the standpoint of ensuring solubility in an organic solvent, is preferably not more than 9,500, more preferably not more than 8,000, even more preferably not more than 7,000, still more preferably not more than 6,000, and yet more preferably not more than 5,000. From the standpoint of increasing the charge transportability, this molecular weight is preferably at least 300, and more preferably at least 400. From the standpoint of preventing the charge transporting substance from separating out when the varnish has been formed into a thin film, the arylamine derivative of formula (1) preferably does not have a molecular weight distribution (dispersity=1); that is, it preferably has a single molecular weight.

Examples of methods for synthesizing the arylamine derivative include, but are not particularly limited to, the methods described in *Bulletin of Chemical Society of Japan*, 67, pp. 1749-1752 (1994); *Synthetic Metals*, 84, pp. 119-120 (1997); *Thin Solid Films*, 520 (24), pp. 7157-7163 (2012), WO 2008/032617, WO 2008/032616, WO 2008/129947 and WO 2013/084664.

Illustrative examples of the arylamine derivative of formula (1) include, but are not limited to, those of the following formulas.

[Chemical Formula 5]

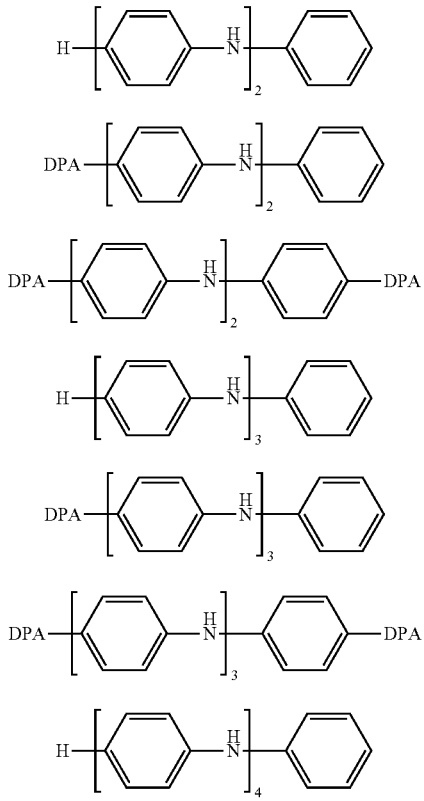

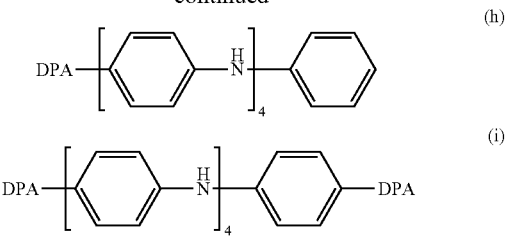

Here, DPA stands for a diphenylamino group.

[Chemical Formula 6]

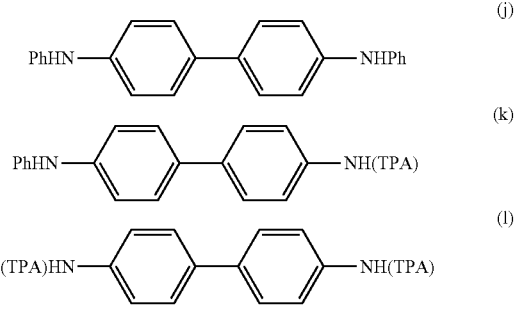

Here, Ph stands for a phenyl group and TPA stands for a p-(diphenylamino)phenyl group.

Other examples of arylamine derivatives include those of formula (2) or (3).

[Chemical Formula 7]

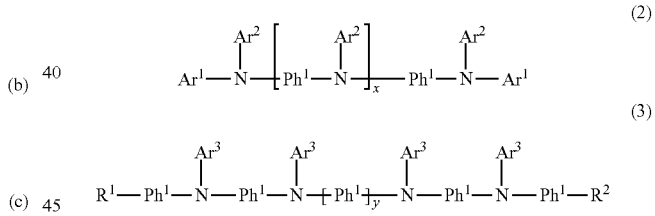

In formula (3), $R^1$ and $R^2$ are each independently a hydrogen atom, a halogen atom, a nitro group, a cyano group or an alkyl group of 1 to 20 carbon atoms, alkenyl group of 2 to 20 carbon atoms, alkynyl group of 2 to 20 carbon atoms, aryl group of 6 to 20 carbon atoms or heteroaryl group of 2 to 20 carbon atoms which may be substituted with a halogen atom.

Examples of halogen atoms include fluorine, chlorine, bromine and iodine atoms, although a fluorine atom is preferred.

The alkyl group of 1 to 20 carbon atoms, alkenyl group of 2 to 20 carbon atoms, alkynyl group of 2 to 20 carbon atoms and aryl group of 6 to 20 carbon atoms are exemplified in the same way as described above.

Illustrative examples of heteroaryl groups of 2 to 20 carbon atoms include oxygen-containing heteroaryl groups such as 2-furanyl, 3-furanyl, 2-oxazolyl, 4-oxazolyl, 5-oxazolyl, 3-isoxazolyl, 4-isoxazolyl and 5-isoxazolyl groups; sulfur-containing heteroaryl groups such as 2-thienyl, 3-thienyl, 2-thiazolyl, 4-thiazolyl, 5-thiazolyl, 3-isothiazolyl, 4-isothiazolyl and 5-isothiazolyl groups; and nitrogen-containing heteroaryl groups such as 2-imidazolyl, 4-imidazolyl, 2-pyridyl, 3-pyridyl, 4-pyridyl, 2-pyrazyl, 3-pyrazyl, 5-pyrazyl, 6-pyrazyl, 2-pyrimidyl, 4-pyrimidyl, 5-pyrimidyl, 6-pyrimidyl, 3-pyridazyl, 4-pyridazyl, 5-pyridazyl, 6-pyridazyl, 1,2,3-triazin-4-yl, 1,2,3-triazin-5-yl, 1,2,4-triazin-3-yl, 1,2,4-triazin-5-yl, 1,2,4-triazin-6-yl, 1,3,5-triazin-2-yl, 1,2,4,5-tetrazin-3-yl, 1,2,3,4-tetrazin-5-yl, 2-quinolinyl, 3-quinolinyl, 4-quinolinyl, 5-quinolinyl, 6-quinolinyl, 7-quinolinyl, 8-quinolinyl, 1-isoquinolinyl, 3-isoquinolinyl, 4-isoquinolinyl, 5-isoquinolinyl, 6-isoquinolinyl, 7-isoquinolinyl, 8-isoquinolinyl, 2-quinoxanyl, 5-quinoxanyl, 6-quinoxanyl, 2-quinazolinyl, 4-quinazolinyl, 5-quinazolinyl, 6-quinazolinyl, 7-quinazolinyl, 8-quinazolinyl, 3-cinnolinyl, 4-cinnolinyl, 5-cinnolinyl, 6-cinnolinyl, 7-cinnolinyl and 8-cinnolinyl groups.

Of these, $R^1$ and $R^2$ are each preferably a hydrogen atom, a fluorine atom, a cyano group, an alkyl group of 1 to 20 carbon atoms which may be substituted with a halogen atom, an aryl group of 6 to 20 carbon atoms which may be substituted with a halogen atom, or a heteroaryl group of 2 to 20 carbon atoms which may be substituted with a halogen atom; more preferably a hydrogen atom, a fluorine atom, a cyano group, an alkyl group of 1 to 10 carbon atoms which may be substituted with a halogen atom, or a phenyl group which may be substituted with a halogen atom; even more preferably a hydrogen atom, a fluorine atom, a methyl group or a trifluoromethyl group; and most preferably a hydrogen atom.

In formulas (2) and (3), $Ph^1$ represents a group of the formula (P1).

[Chemical Formula 8]

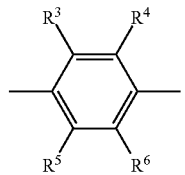

(P1)

Here, $R^3$ to $R^6$ are each independently a hydrogen atom, a halogen atom, a nitro group, a cyano group, or an alkyl group of 1 to 20 carbon atoms, alkenyl group of 2 to 20 carbon atoms, alkynyl group of 2 to 20 carbon atoms, aryl group of 6 to 20 carbon atoms or heteroaryl group of 2 to 20 carbon atoms which may be substituted with a halogen atom. These are exemplified in the same way as described above for $R^1$ and $R^2$.

In particular, $R^3$ to $R^6$ are each preferably a hydrogen atom, a fluorine atom, a cyano group, an alkyl group of 1 to 20 carbon atoms which may be substituted with a halogen atom, an aryl group of 6 to 20 carbon atoms which may be substituted with a halogen atom, or a heteroaryl group of 2 to 20 carbon atoms which may be substituted with a halogen atom; more preferably a hydrogen atom, a fluorine atom, a cyano group, an alkyl group of 1 to 10 carbon atoms which may be substituted with a halogen atom, or a phenyl group which may be substituted with a halogen atom; even more preferably a hydrogen atom, a fluorine atom, a methyl group or a trifluoromethyl group; and most preferably a hydrogen atom.

Groups which are suitable as $Ph^1$ include, but are not limited to, the following.

[Chemical Formula 9]

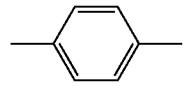

(P1-1)

In formula (2), each $Ar^1$ is independently a group represented by any of formulas (B1) to (B11), with a group represented by any of formulas (B1') to (B11') being especially preferred.

[Chemical Formula 10]

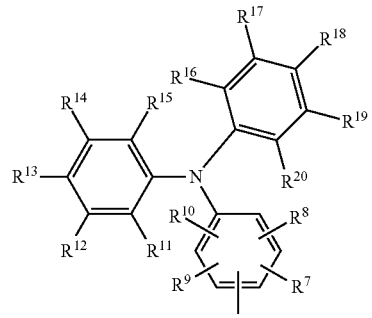

(B1)

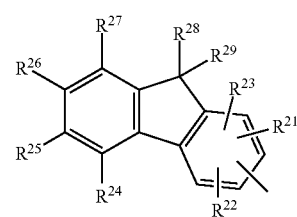

(B2)

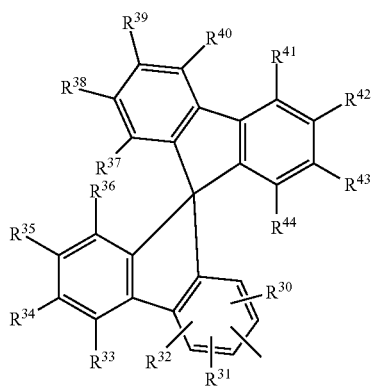

(B3)

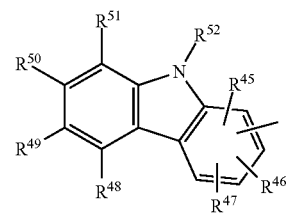

(B4)

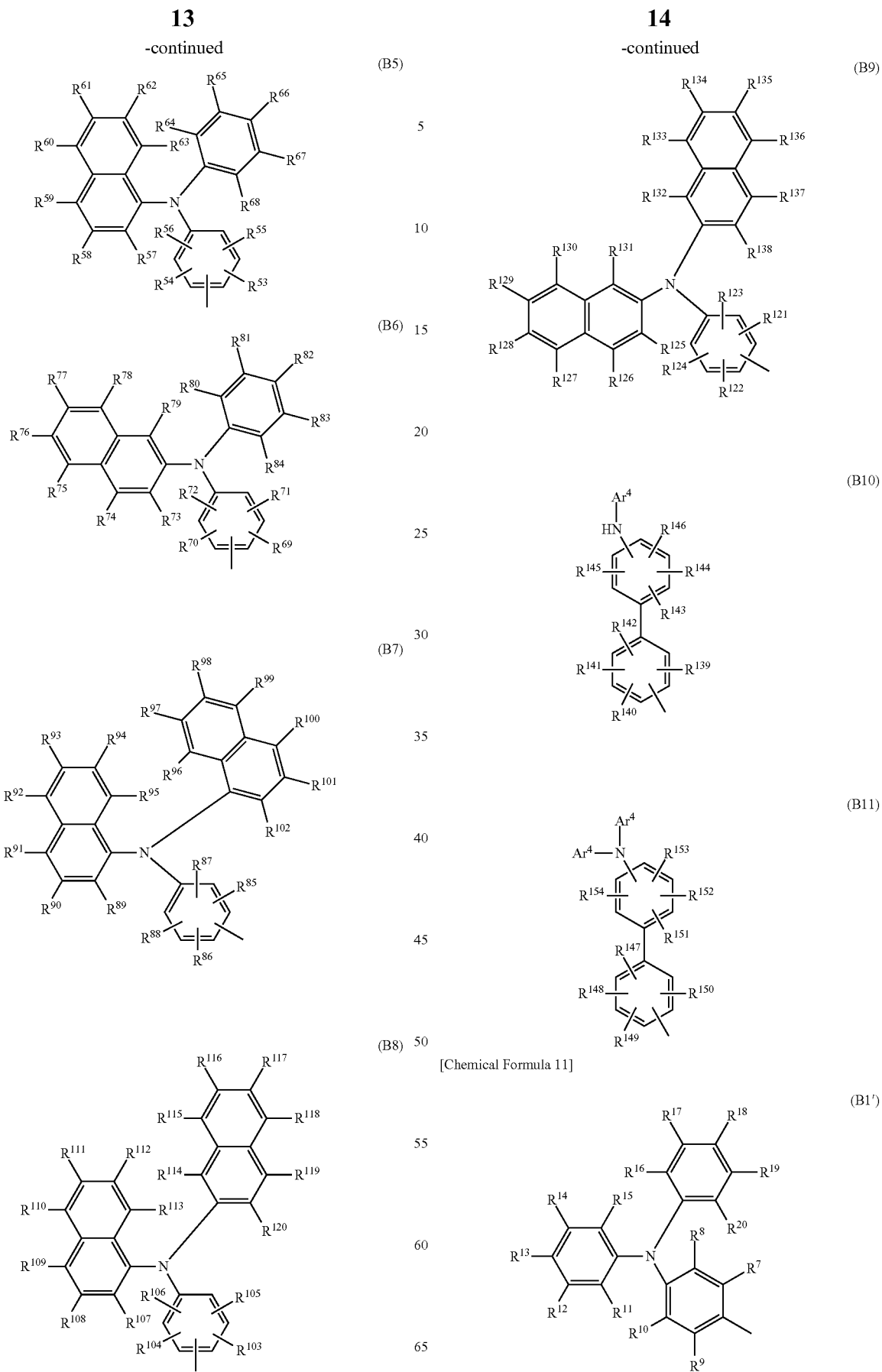

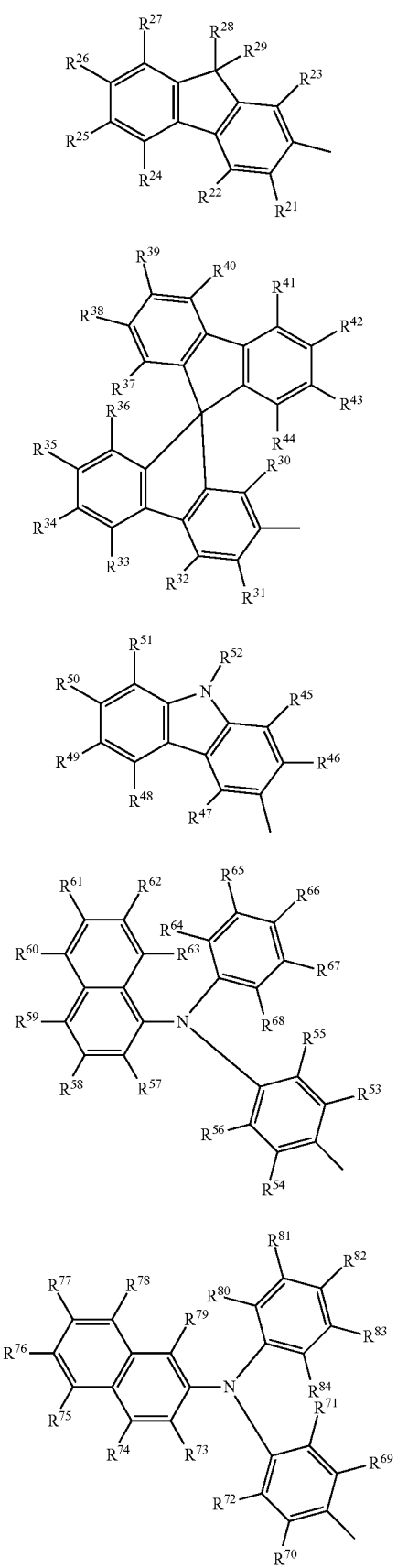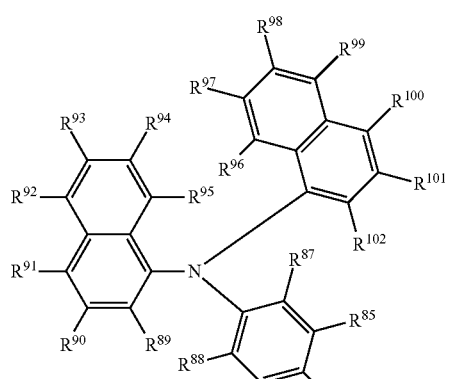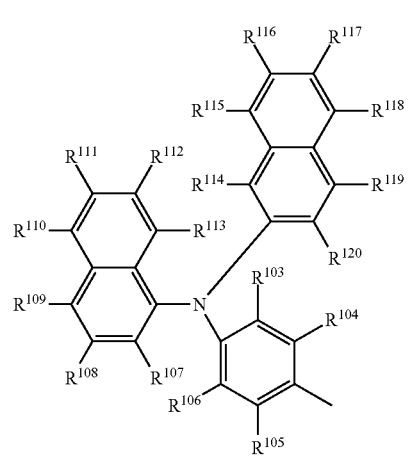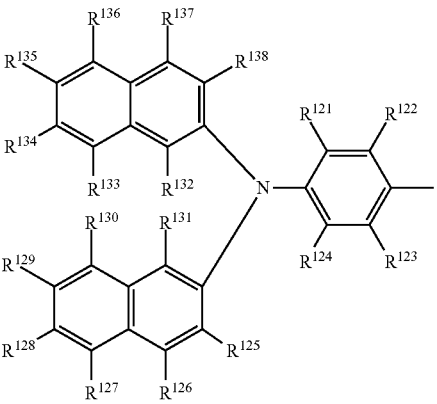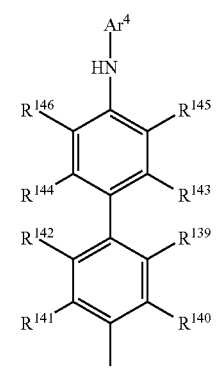

-continued

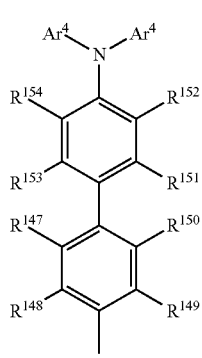

(B11')

In these formulas, $R^7$ to $R^{27}$, $R^{30}$ to $R^{51}$ and $R^{53}$ to $R^{154}$ are each independently a hydrogen atom, a halogen atom, a nitro group, a cyano group, or a diphenylamino group, alkyl group of 1 to 20 carbon atoms, alkenyl group of 2 to 20 carbon atoms, alkynyl group of 2 to 20 carbon atoms, aryl group of 6 to 20 carbon atoms or heteroaryl group of 2 to 20 carbon atoms which may be substituted with a halogen atom. $R^{28}$ and $R^{29}$ are each independently an aryl group of 6 to 20 carbon atoms or heteroaryl group of 2 to 20 carbon atoms which may be substituted with $Z^1$. $R^{52}$ is a hydrogen atom, an alkyl group of 1 to 20 carbon atoms, alkenyl group of 2 to 20 carbon atoms or alkynyl group of 2 to 20 carbon atoms which may be substituted with $Z^4$, or an aryl group of 6 to 20 carbons or heteroaryl group of 2 to 20 carbon atoms which may be substituted with $Z^1$.

$Z^1$ is a halogen atom, a nitro group, a cyano group, or an alkyl group of 1 to 20 carbon atoms, alkenyl group of 2 to 20 carbon atoms or alkynyl group of 2 to 20 carbon atoms which may be substituted with $Z^2$. $Z^2$ is a halogen atom, a nitro group, a cyano group, or an aryl group of 6 to 20 carbon atoms or heteroaryl group of 2 to 20 carbon atoms which may be substituted with $Z^3$. $Z^3$ is a halogen atom, a nitro group or a cyano group.

$Z^4$ is a halogen atom, a nitro group, a cyano group, or an aryl group of 6 to 20 carbon atoms or heteroaryl group of 2 to 20 carbon atoms which may be substituted with $Z^5$. $Z^5$ is a halogen atom, a nitro group, a cyano group, or an alkyl group of 1 to 20 carbon atoms, alkenyl group of 2 to 20 carbon atoms or alkynyl group of 2 to 20 carbon atoms which may be substituted with $Z^3$.

These halogen atoms, alkyl groups of 1 to 20 carbon atoms, alkenyl groups of 2 to 20 carbon atoms, alkynyl groups of 2 to 20 carbon atoms, aryl groups of 6 to 20 carbon atoms and heteroaryl groups of 2 to 20 carbon atoms are exemplified in the same way as described above for $R^1$ and $R^2$.

In particular, $R^7$ to $R^{27}$, $R^{30}$ to $R^{51}$ and $R^{53}$ to $R^{154}$ are each preferably a hydrogen atom, a fluorine atom, a cyano group, a diphenylamino group which may be substituted with a halogen atom, an alkyl group of 1 to 20 carbon atoms which may be substituted with a halogen atom, an aryl group of 6 to 20 carbon atoms which may be substituted with a halogen atom, or a heteroaryl group of 2 to 20 carbon atoms which may be substituted with a halogen atom; more preferably a hydrogen atom, a fluorine atom, a cyano group, an alkyl group of 1 to 10 carbon atoms which may be substituted with a halogen atom, or a phenyl group which may be substituted with a halogen atom; even more preferably a hydrogen atom, a fluorine atom, a methyl group or a trifluoromethyl group; and most preferably a hydrogen atom.

$R^{28}$ and $R^{29}$ are each preferably an aryl group of 6 to 14 carbon atoms which may be substituted with $Z^1$ or a heteroaryl group of 2 to 14 carbon atoms which may be substituted with $Z^1$; more preferably an aryl group of 6 to 14 carbon atoms which may be substituted with $Z^1$; and even more preferably a phenyl group which may be substituted with $Z^1$, a 1-naphthyl group which may be substituted with $Z^1$ or a 2-naphthyl group which may be substituted with $Z^1$.

$R^{52}$ is preferably a hydrogen atom, an aryl group of 6 to 20 carbon atoms which may be substituted with $Z^1$, a heteroaryl group of 2 to 20 carbon atoms which may be substituted with Z or an alkyl group of 1 to 20 carbon atoms which may be substituted with $Z^4$; more preferably a hydrogen atom, an aryl group of 6 to 14 carbon atoms which may be substituted with $Z^1$, a heteroaryl group of 2 to 14 carbon atoms which may be substituted with $Z^1$, or an alkyl group of 1 to 10 carbon atoms which may be substituted with $Z^4$; even more preferably a hydrogen atom, an aryl group of 6 to 14 carbon atoms which may be substituted with $Z^1$, a nitrogen-containing heteroaryl group of 2 to 14 carbons which may be substituted with $Z^1$, or an alkyl group of 1 to 10 carbon atoms which may be substituted with $Z^4$; and most preferably a hydrogen atom, a phenyl group which may be substituted with $Z^1$, a 1-naphthyl group which may be substituted with $Z^1$, a 2-naphthyl group which may be substituted with $Z^1$, a 2-pyridyl group which may be substituted with $Z^1$, a 3-pyridyl group which may be substituted with $Z^1$, a 4-pyridyl group which may be substituted with $Z^1$, or a methyl group which may be substituted with $Z^4$.

Each $Ar^4$ independently represents an aryl group of 6 to 20 carbon atoms which may be substituted with a diarylamino group wherein each aryl group is an aryl group of 6 to 20 carbon atoms. Specific examples of aryl groups of 6 to 20 carbon atoms include the same as those mentioned above for $R^1$ and $R^2$. Specific examples of the diarylamino groups include diphenylamino, 1-naphthylphenylamino, di(1-naphthyl)amino, 1-naphthyl-2-naphthylamino and di(2-naphthyl) amino groups.

$Ar^4$ is preferably a phenyl, 1-naphthyl, 2-naphthyl, 1-anthryl, 2-anthryl, 9-anthryl, 1-phenanthryl, 2-phenanthryl, 3-phenanthryl, 4-phenanthryl, 9-phenanthryl, p-(diphenylamino)phenyl, p-(1-naphthylphenylamino)phenyl, p-(di (1-naphthyl)amino)phenyl, p-(1-naphthyl-2-naphthylamino) phenyl or p-(di(2-naphthyl)amino)phenyl group; and more preferably a p-(diphenylamino)phenyl group.

Suitable examples of $Ar^1$ include, but are not limited to, those shown below. In the following formulas, DPA and $R^{52}$ are as defined above.

[Chemical Formula 12]

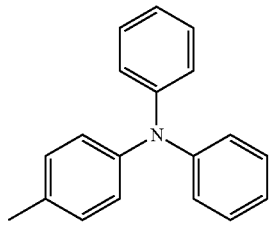

(B1-1)

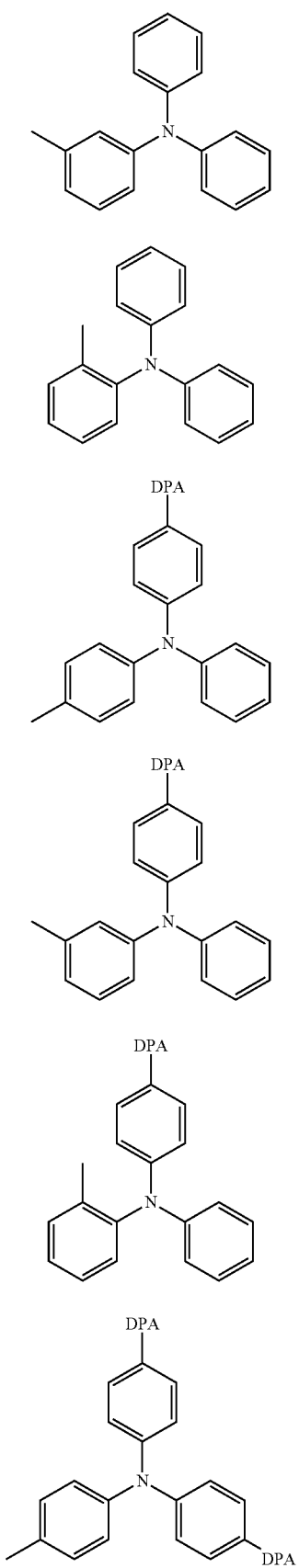
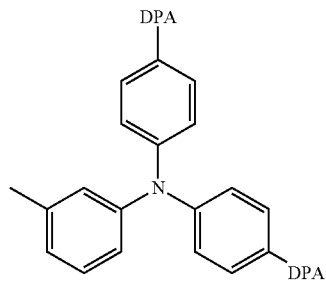
[Chemical Formula 13]

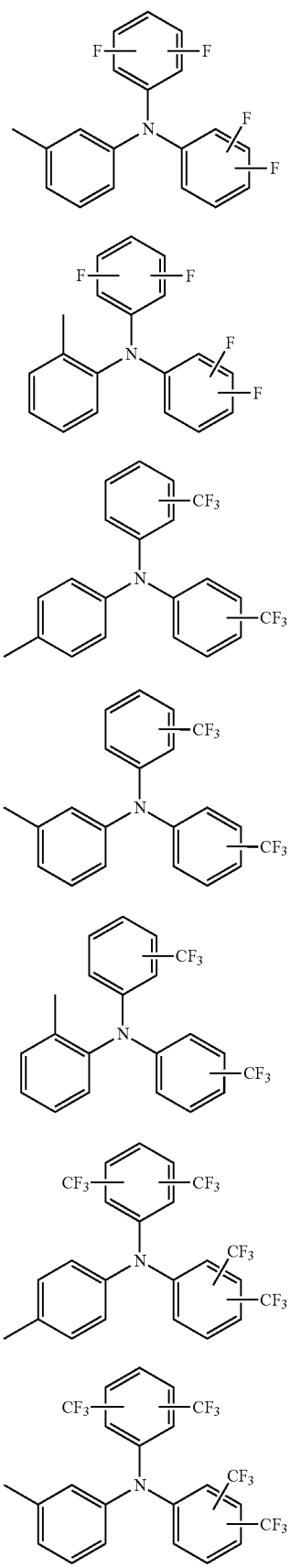
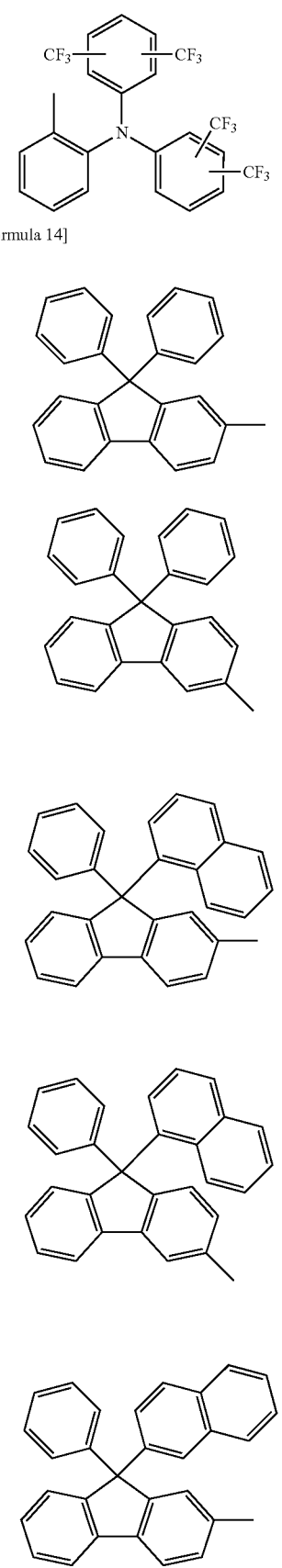
[Chemical Formula 14]

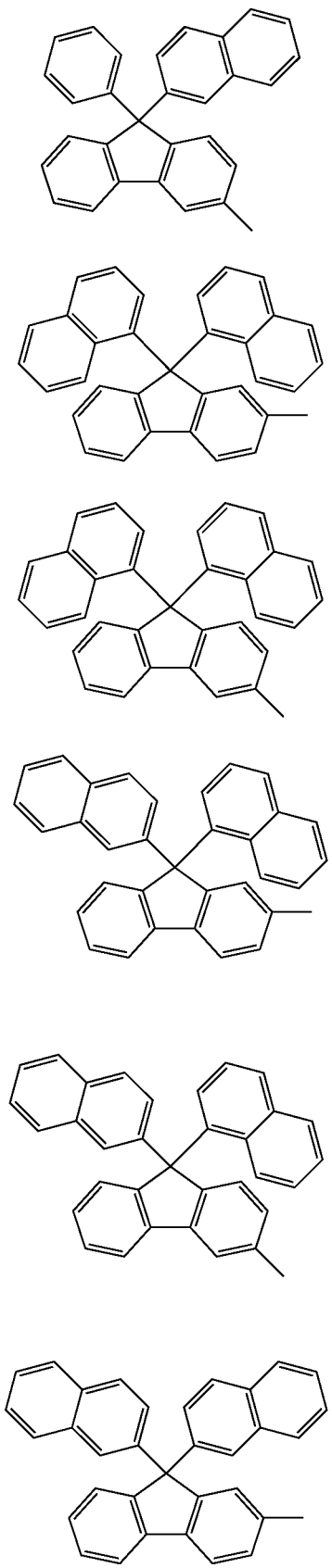
(B2-6)
(B2-7)
(B2-8)
(B2-9)
(B2-10)
(B2-11)
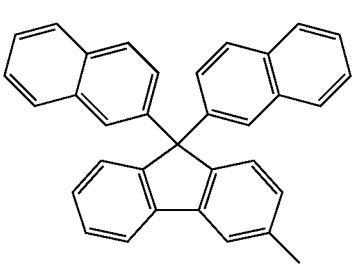
(B2-12)
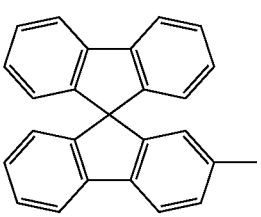
(B3-1)
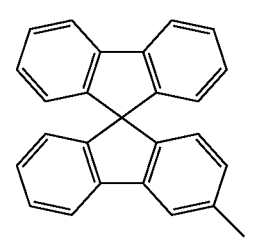
(B3-2)
[Chemical Formula 15]
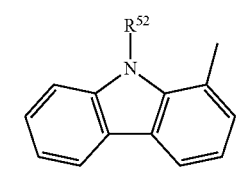
(B4-1)
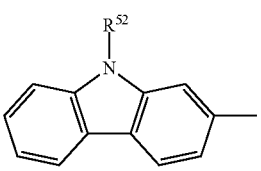
(B4-2)
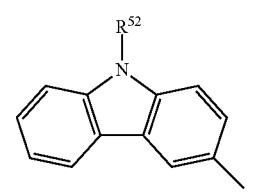
(B4-3)
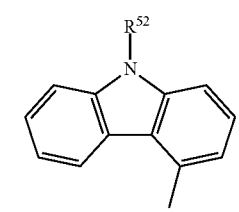
(B4-4)

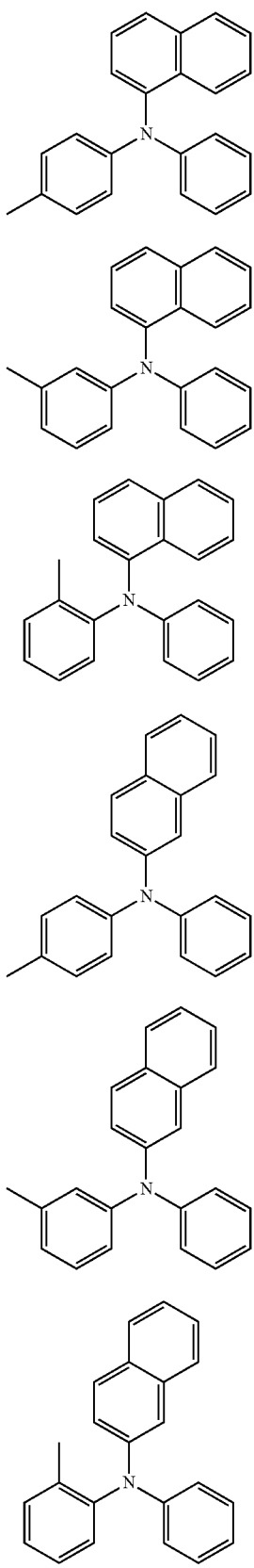
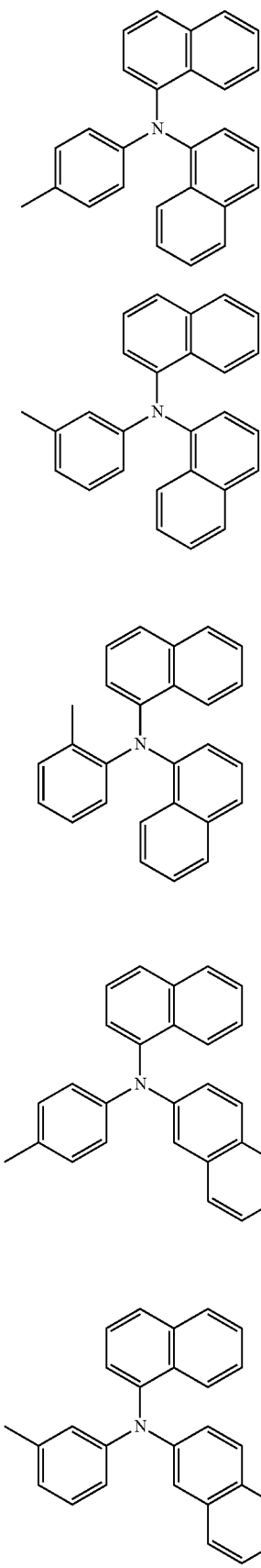

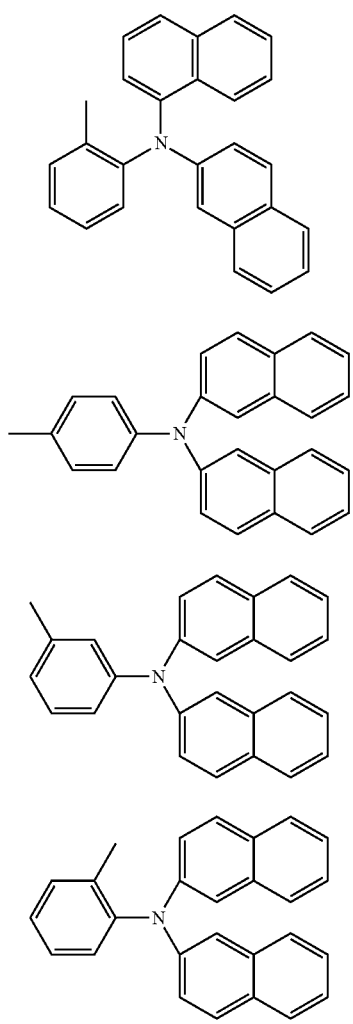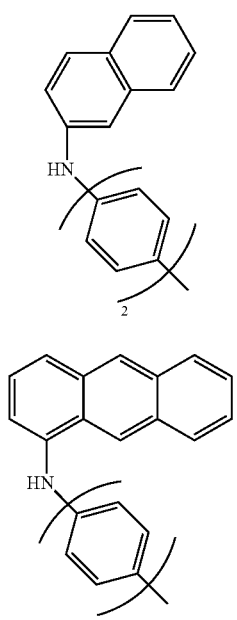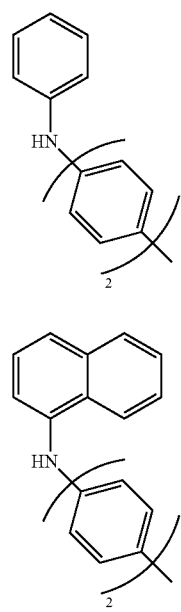
[Chemical Formula 17]

(B10-8) 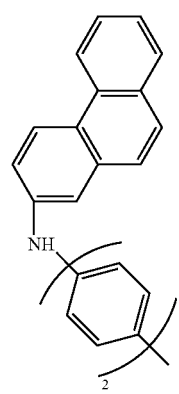
(B10-9) 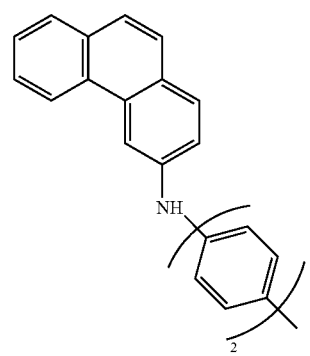
(B10-10) 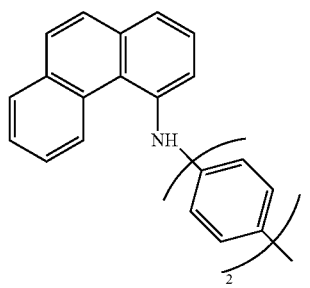
(B10-11) 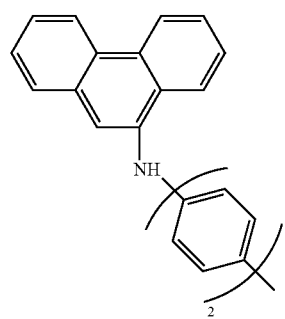
[Chemical Formula 18]
(B11-1) 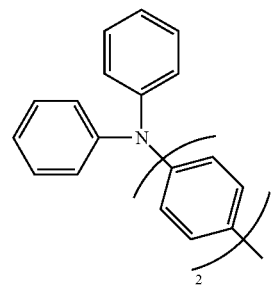
(B11-2) 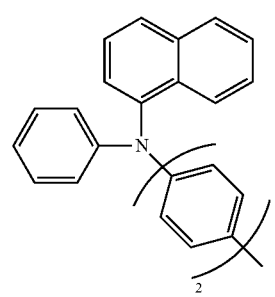
(B11-3) 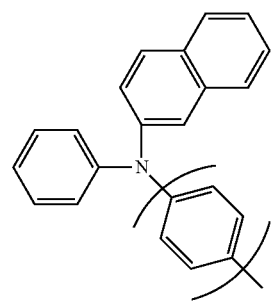
(B11-4) 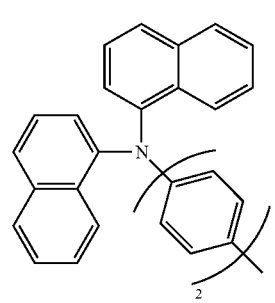
(B11-5) 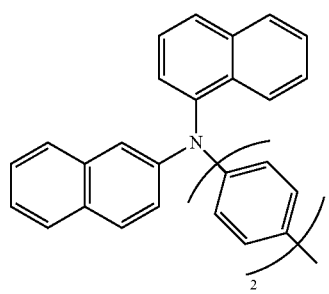

(B11-6)
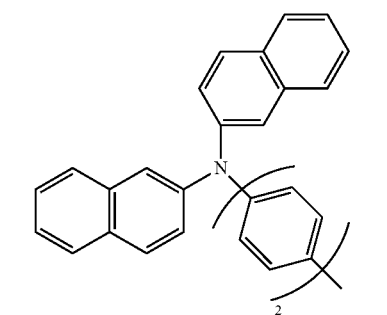
(B11-7)
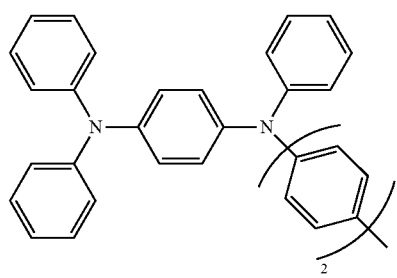
(B11-8)
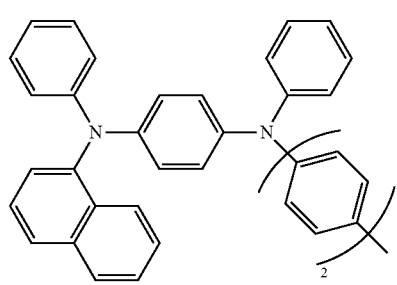
(B11-9)
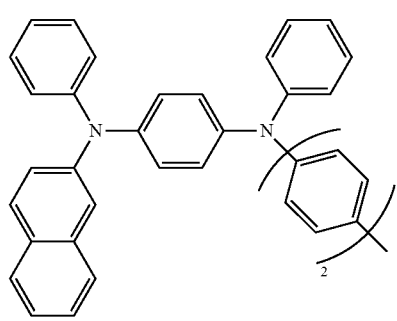
(B11-10)
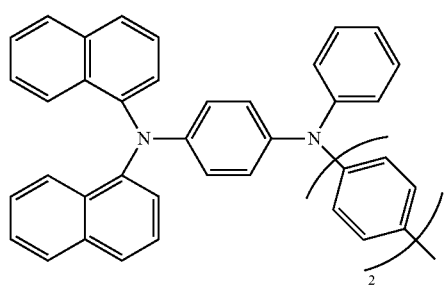
(B11-11)
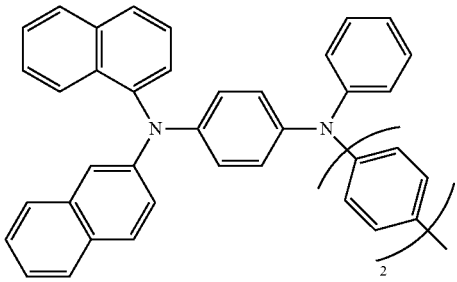
(B11-12)
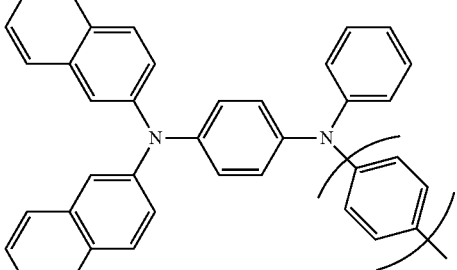
[Chemical Formula 19]
(B11-13)
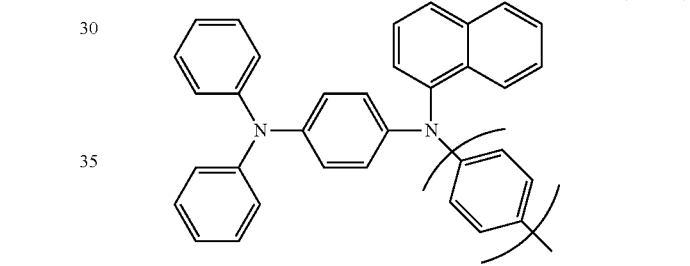
(B11-14)
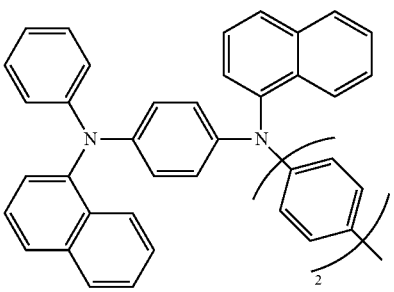
(B11-15)
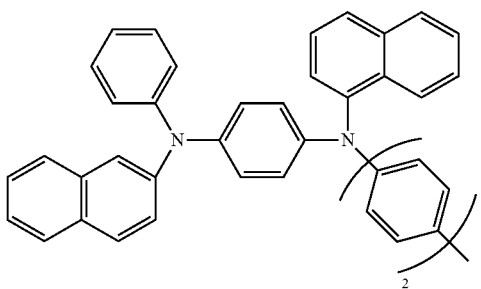

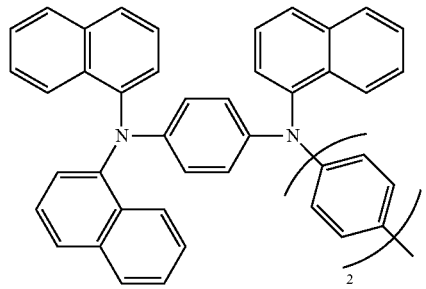
(B11-16)
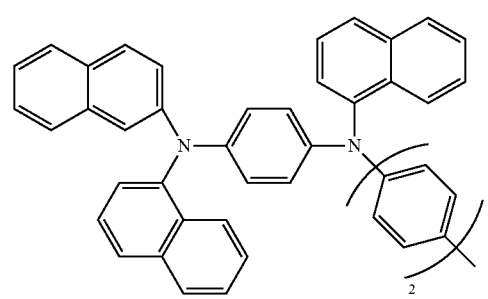
(B11-17)
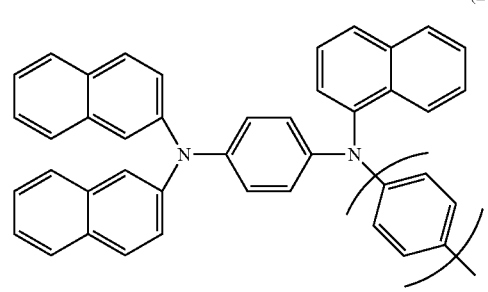
(B11-18)
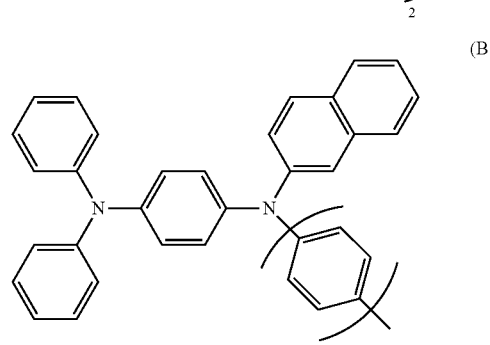
(B11-19)
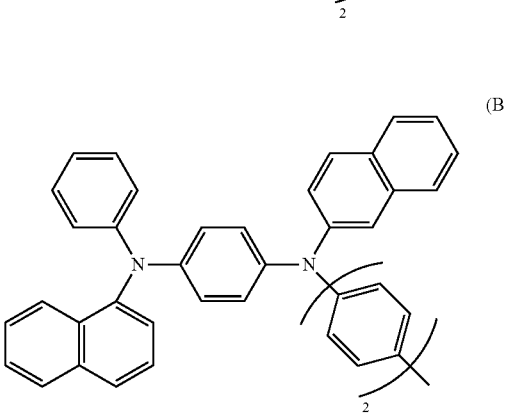
(B11-20)
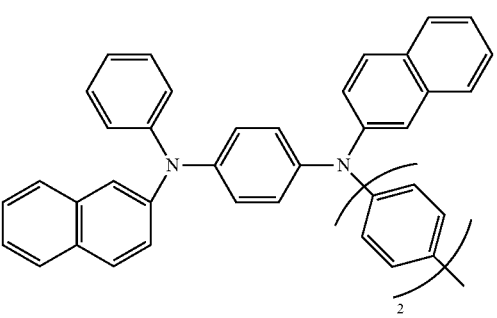
(B11-21)
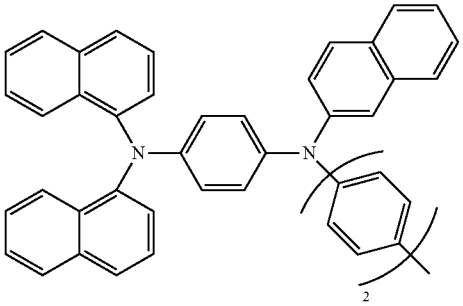
(B11-22)
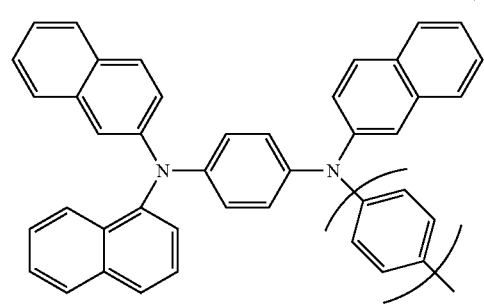
(B11-23)
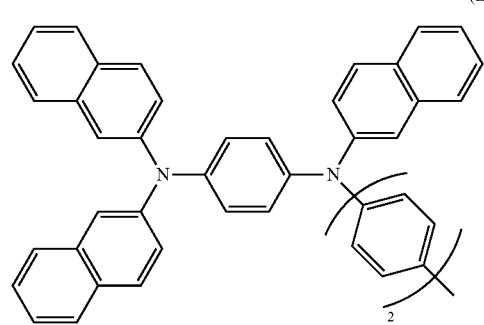
(B11-24)
In formula (2), each $Ar^2$ is independently a group of any one of formulas (A1) to (A18), with a group of any one of formulas (A1'-1) to (A18'-2) being especially preferred.

[Chemical Formula 20]
(A1) 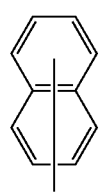
(A2) 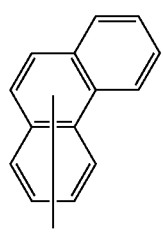
(A3) 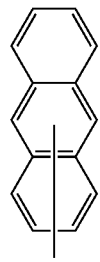
(A4) 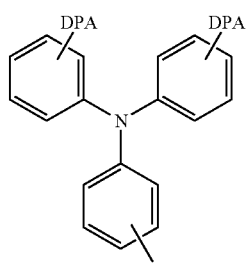
(A5) 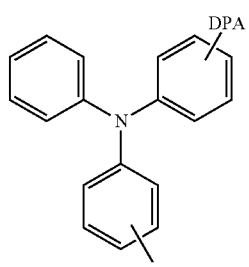
(A6) 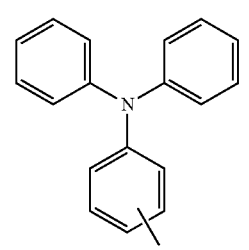
(A7) 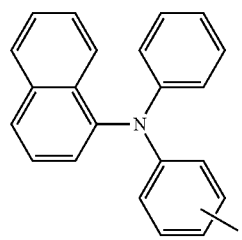
(A8) 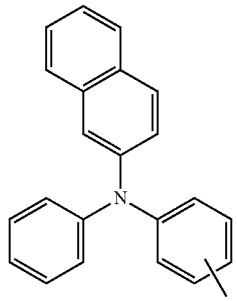
(A9) 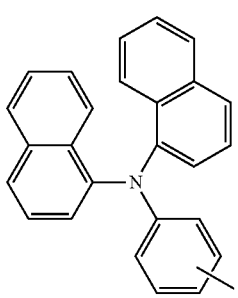
(A10) 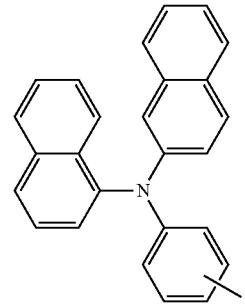
(A11) 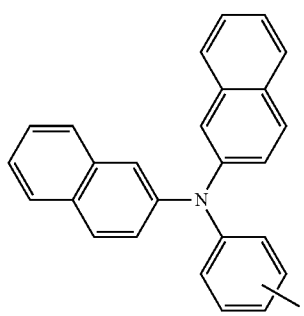

-continued
(A12) 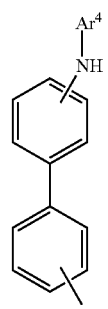
(A13) 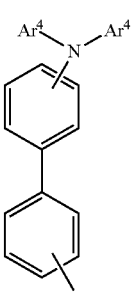
(A14) 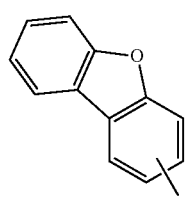
(A15) 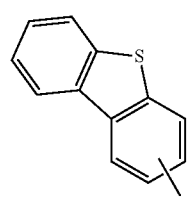
(A16) 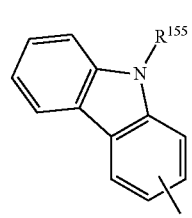
(A17) 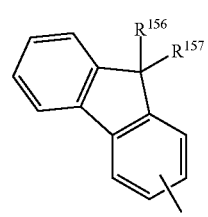
-continued
(A18) 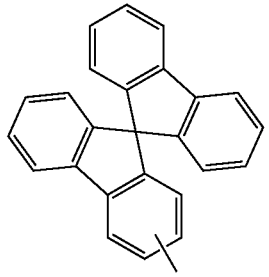
[Chemical Formula 21]
(A1′-1) 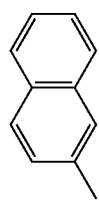
(A1′-2) 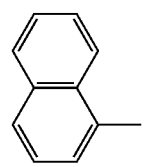
(A2′-1) 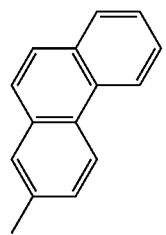
(A2′-2) 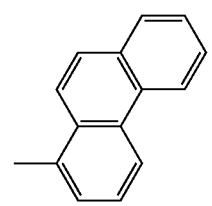
(A3′-1) 

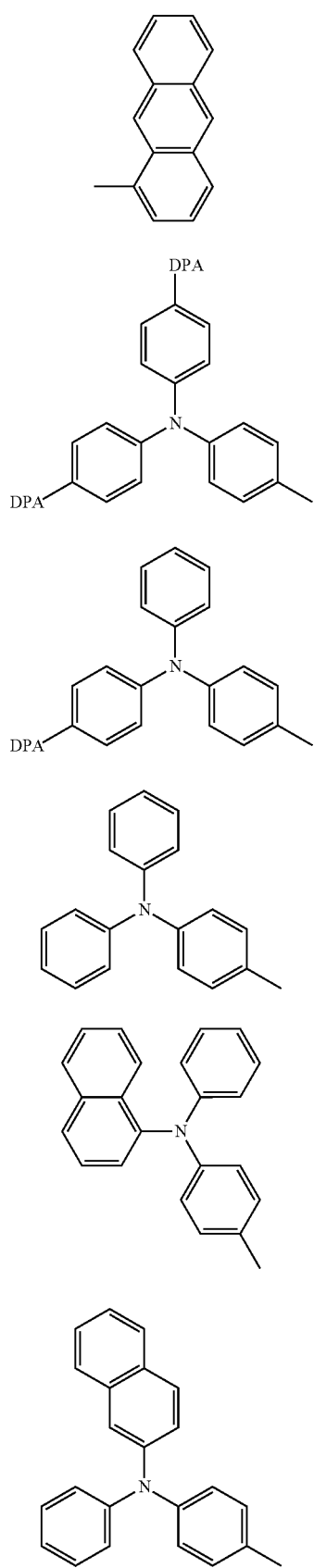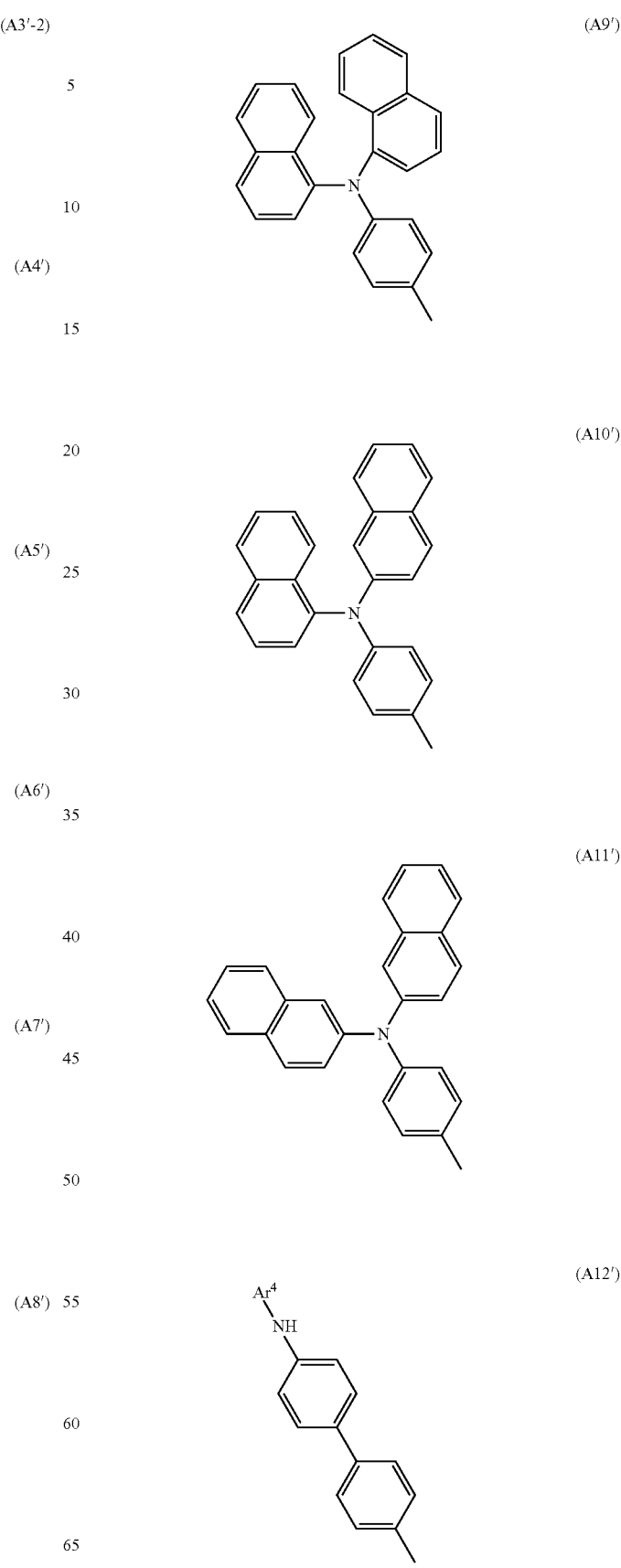

(A13′)
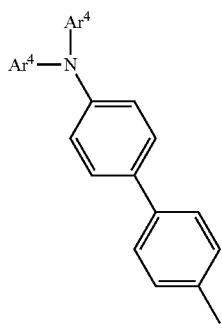

(A14′-1)
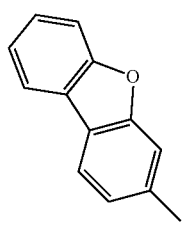

(A14′-2)
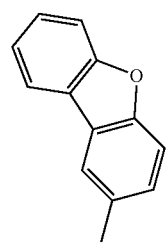

(A15′-1)
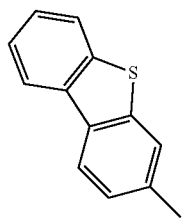

(A15′-2)
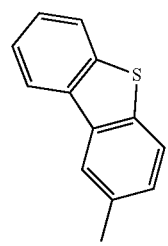

(A16′-1)
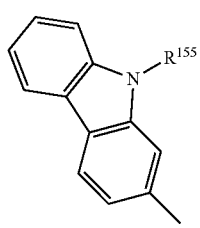

(A16′-2)
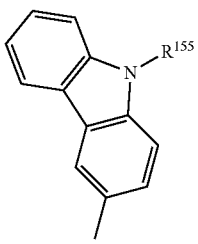

(A17′-1)
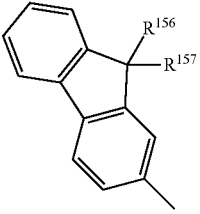

(A17′-2)
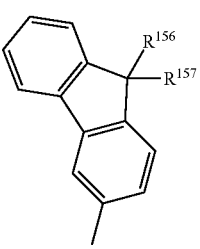

(A18′-1)
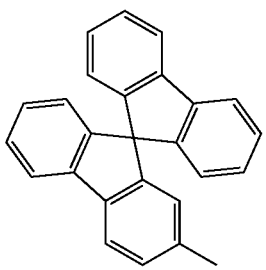

(A18′-2)
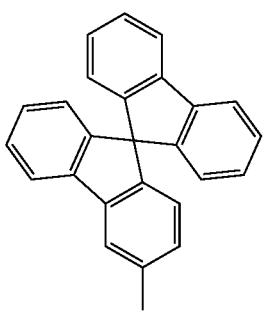

In these formulas, $R^{155}$ is a hydrogen atom, an alkyl group of 1 to 20 carbon atoms, alkenyl group of 2 to 20 carbon atoms or alkynyl group of 2 to 20 carbon atoms which may be substituted with $Z^4$, or an aryl group of 6 to 20 carbons or heteroaryl group of 2 to 20 carbon atoms which may be substituted with $Z^1$. $R^{156}$ and $R^{157}$ are each independently an aryl group of 6 to 20 carbon atoms or heteroaryl group of 2 to 20 carbon atoms which may be substituted with $Z^1$. DPA, $Ar^4$, $Z^1$ and $Z^4$ are as defined above. These halogen atoms, alkyl groups of 1 to 20 carbon atoms, alkenyl groups of 2 to 20 carbon atoms, alkynyl groups of 2 to 20 carbon atoms, aryl groups of 6 to 20 carbon atoms and heteroaryl groups of 2 to 20 carbon atoms are exemplified in the same way as described above for $R^1$ and $R^2$.

In particular, $R^{155}$ is preferably a hydrogen atom, an aryl group of 6 to 20 carbon atoms which may be substituted with $Z^1$, a heteroaryl group of 2 to 20 carbon atoms which may be substituted with $Z^1$, or an alkyl group of 1 to 20 carbon atoms which may be substituted with $Z^4$; more preferably a hydrogen atom, an aryl group of 6 to 14 carbon atoms which may be substituted with $Z^1$, a heteroaryl group of 2 to 14 carbon atoms which may be substituted with $Z^1$, or an alkyl group of 1 to 10 carbon atoms which may be substituted with $Z^4$; even more preferably a hydrogen atom, an aryl group of 6 to 14 carbon atoms which may be substituted with $Z^1$, a nitrogen-containing heteroaryl group of 2 to 14 carbon atoms which may be substituted with $Z^1$, or an alkyl group of 1 to 10 carbon atoms which may be substituted with $Z^4$; and still more preferably a hydrogen atom, a phenyl group which may be substituted with $Z^1$, a 1-naphthyl group which may be substituted with $Z^1$, a 2-napthyl group which may be substituted with $Z^1$, a 2-pyridyl group which may be substituted with $Z^1$, a 3-pyridyl group which may be substituted with $Z^1$, a 4-pyridyl group which may be substituted with $Z^1$, or a methyl group which may be substituted with $Z^4$.

$R^{156}$ and $R^{157}$ are each preferably an aryl group of 6 to 14 carbon atoms which may be substituted with $Z^1$ or a heteroaryl group of 2 to 14 carbon atoms which may be substituted with Z; more preferably an aryl group of 6 to 14 carbon atoms which may be substituted with $Z^1$; and even more preferably a phenyl group which may be substituted with $Z^1$, a 1-naphthyl group which may be substituted with $Z^1$ or a 2-naphthyl group which may be substituted with $Z^1$.

Specific examples of groups which are suitable as $Ar^2$ include, but ale not limited to, those shown below. In the following formulas, $R^{155}$ and DPA are as defined above.

[Chemical Formula 22]

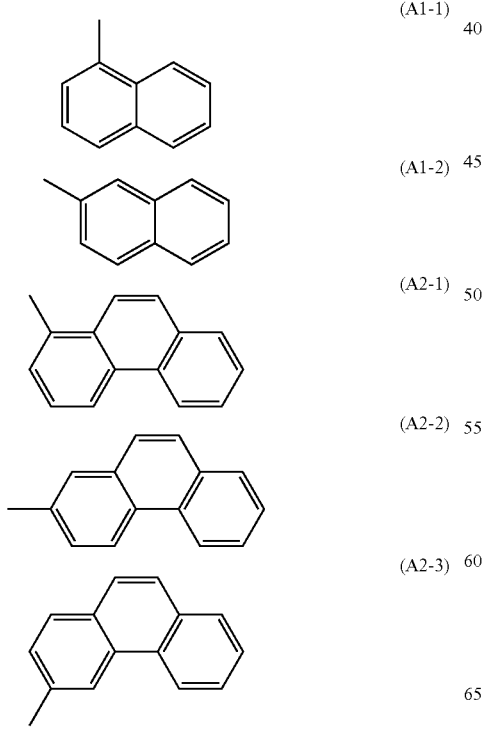

(A1-1)

(A1-2)

(A2-1)

(A2-2)

(A2-3)

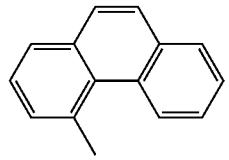

(A2-4)

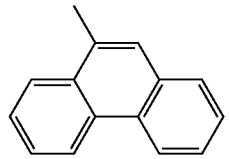

(A2-5)

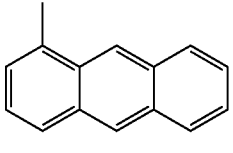

(A3-1)

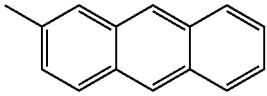

(A3-2)

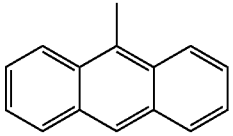

(A3-3)

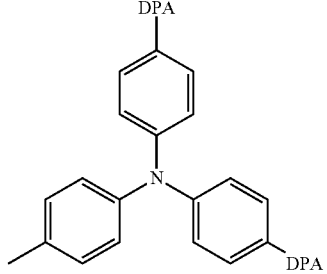

(A4-1)

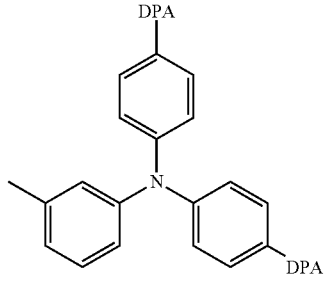

(A4-2)

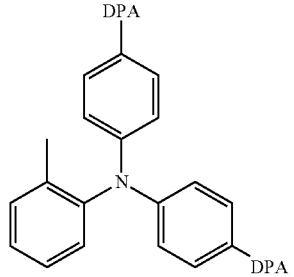

(A4-3)

(A5-1) 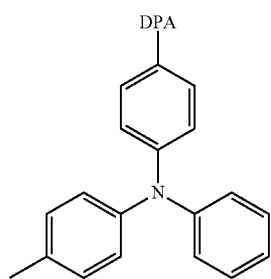
(A5-2) 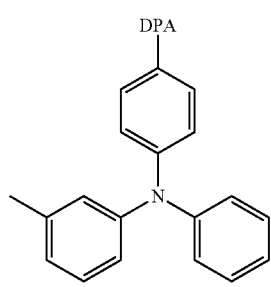
(A5-3) 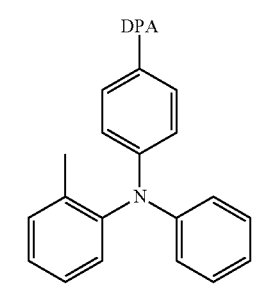
[Chemical Formula 23]
(A6-1) 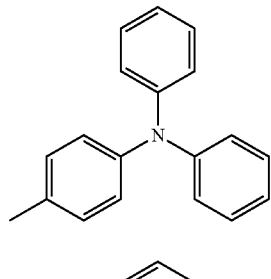
(A6-2) 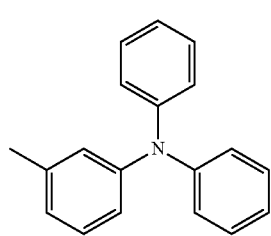
(A6-3) 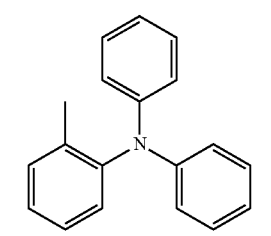
(A7-1) 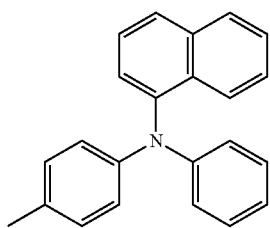
(A7-2) 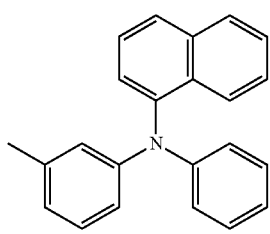
(A7-3) 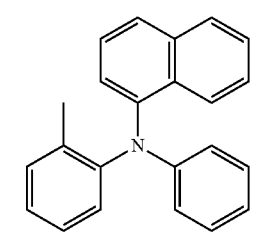
(A8-1) 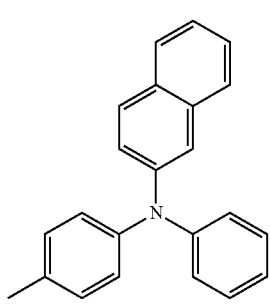
(A8-2) 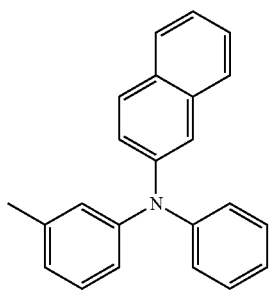
(A8-3) 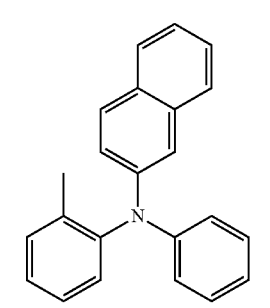

(A9-1)
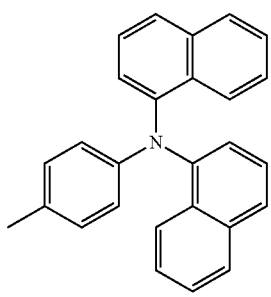
(A9-2)
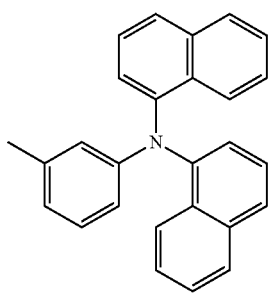
(A9-3)
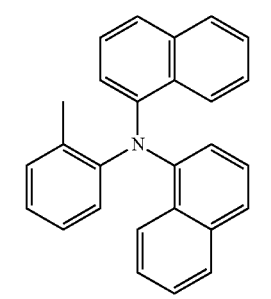
[Chemical Formula 24]
(A10-1)
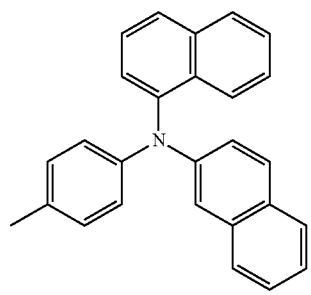
(A10-2)
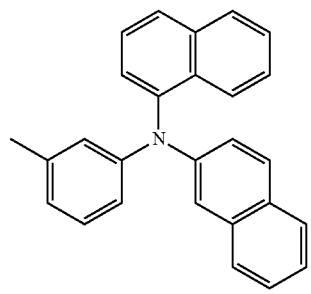
(A10-3)
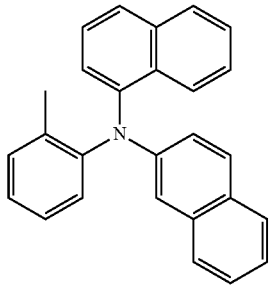
(A11-1)
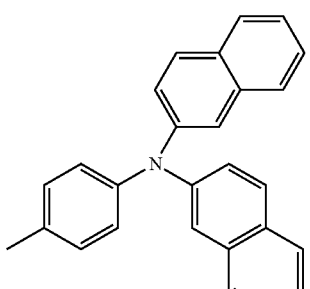
(A11-2)
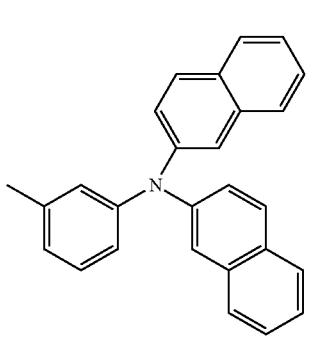
(A11-3)
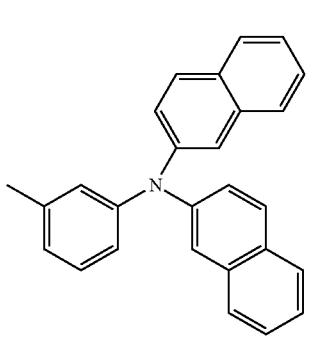
[Chemical Formula 25]
(A12-1)
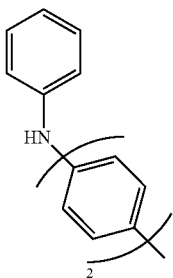

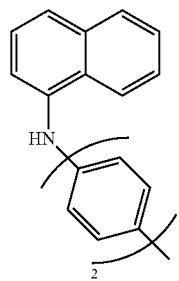 (A12-2)
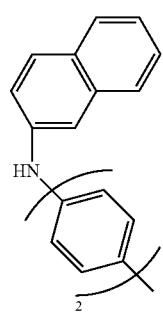 (A12-3)
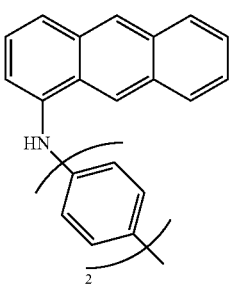 (A12-4)
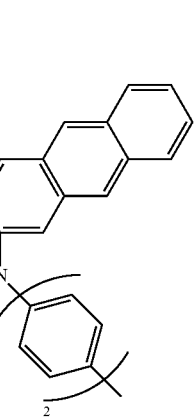 (A12-5)
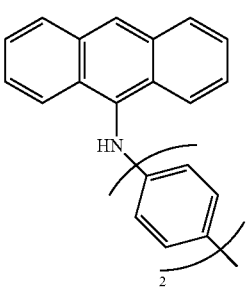 (A12-6)
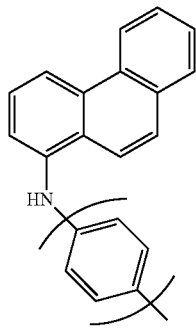 (A12-7)
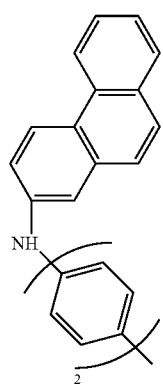 (A12-8)
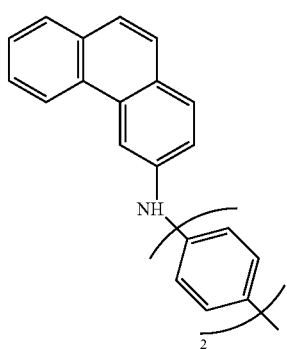 (A12-9)
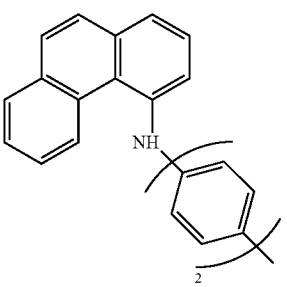 (A12-10)

(A12-11)
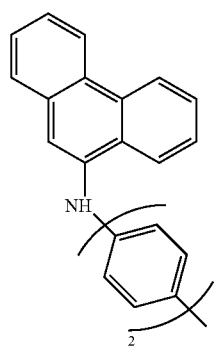
[Chemical Formula 26]
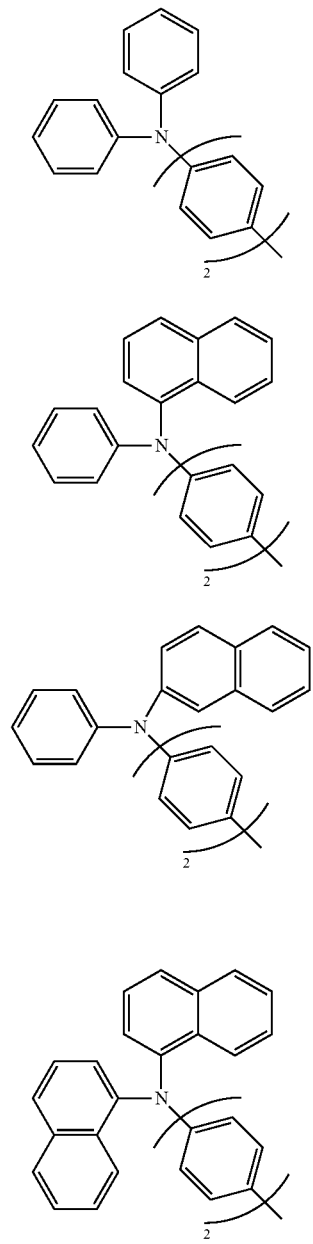
(A13-5)
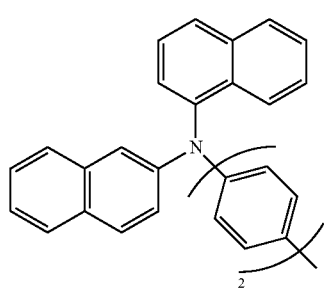
(A13-6)
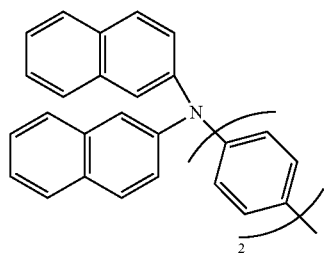
(A13-7)
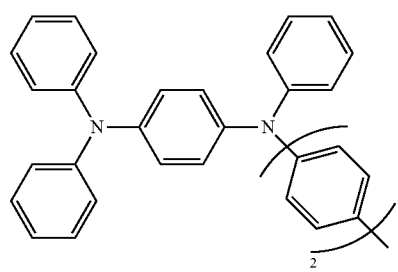
(A13-8)
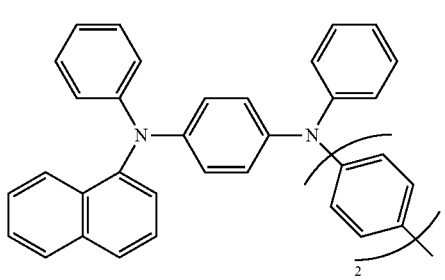
(A13-9)
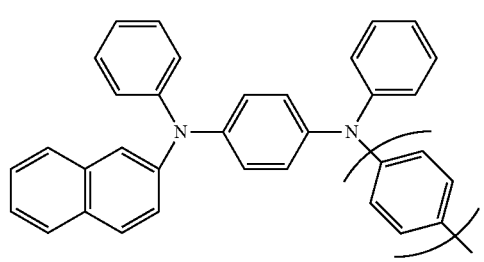
(A13-10)
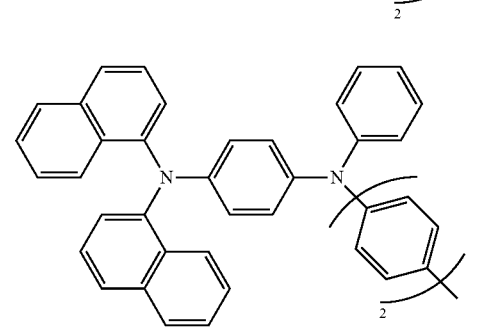

(A13-11)
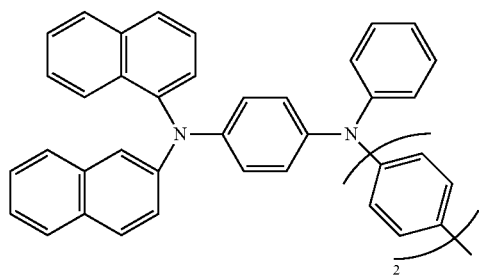
(A13-12)
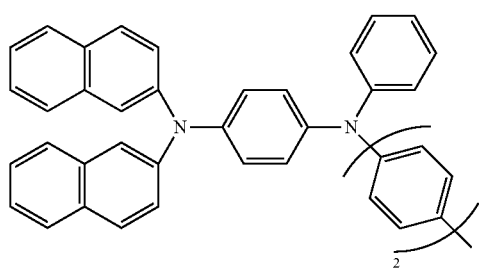
[Chemical Formula 27]
(A13-13)
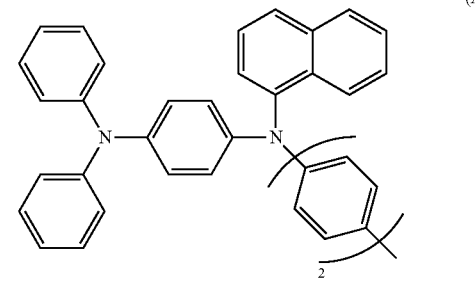
(A13-14)
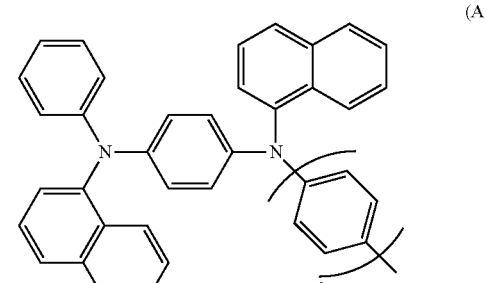
(A13-15)
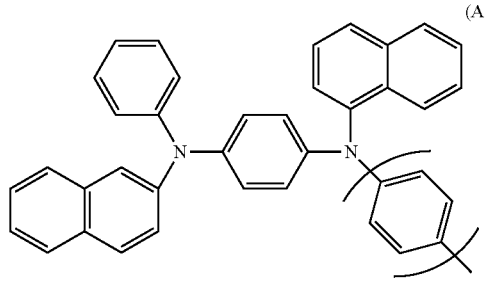
(A13-16)
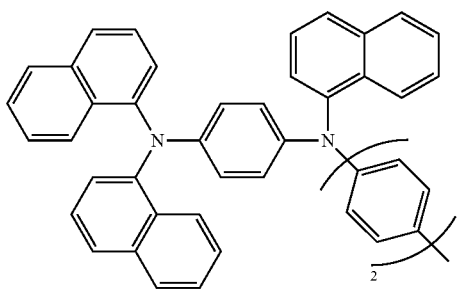
(A13-17)
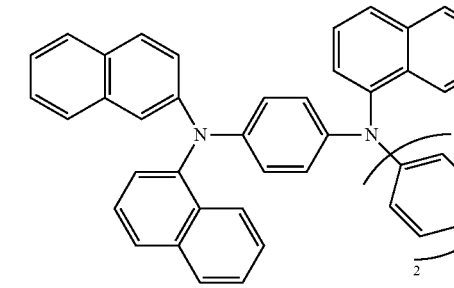
(A13-18)
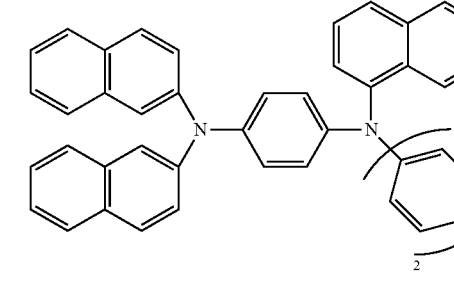
(A13-19)
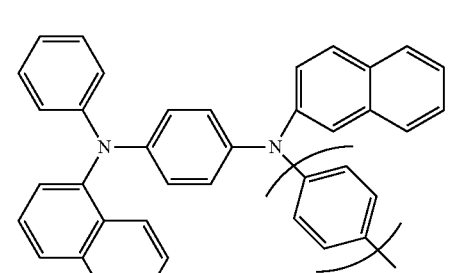
(A13-20)
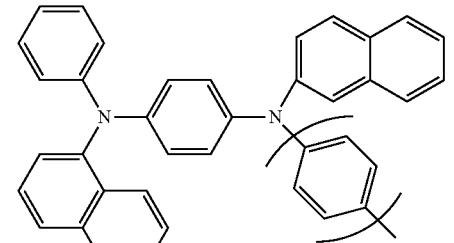

-continued
(A13-21)
(A13-22)
(A13-23)
(A13-24)
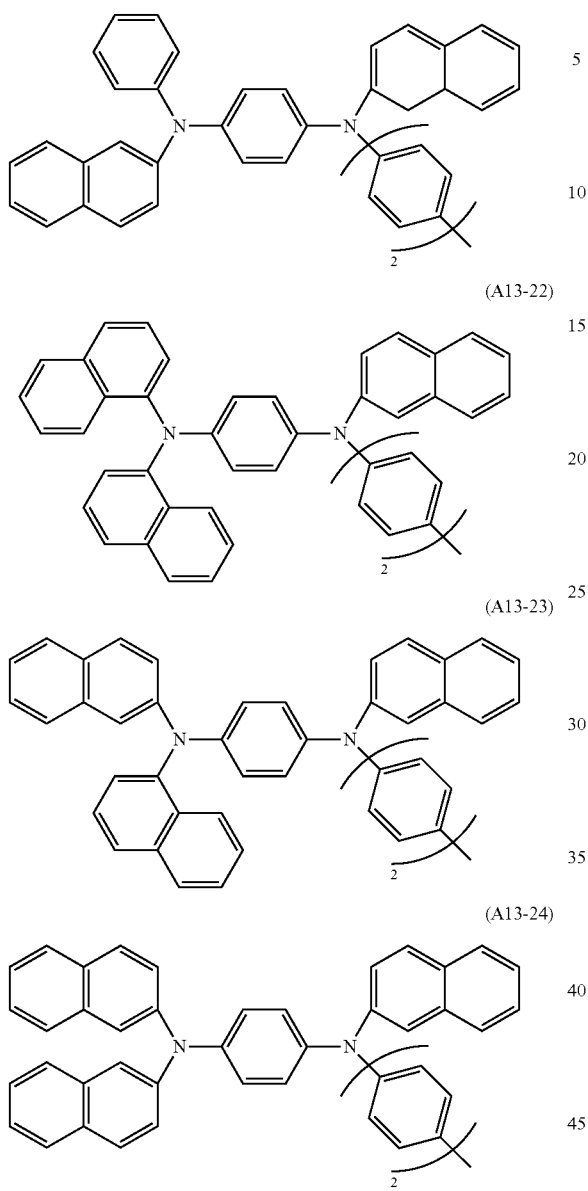
[Chemical Formula 28]
(A14-1)
(A14-2)
(A14-3)
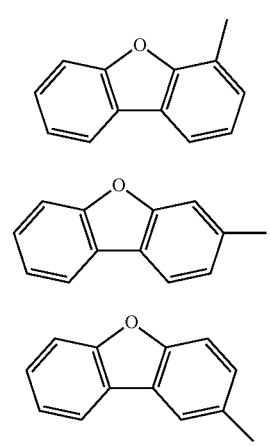
-continued
(A14-4)
(A15-1)
(A15-2)
(A15-3)
(A15-4)
(A16-1)
(A16-2)
(A16-3)
(A16-4)
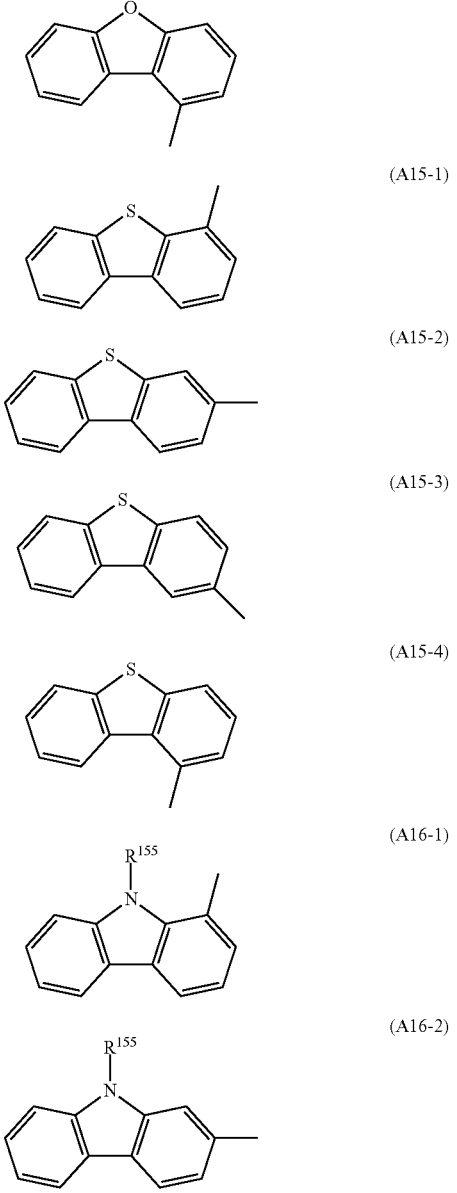
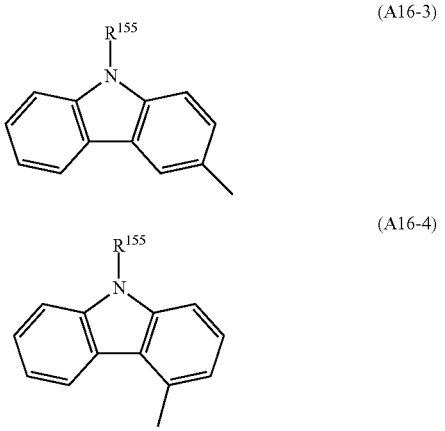

[Chemical Formula 29]
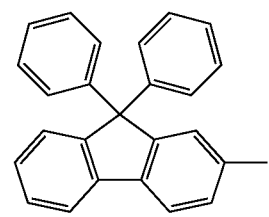
(A17-1)
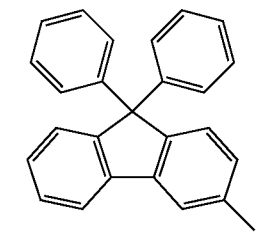
(A17-2)
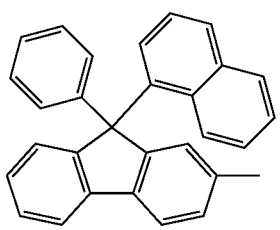
(A17-3)
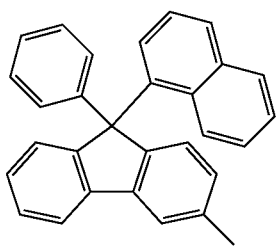
(A17-4)
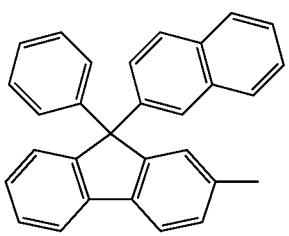
(A17-5)
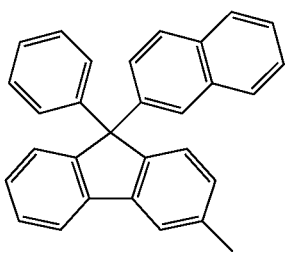
(A17-6)
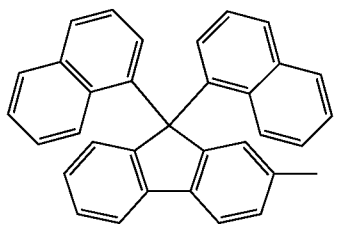
(A17-7)
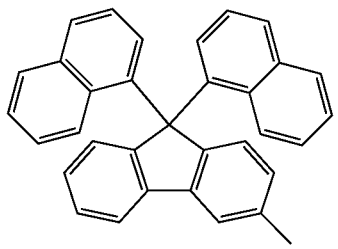
(A17-8)
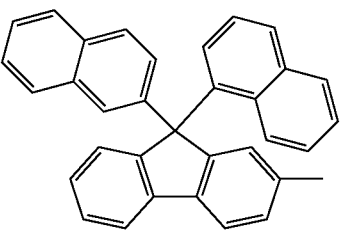
(A17-9)
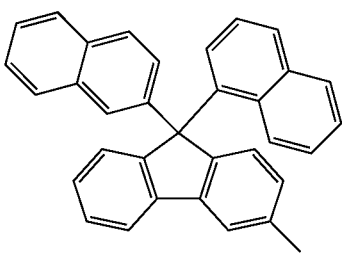
(A17-10)
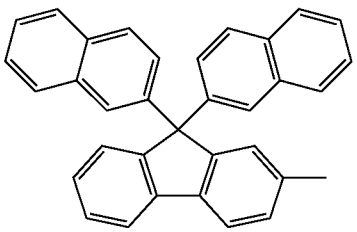
(A17-11)
(A17-12)

(A18-1)

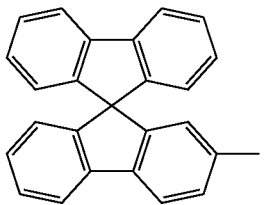

(A18-2)

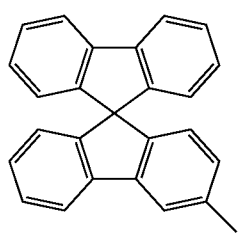

In formula (2), taking into account the ease of synthesizing the resulting arylamine derivative, it is preferable for all the $Ar^1$ groups to be the same group and for all the $Ar^2$ groups to be the same group, and more preferable for all the Art and $Ar^2$ groups to be the same group. That is, the arylamine derivative of formula (2) is more preferably an arylamine derivative of formula (2-1) below.

[Chemical Formula 30]

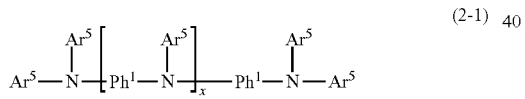

(2-1)

In formula (2-1), $Ph^1$ is as defined above, and x is subsequently described. Each $Ar^5$ is a group of any of formulas (D1) to (D13) below, with a group of any of formulas (D1') to (D13') in particular being preferred. In the following formulas, $R^{28}$, $R^{29}$, $R^{52}$, $Ar^4$ and DPA are as defined above. $Ar^5$ is exemplified by the same groups as mentioned above as suitable examples of $Ar^1$.

[Chemical Formula 31]

(D1)

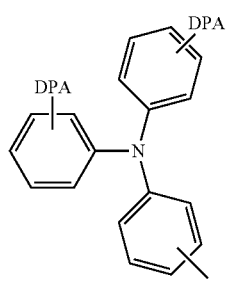

(D2)

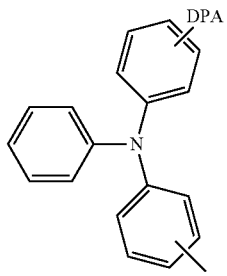

(D3)

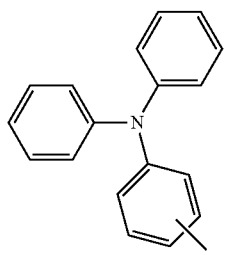

(D4)

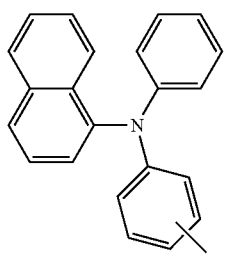

(D5)

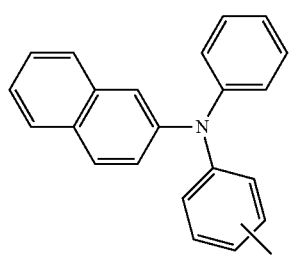

(D6)

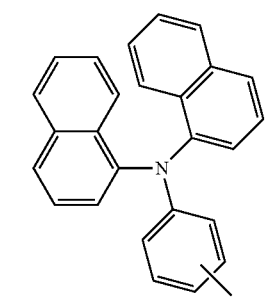

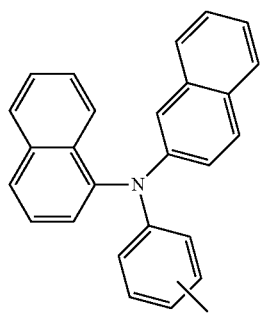 (D7)
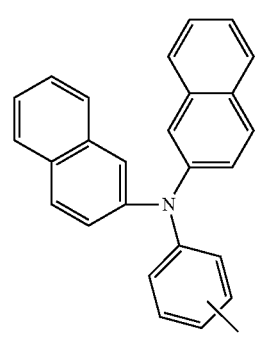 (D8)
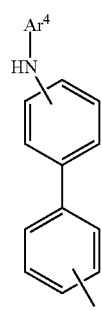 (D9)
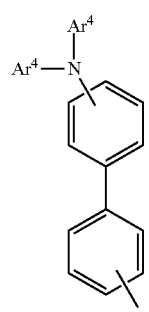 (D10)
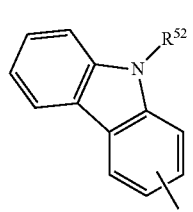 (D11)
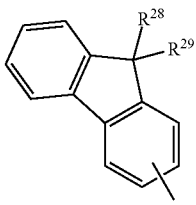 (D12)
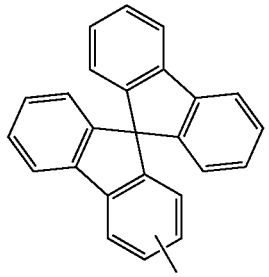 (D13)
[Chemical Formula 32]
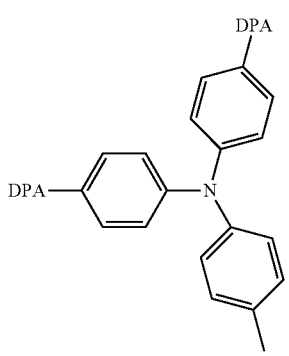 (D1′)
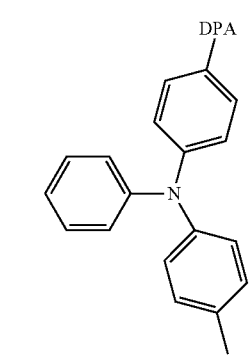 (D2′)
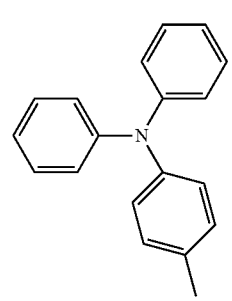 (D3′)

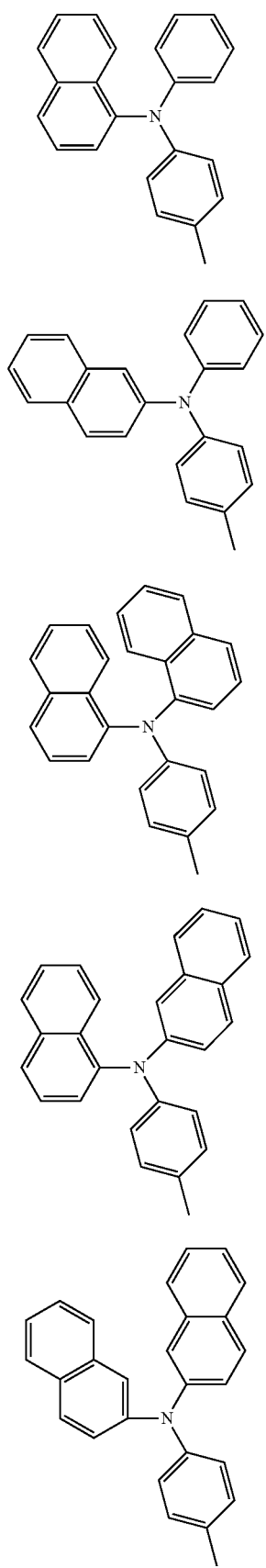

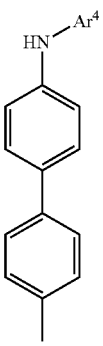
(D9′)

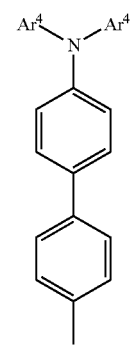
(D10′)

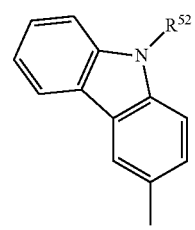
(D11′)

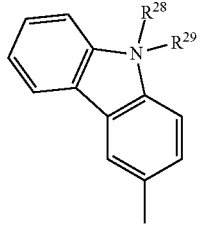
(D12′)

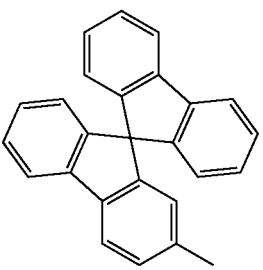
(D13′)

The arylamine derivative of formula (2) is preferably an arylamine derivative of formula (2-2), both because, as subsequently described, it can be synthesized with relative ease using the relatively inexpensive bis(4-aminophenyl) amine as the starting compound, and because the resulting arylamine derivative has an excellent solubility in organic solvents.

[Chemical Formula 33]
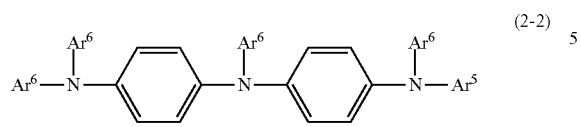
(2-2)
In this formula, each $Ar^6$ represents a group of any one of formulas (E1) to (E14). Also, in the following formulas, $R^{52}$ is as defined above.
[Chemical Formula 34]
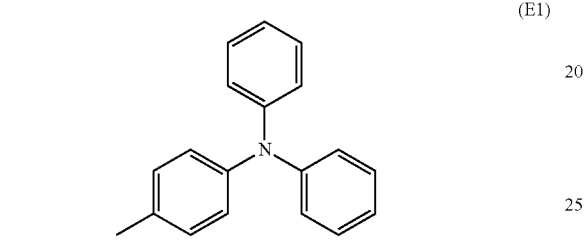
(E1)
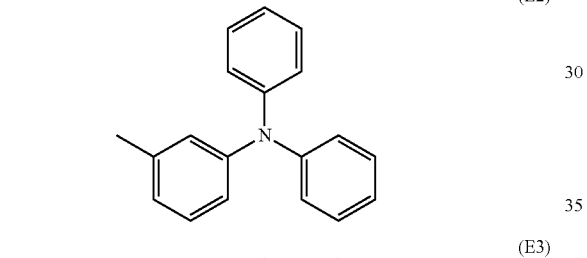
(E2)
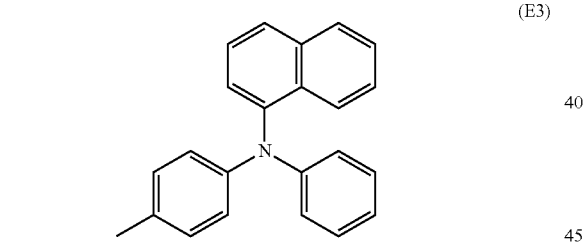
(E3)
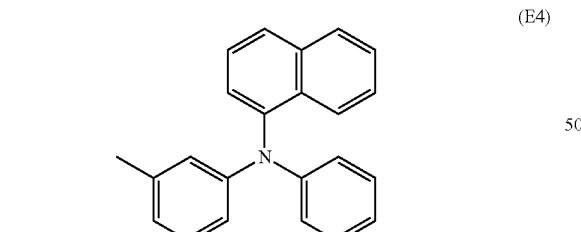
(E4)
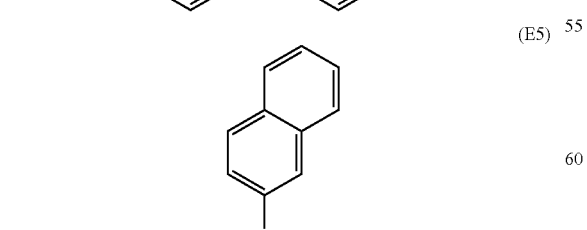
(E5)
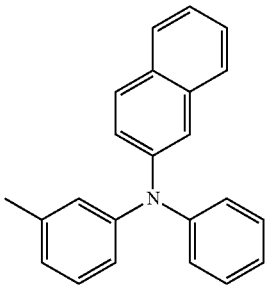
(E6)
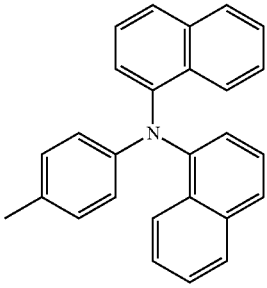
(E7)
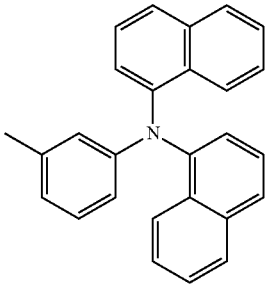
(E8)
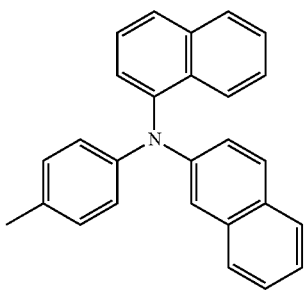
(E9)
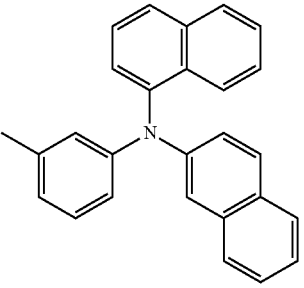
(E10)

-continued
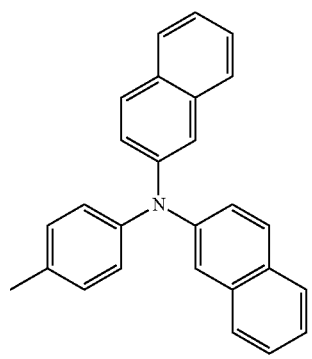
(E11)
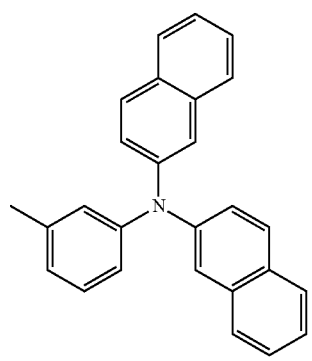
(E12)
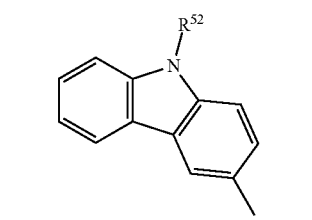
(E13)
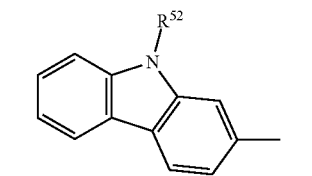
(E14)
In formula (3), Ar$^3$ is a group of any of formulas (C1) to (C8), with a group of any of formulas (C1') to (C8') in particular being preferred. In the following formulas, DPA is as defined above.
[Chemical Formula 35]
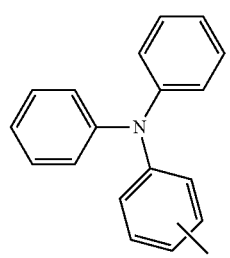
(C1)
-continued
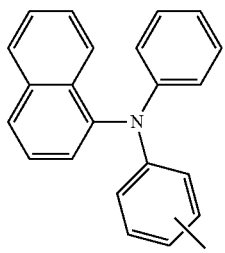
(C2)
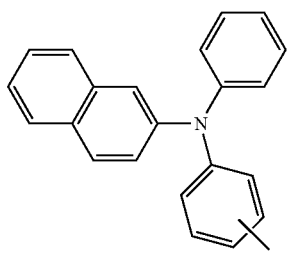
(C3)
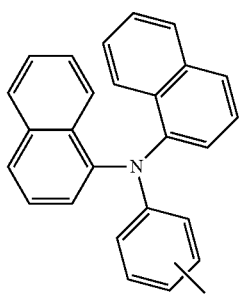
(C4)
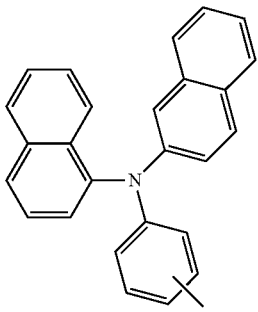
(C5)
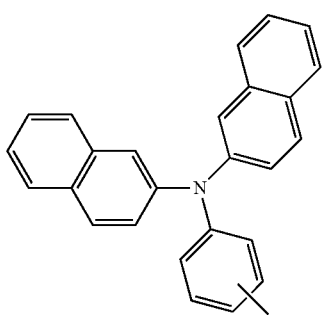
(C6)

(C7) 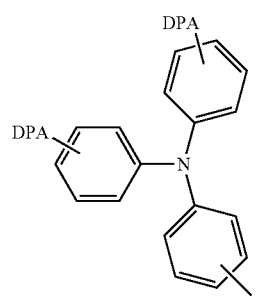
(C8) 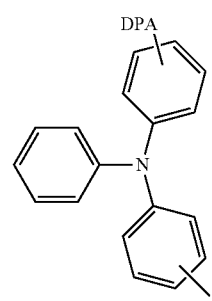
[Chemical Formula 36]
(C1′) 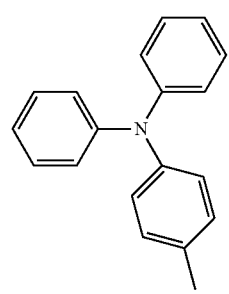
(C2′) 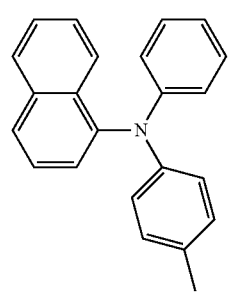
(C3′) 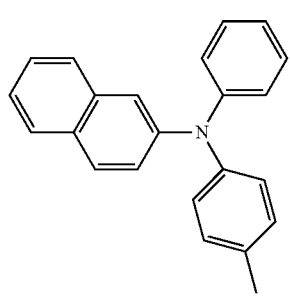
(C4′) 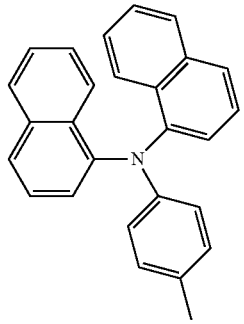
(C5′) 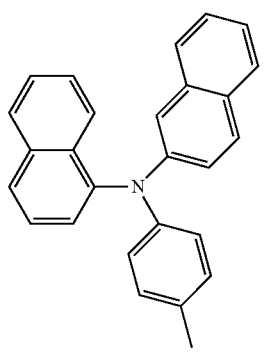
(C6′) 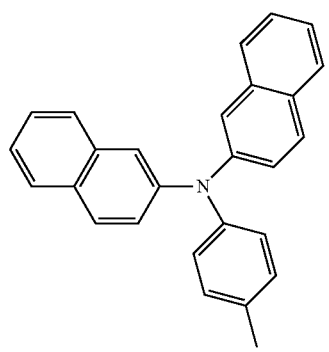
(C7′) 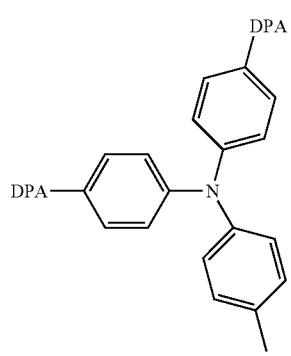

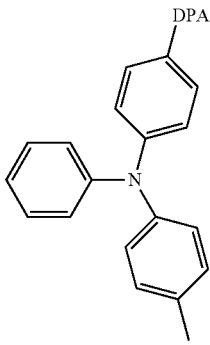

(C8')

In formulas (2) and (2-1), x is an integer from 1 to 10. However, from the standpoint of increasing the solubility of the compound in organic solvents, x is preferably from 1 to 5, more preferably from 1 to 3, even more preferably 1 or 2, and most preferably 1. In formula (3), y represents 1 or 2.

In $R^{28}$, $R^{29}$, $R^{52}$ and $R^{155}$ to $R^{157}$, $Z^1$ is preferably a halogen atom, a nitro group, a cyano group, an alkyl group of 1 to 10 carbon atoms which may be substituted with $Z^2$, an alkenyl group of 2 to 10 carbon atoms which may be substituted with $Z^2$ or an alkynyl group of 2 to 10 carbon atoms which may be substituted with $Z^2$; more preferably a halogen atom, a nitro group, a cyano group, an alkyl group of 1 to 3 carbon atoms which may be substituted with $Z^2$, an alkenyl group of 2 or 3 carbon atoms which may be substituted with $Z^2$, or an alkynyl group of 2 or 3 carbon atoms which may be substituted with $Z^2$; and even more preferably a fluorine atom, an alkyl group of 1 to 3 carbon atoms which may be substituted with $Z^2$, an alkenyl group of 2 or 3 carbon atoms which may be substituted with $Z^2$, or an alkynyl group of 2 or 3 carbon atoms which may be substituted with $Z^2$.

In $R^{28}$, $R^{29}$, $R^{52}$ and $R^{155}$ to $R^{157}$, $Z^4$ is preferably a halogen atom, a nitro group, a cyano group or an aryl group of 6 to 14 carbon atoms which may be substituted with $Z^5$; more preferably a halogen atom, a nitro group, a cyano group, or an aryl group of 6 to 10 carbon atoms which may be substituted with $Z^5$; even more preferably a fluorine atom or an aryl group of 6 to 10 carbon atoms which may be substituted with $Z^5$; and still more preferably a fluorine atom or a phenyl group which may be substituted with $Z^5$.

In $R^{28}$, $R^{29}$, $R^{52}$ and $R^{155}$ to $R^{157}$, $Z^2$ is preferably a halogen atom, a nitro group, a cyano group, or an aryl group of 6 to 14 carbon atoms which may be substituted with $Z^3$; more preferably a halogen atom, a nitro group, a cyano group, or an aryl group of 6 to 10 carbon atoms which may be substituted with $Z^3$; even more preferably a fluorine atom or an aryl group of 6 to 10 carbon atoms which may be substituted with $Z^3$; and still more preferably a fluorine atom or a phenyl group which may be substituted with $Z^3$.

In $R^{28}$, $R^{29}$, $R^{52}$ and $R^{155}$ to $R^{157}$, $Z^5$ is preferably a halogen atom, a nitro group, a cyano group, an alkyl group of 1 to 10 carbon atoms which may be substituted with $Z^3$, an alkenyl group of 2 to 10 carbon atoms which may be substituted with $Z^3$, or an alkynyl group of 2 to 10 carbon atoms which may be substituted with $Z^3$; more preferably a halogen atom, a nitro group, a cyano group, an alkyl group of 1 to 3 carbon atoms which may be substituted with $Z^3$, an alkenyl group of 2 or 3 carbon atoms which may be substituted with $Z^3$, or an alkynyl group of 2 or 3 carbon atoms which may be substituted with $Z^3$; and even more preferably a fluorine atom, an alkyl group of 1 to 3 carbon atoms which may be substituted with $Z^3$, an alkenyl group of 2 or 3 carbon atoms which may be substituted with $Z^3$, or an alkynyl group of 2 or 3 carbon atoms which may be substituted with $Z^3$.

In $R^{28}$, $R^{29}$, $R^{52}$ and $R^{155}$ to $R^{157}$, $Z^3$ is preferably a halogen atom, and more preferably a fluorine atom.

In $R^7$ to $R^{27}$, $R^{30}$ to $R^{51}$ and $R^{53}$ to $R^{154}$, $Z^1$ is preferably a halogen atom, a nitro group, a cyano group, an alkyl group of 1 to 3 carbon atoms which may be substituted with $Z^2$, an alkenyl group of 2 or 3 carbon atoms which may be substituted with $Z^2$, or an alkynyl group of 2 or 3 carbon atoms which may be substituted with $Z^2$; more preferably a halogen atom or an alkyl group of 1 to 3 carbon atoms which may be substituted with $Z^2$; and even more preferably a fluorine atom or a methyl group which may be substituted with $Z^2$.

In $R^7$ to $R^{27}$, $R^{30}$ to $R^{51}$ and $R^{53}$ to $R^{154}$, $Z^4$ is preferably a halogen atom, a nitro group, a cyano group, or an aryl group of 6 to 10 carbon atoms which may be substituted with $Z^5$; more preferably a halogen atom or an aryl group of 6 to 10 carbon atoms which may be substituted with $Z^5$; and even more preferably a fluorine atom or a phenyl group which may be substituted with $Z^5$.

In $R^7$ to $R^{27}$, $R^{30}$ to $R^{51}$ and $R^{53}$ to $R^{154}$, $Z^2$ is preferably a halogen atom, a nitro group, a cyano group, or an aryl group of 6 to 10 carbon atoms which may be substituted with $Z^3$; more preferably a halogen atom or an aryl group of 6 to 10 carbon atoms which may be substituted with $Z^3$; and even more preferably a fluorine atom or a phenyl group which may be substituted with $Z^3$.

In $R^7$ to $R^{27}$, $R^{30}$ to $R^{51}$ and $R^{53}$ to $R^{154}$, $Z^{s5}$ is preferably a halogen atom, a nitro group, a cyano group, an alkyl group of 1 to 3 carbon atoms which may be substituted with $Z^3$, an alkenyl group of 2 or 3 carbon atoms which may be substituted with $Z^3$, or an alkynyl group of 2 or 3 carbon atoms which may be substituted with $Z^3$; more preferably a halogen atom or an alkyl group of 1 to 3 carbon atoms which may be substituted with $Z^3$; and even more preferably a fluorine atom or a methyl group which may be substituted with $Z^3$.

In $R^7$ to $R^{27}$, $R^{30}$ to $R^{51}$ and $R^{53}$ to $R^{154}$, $Z^3$ is preferably a halogen atom, and more preferably a fluorine atom.

In this invention, specific examples of groups that are suitable as $R^{52}$ and $R^{155}$ include, but are not limited to, those shown below.

[Chemical Formula 37]

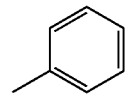

(N1)

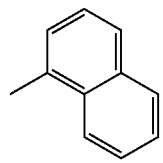

(N2)

-continued
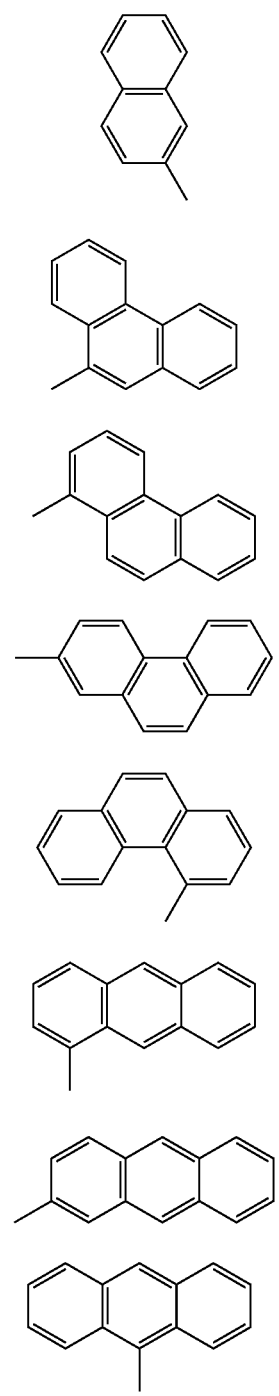
(N3)
(N4)
(N5)
(N6)
(N7)
(N8)
(N9)
(N10)
[Chemical Formula 38]
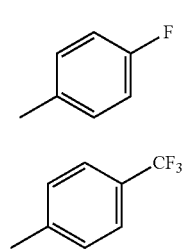
(N11)
(N12)
-continued
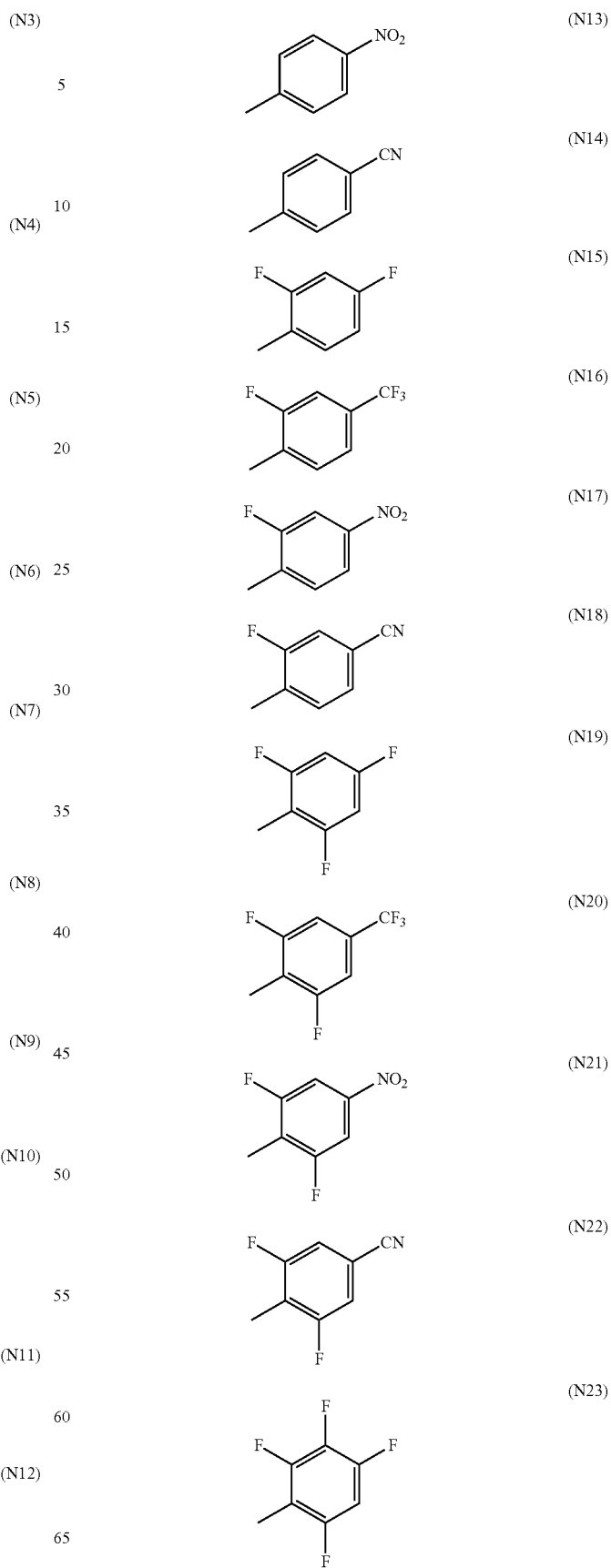
(N13)
(N14)
(N15)
(N16)
(N17)
(N18)
(N19)
(N20)
(N21)
(N22)
(N23)

(N24) 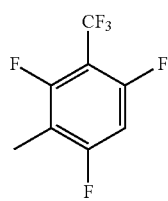
(N25) 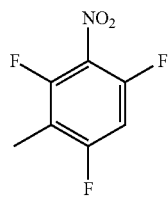
(N26) 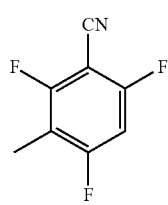
(N27) 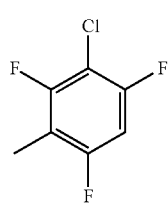
(N28) 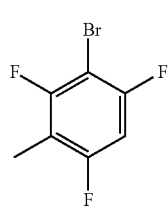
(N29) 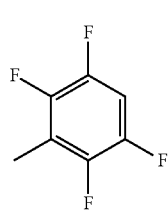
(N30) 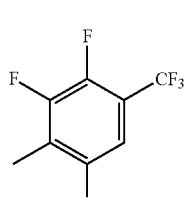
(N31) 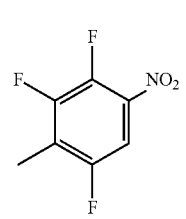
(N32) 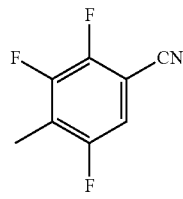
[Chemical Formula 39]
(N33) 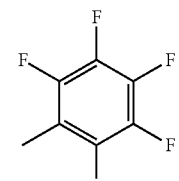
(N34) 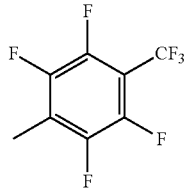
(N35) 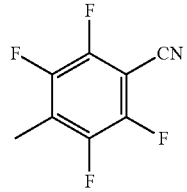
(N36) 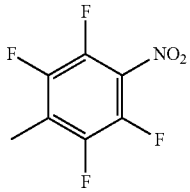
(N37) 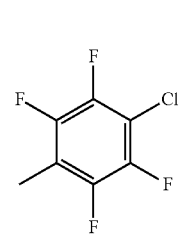
(N38) 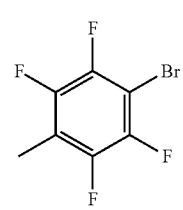

-continued
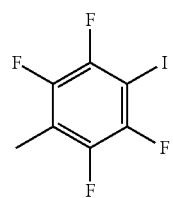 (N39)
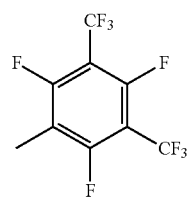 (N40)
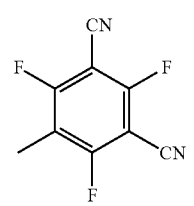 (N41)
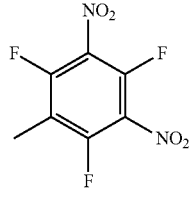 (N42)
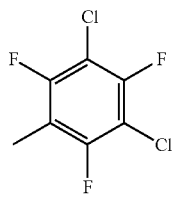 (N43)
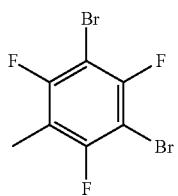 (N44)
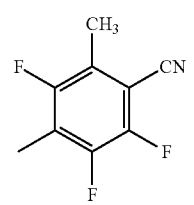 (N45)
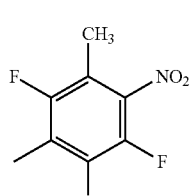 (N46)
-continued
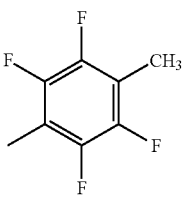 (N47)
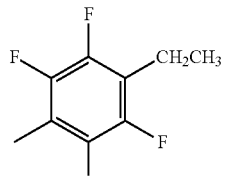 (N48)
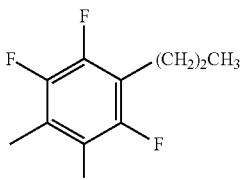 (N49)
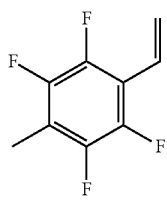 (N50)
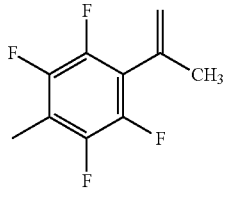 (N51)
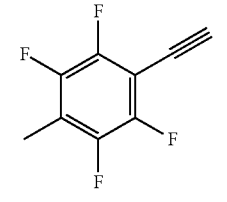 (N52)
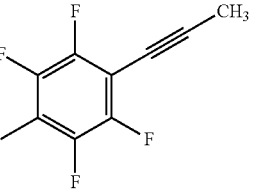 (N53)
[Chemical Formula 40]
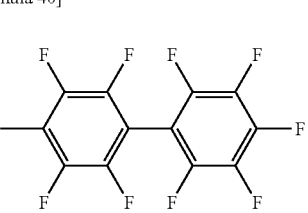 (N54)

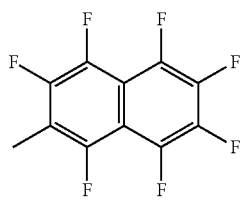 (N55)
[Chemical Formula 41]
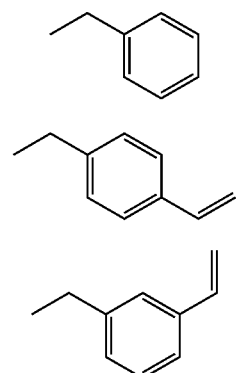 (N56)
(N57)
(N58)
(N59)
(N60)
(N61)
(N62)
(N63)
(N64)
(N65)
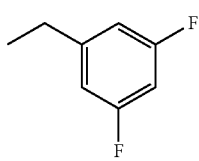 (N66)
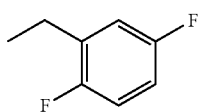 (N67)
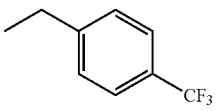 (N68)
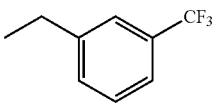 (N69)
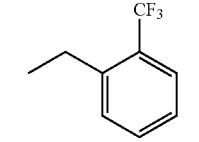 (N70)
[Chemical Formula 42]
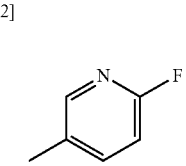 (N71)
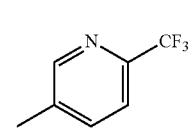 (N72)
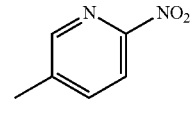 (N73)
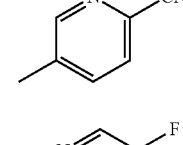 (N74)
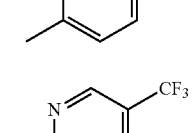 (N75)
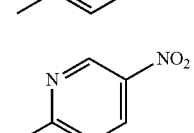 (N76)
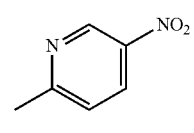 (N77)

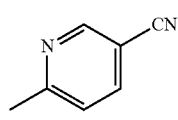
(N78)

In this invention, the number of carbon atoms on the above alkyl, alkenyl and alkynyl groups is preferably 10 or less, more preferably 6 or less, and even more preferably 4 or less. The number of carbon atoms on the above aryl groups and heteroaryl groups is preferably 14 or less, more preferably 10 or less, and even more preferably 6 or less.

The molecular weight of the arylamine derivative of formula (2) and the arylamine derivative of formula (3), from the standpoint of preparing a uniform varnish that gives a thin film having a high flatness, is generally from about 200 to about 9,500. However, from the standpoint of preparing a uniform varnish that more reproducibly gives a thin film having a high flatness, the molecular weight is preferably not more than 8,000, more preferably not more than 7,000, even more preferably not more than 6,000, and still more preferably not more than 5,000. From the standpoint of obtaining a thin film having a better charge transportability, the molecular weight is preferably at least 300, and more preferably at least 400. From the standpoint of preventing the charge transporting substance from separating out when the varnish has been formed into a thin film, the charge transporting compound preferably does not have a molecular weight distribution (dispersity=1); that is, it preferably has a single molecular weight.

The arylamine derivative of formula (2) and the arylamine derivative of (3) can be synthesized by the method of WO 2015/050253.

Specific examples of arylamine derivatives of formula (2) or (3) include, but are not limited to, those shown below. In the formulas, "Me" stands for a methyl group, "Et" for an ethyl group, "Pr$^n$" for an n-propyl group, "Pr$^i$" for an i-propyl group, "Bu$^n$" for an n-butyl group, "Bu$^i$" for an i-butyl group, "Bu$^s$" for an s-butyl group, "Bu$^t$" for a t-butyl group, "DPA" for a diphenylamino group, and "SBF" for a 9,9'-spirobi[9H-fluoren]-2-yl group.

TABLE 1

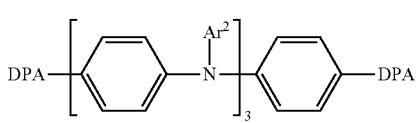
(J1)

| Compound | Ar$^2$ |
|---|---|
| (J1-1) | (A1-1) |
| (J1-2) | (A1-2) |
| (J1-3) | (A2-1) |
| (J1-4) | (A2-2) |
| (J1-5) | (A2-3) |
| (J1-6) | (A2-4) |
| (J1-7) | (A2-5) |
| (J1-8) | (A3-1) |
| (J1-9) | (A3-2) |
| (J1-10) | (A3-3) |
| (J1-11) | (A4-1) |
| (J1-12) | (A4-2) |
| (J1-13) | (A4-3) |
| (J1-14) | (A5-1) |
| (J1-15) | (A5-2) |
| (J1-16) | (A5-3) |
| (J1-17) | (A6-1) |

TABLE 1-continued

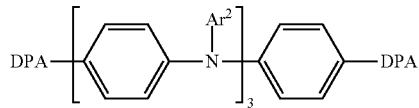
(J1)

| Compound | Ar$^2$ |
|---|---|
| (J1-18) | (A6-2) |
| (J1-19) | (A6-3) |
| (J1-20) | (A7-1) |
| (J1-21) | (A7-2) |
| (J1-22) | (A7-3) |
| (J1-23) | (A8-1) |
| (J1-24) | (A8-2) |
| (J1-25) | (A8-3) |
| (J1-26) | (A9-1) |
| (J1-27) | (A9-2) |
| (J1-28) | (A9-3) |
| (J1-29) | (A10-1) |
| (J1-30) | (A10-2) |
| (J1-31) | (A10-3) |
| (J1-32) | (A11-1) |
| (J1-33) | (A11-2) |
| (J1-34) | (A11-3) |
| (J1-35) | (A12-1) |
| (J1-36) | (A12-2) |
| (J1-37) | (A12-3) |
| (J1-38) | (A12-4) |
| (J1-39) | (A12-5) |
| (J1-40) | (A12-6) |
| (J1-41) | (A12-7) |
| (J1-42) | (A12-8) |
| (J1-43) | (A12-9) |
| (J1-44) | (A12-10) |
| (J1-45) | (A12-11) |
| (J1-46) | (A13-1) |
| (J1-47) | (A13-2) |
| (J1-48) | (A13-3) |
| (J1-49) | (A13-4) |
| (J1-50) | (A13-5) |
| (J1-51) | (A13-6) |
| (J1-52) | (A13-7) |
| (J1-53) | (A13-8) |
| (J1-54) | (A13-9) |
| (J1-55) | (A13-10) |
| (J1-56) | (A13-11) |
| (J1-57) | (A13-12) |
| (J1-58) | (A13-13) |
| (J1-59) | (A13-14) |
| (J1-60) | (A13-15) |
| (J1-61) | (A13-16) |
| (J1-62) | (A13-17) |
| (J1-63) | (A13-18) |
| (J1-64) | (A13-19) |
| (J1-65) | (A13-20) |
| (J1-66) | (A13-21) |
| (J1-67) | (A13-22) |
| (J1-68) | (A13-23) |
| (J1-69) | (A13-24) |
| (J1-70) | (A14-1) |
| (J1-71) | (A14-2) |
| (J1-72) | (A14-3) |
| (J1-73) | (A14-4) |
| (J1-74) | (A15-1) |
| (J1-75) | (A15-2) |
| (J1-76) | (A15-3) |
| (J1-77) | (A15-4) |
| (J1-78) | (A17-1) |
| (J1-79) | (A17-2) |
| (J1-80) | (A17-3) |
| (J1-81) | (A17-4) |
| (J1-82) | (A17-5) |
| (J1-83) | (A17-6) |
| (J1-84) | (A17-7) |
| (J1-85) | (A17-8) |
| (J1-86) | (A17-9) |
| (J1-87) | (A17-10) |

TABLE 1-continued (J1)

DPA—[—⌬—N(Ar²)—⌬—]₃—DPA

| Compound | Ar² |
|---|---|
| (J1-88) | (A17-11) |
| (J1-89) | (A17-12) |
| (J1-90) | (A18-1) |
| (J1-91) | (A18-2) |

TABLE 2

(J2)

DPA—[—⌬—N(Ar²)—⌬—]₄—DPA

| Compound | Ar² |
|---|---|
| (J2-1) | (A1-1) |
| (J2-2) | (A1-2) |
| (J2-3) | (A2-1) |
| (J2-4) | (A2-2) |
| (J2-5) | (A2-3) |
| (J2-6) | (A2-4) |
| (J2-7) | (A2-5) |
| (J2-8) | (A3-1) |
| (J2-9) | (A3-2) |
| (J2-10) | (A3-3) |
| (J2-11) | (A4-1) |
| (J2-12) | (A4-2) |
| (J2-13) | (A4-3) |
| (J2-14) | (A5-1) |
| (J2-15) | (A5-2) |
| (J2-16) | (A5-3) |
| (J2-17) | (A6-1) |
| (J2-18) | (A6-2) |
| (J2-19) | (A6-3) |
| (J2-20) | (A7-1) |
| (J2-21) | (A7-2) |
| (J2-22) | (A7-3) |
| (J2-23) | (A8-1) |
| (J2-24) | (A8-2) |
| (J2-25) | (A8-3) |
| (J2-26) | (A9-1) |
| (J2-27) | (A9-2) |
| (J2-28) | (A9-3) |
| (J2-29) | (A10-1) |
| (J2-30) | (A10-2) |
| (J2-31) | (A10-3) |
| (J2-32) | (A11-1) |
| (J2-33) | (A11-2) |
| (J2-34) | (A11-3) |
| (J2-35) | (A12-1) |
| (J2-36) | (A12-2) |
| (J2-37) | (A12-3) |
| (J2-38) | (A12-4) |
| (J2-39) | (A12-5) |
| (J2-40) | (A12-6) |
| (J2-41) | (A12-7) |
| (J2-42) | (A12-8) |
| (J2-43) | (A12-9) |
| (J2-44) | (A12-10) |
| (J2-45) | (A12-11) |
| (J2-46) | (A13-1) |
| (J2-47) | (A13-2) |
| (J2-48) | (A13-3) |
| (J2-49) | (A13-4) |
| (J2-50) | (A13-5) |
| (J2-51) | (A13-6) |
| (J2-52) | (A13-7) |

TABLE 2-continued (J2)

DPA—[—⌬—N(Ar²)—⌬—]₄—DPA

| Compound | Ar² |
|---|---|
| (J2-53) | (A13-8) |
| (J2-54) | (A13-9) |
| (J2-55) | (A13-10) |
| (J2-56) | (A13-11) |
| (J2-57) | (A13-12) |
| (J2-58) | (A13-13) |
| (J2-59) | (A13-14) |
| (J2-60) | (A13-15) |
| (J2-61) | (A13-16) |
| (J2-62) | (A13-17) |
| (J2-63) | (A13-18) |
| (J2-64) | (A13-19) |
| (J2-65) | (A13-20) |
| (J2-66) | (A13-21) |
| (J2-67) | (A13-22) |
| (J2-68) | (A13-23) |
| (J2-69) | (A13-24) |
| (J2-70) | (A14-1) |
| (J2-71) | (A14-2) |
| (J2-72) | (A14-3) |
| (J2-73) | (A14-4) |
| (J2-74) | (A15-1) |
| (J2-75) | (A15-2) |
| (J2-76) | (A15-3) |
| (J2-77) | (A15-4) |
| (J2-78) | (A17-1) |
| (J2-79) | (A17-2) |
| (J2-80) | (A17-3) |
| (J2-81) | (A17-4) |
| (J2-82) | (A17-5) |
| (J2-83) | (A17-6) |
| (J2-84) | (A17-7) |
| (J2-85) | (A17-8) |
| (J2-86) | (A17-9) |
| (J2-87) | (A17-10) |
| (J2-88) | (A17-11) |
| (J2-89) | (A17-12) |
| (J2-90) | (A18-1) |
| (J2-91) | (A18-2) |

TABLE 3

(J3)

DPA—[—⌬—N(carbazolyl-$R_{155}$)—⌬—]₃—DPA

| Compound | $R^{155}$ |
|---|---|
| (J3-1) | (N1) |
| (J3-2) | (N2) |
| (J3-3) | (N3) |
| (J3-4) | (N4) |
| (J3-5) | (N5) |
| (J3-6) | (N6) |
| (J3-7) | (N7) |
| (J3-8) | (N8) |
| (J3-9) | (N9) |
| (J3-10) | (N10) |

TABLE 3-continued

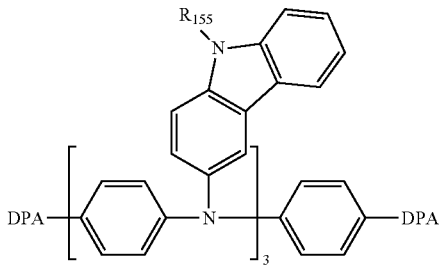

(J3)

| Compound | R[155] |
|---|---|
| (J3-11) | (N11) |
| (J3-12) | (N12) |
| (J3-13) | (N13) |
| (J3-14) | (N14) |
| (J3-15) | (N15) |
| (J3-16) | (N16) |
| (J3-17) | (N17) |
| (J3-18) | (N18) |
| (J3-19) | (N19) |
| (J3-20) | (N20) |
| (J3-21) | (N21) |
| (J3-22) | (N22) |
| (J3-23) | (N23) |
| (J3-24) | (N24) |
| (J3-25) | (N25) |
| (J3-26) | (N26) |
| (J3-27) | (N27) |
| (J3-28) | (N28) |
| (J3-29) | (N29) |
| (J3-30) | (N30) |
| (J3-31) | (N31) |
| (J3-32) | (N32) |
| (J3-33) | (N33) |
| (J3-34) | (N34) |
| (J3-35) | (N35) |
| (J3-36) | (N36) |
| (J3-37) | (N37) |
| (J3-38) | (N38) |
| (J3-39) | (N39) |
| (J3-40) | (N40) |
| (J3-41) | (N41) |
| (J3-42) | (N42) |
| (J3-43) | (N43) |
| (J3-44) | (N44) |
| (J3-45) | (N45) |
| (J3-46) | (N46) |
| (J3-47) | (N47) |
| (J3-48) | (N48) |
| (J3-49) | (N49) |
| (J3-50) | (N50) |
| (J3-51) | (N51) |
| (J3-52) | (N52) |
| (J3-53) | (N53) |
| (J3-54) | (N54) |
| (J3-55) | (N55) |
| (J3-56) | (N56) |
| (J3-57) | (N57) |
| (J3-58) | (N58) |
| (J3-59) | (N59) |
| (J3-60) | (N60) |
| (J3-61) | (N61) |
| (J3-62) | (N62) |
| (J3-63) | (N63) |
| (J3-64) | (N64) |
| (J3-65) | (N65) |
| (J3-66) | (N66) |
| (J3-67) | (N67) |
| (J3-68) | (N68) |
| (J3-69) | (N69) |
| (J3-70) | (N70) |
| (J3-71) | (N71) |
| (J3-72) | (N72) |
| (J3-73) | (N73) |

TABLE 3-continued

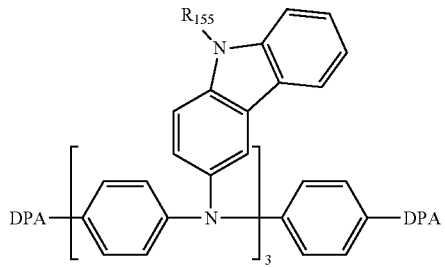

(J3)

| Compound | R[155] |
|---|---|
| (J3-74) | (N74) |
| (J3-75) | (N75) |
| (J3-76) | (N76) |
| (J3-77) | (N77) |
| (J3-78) | (N78) |
| (J3-79) | —H |
| (J3-80) | —Me |
| (J3-81) | —Et |
| (J3-82) | —Pr$^n$ |
| (J3-83) | —Pr$^i$ |
| (J3-84) | —Bu$^n$ |
| (J3-85) | —Bu$^i$ |
| (J3-86) | —Bu$^s$ |
| (J3-87) | —Bu$^t$ |

TABLE 4

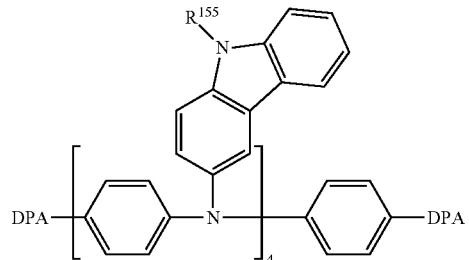

(J4)

| Compound | R[155] |
|---|---|
| (J4-1) | (N1) |
| (J4-2) | (N2) |
| (J4-3) | (N3) |
| (J4-4) | (N4) |
| (J4-5) | (N5) |
| (J4-6) | (N6) |
| (J4-7) | (N7) |
| (J4-8) | (N8) |
| (J4-9) | (N9) |
| (J4-10) | (N10) |
| (J4-11) | (N11) |
| (J4-12) | (N12) |
| (J4-13) | (N13) |
| (J4-14) | (N14) |
| (J4-15) | (N15) |
| (J4-16) | (N16) |
| (J4-17) | (N17) |
| (J4-18) | (N18) |
| (J4-19) | (N19) |
| (J4-20) | (N20) |
| (J4-21) | (N21) |
| (J4-22) | (N22) |
| (J4-23) | (N23) |
| (J4-24) | (N24) |
| (J4-25) | (N25) |
| (J4-26) | (N26) |
| (J4-27) | (N27) |
| (J4-28) | (N28) |

TABLE 4-continued (J4)

[Structure: carbazole with R¹⁵⁵ on N, bearing [−C₆H₄−N(−C₆H₄−DPA)−]₄ substituent pattern]

| Compound | R¹⁵⁵ |
|---|---|
| (J4-29) | (N29) |
| (J4-30) | (N30) |
| (J4-31) | (N31) |
| (J4-32) | (N32) |
| (J4-33) | (N33) |
| (J4-34) | (N34) |
| (J4-35) | (N35) |
| (J4-36) | (N36) |
| (J4-37) | (N37) |
| (J4-38) | (N38) |
| (J4-39) | (N39) |
| (J4-40) | (N40) |
| (J4-41) | (N41) |
| (J4-42) | (N42) |
| (J4-43) | (N43) |
| (J4-44) | (N44) |
| (J4-45) | (N45) |
| (J4-46) | (N46) |
| (J4-47) | (N47) |
| (J4-48) | (N48) |
| (J4-49) | (N49) |
| (J4-50) | (N50) |
| (J4-51) | (N51) |
| (J4-52) | (N52) |
| (J4-53) | (N53) |
| (J4-54) | (N54) |
| (J4-55) | (N55) |
| (J4-56) | (N56) |
| (J4-57) | (N57) |
| (J4-58) | (N58) |
| (J4-59) | (N59) |
| (J4-60) | (N60) |
| (J4-61) | (N61) |
| (J4-62) | (N62) |
| (J4-63) | (N63) |
| (J4-64) | (N64) |
| (J4-65) | (N65) |
| (J4-66) | (N66) |
| (J4-67) | (N67) |
| (J4-68) | (N68) |
| (J4-69) | (N69) |
| (J4-70) | (N70) |
| (J4-71) | (N71) |
| (J4-72) | (N72) |
| (J4-73) | (N73) |
| (J4-74) | (N74) |
| (J4-75) | (N75) |
| (J4-76) | (N76) |
| (J4-77) | (N77) |
| (J4-78) | (N78) |
| (J4-79) | —H |
| (J4-80) | —Me |
| (J4-81) | —Et |
| (J4-82) | —Pr$^n$ |
| (J4-83) | —Pr$^i$ |
| (J4-84) | —Bu$^n$ |
| (J4-85) | —Bu$^i$ |
| (J4-86) | —Bu$^s$ |
| (J4-87) | —Bu$^t$ |

TABLE 5

(J5)

SBF—N(Ar²)—[C₆H₄—N(Ar²)—]₃—SBF

| Compound | Ar² |
|---|---|
| (J5-1) | (A1-1) |
| (J5-2) | (A1-2) |
| (J5-3) | (A2-1) |
| (J5-4) | (A2-2) |
| (J5-5) | (A2-3) |
| (J5-6) | (A2-4) |
| (J5-7) | (A2-5) |
| (J5-8) | (A3-1) |
| (J5-9) | (A3-2) |
| (J5-10) | (A3-3) |
| (J5-11) | (A4-1) |
| (J5-12) | (A4-2) |
| (J5-13) | (A4-3) |
| (J5-14) | (A5-1) |
| (J5-15) | (A5-2) |
| (J5-16) | (A5-3) |
| (J5-17) | (A6-1) |
| (J5-18) | (A6-2) |
| (J5-19) | (A6-3) |
| (J5-20) | (A7-1) |
| (J5-21) | (A7-2) |
| (J5-22) | (A7-3) |
| (J5-23) | (A8-1) |
| (J5-24) | (A8-2) |
| (J5-25) | (A8-3) |
| (J5-26) | (A9-1) |
| (J5-27) | (A9-2) |
| (J5-28) | (A9-3) |
| (J5-29) | (A10-1) |
| (J5-30) | (A10-2) |
| (J5-31) | (A10-3) |
| (J5-32) | (A11-1) |
| (J5-33) | (A11-2) |
| (J5-34) | (A11-3) |
| (J5-35) | (A12-1) |
| (J5-36) | (A12-2) |
| (J5-37) | (A12-3) |
| (J5-38) | (A12-4) |
| (J5-39) | (A12-5) |
| (J5-40) | (A12-6) |
| (J5-41) | (A12-7) |
| (J5-42) | (A12-8) |
| (J5-43) | (A12-9) |
| (J5-44) | (A12-10) |
| (J5-45) | (A12-11) |
| (J5-46) | (A13-1) |
| (J5-47) | (A13-2) |
| (J5-48) | (A13-3) |
| (J5-49) | (A13-4) |
| (J5-50) | (A13-5) |
| (J5-51) | (A13-6) |
| (J5-52) | (A13-7) |
| (J5-53) | (A13-8) |
| (J5-54) | (A13-9) |
| (J5-55) | (A13-10) |
| (J5-56) | (A13-11) |
| (J5-57) | (A13-12) |
| (J5-58) | (A13-13) |
| (J5-59) | (A13-14) |
| (J5-60) | (A13-15) |
| (J5-61) | (A13-16) |
| (J5-62) | (A13-17) |
| (J5-63) | (A13-18) |
| (J5-64) | (A13-19) |
| (J5-65) | (A13-20) |
| (J5-66) | (A13-21) |
| (J5-67) | (A13-22) |
| (J5-68) | (A13-23) |
| (J5-69) | (A13-24) |
| (J5-70) | (A14-1) |
| (J5-71) | (A14-2) |

TABLE 5-continued
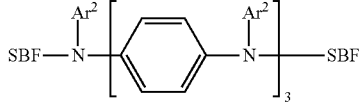
(J5)
| Compound | Ar² |
|---|---|
| (J5-72) | (A14-3) |
| (J5-73) | (A14-4) |
| (J5-74) | (A15-1) |
| (J5-75) | (A15-2) |
| (J5-76) | (A15-3) |
| (J5-77) | (A15-4) |
| (J5-78) | (A17-1) |
| (J5-79) | (A17-2) |
| (J5-80) | (A17-3) |
| (J5-81) | (A17-4) |
| (J5-82) | (A17-5) |
| (J5-83) | (A17-6) |
| (J5-84) | (A17-7) |
| (J5-85) | (A17-8) |
| (J5-86) | (A17-9) |
| (J5-87) | (A17-10) |
| (J5-88) | (A17-11) |
| (J5-89) | (A17-12) |
| (J5-90) | (A18-1) |
| (J5-91) | (A18-2) |
TABLE 6
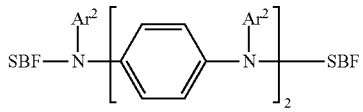
(J6)
| Compound | Ar² |
|---|---|
| (J6-1) | (A1-1) |
| (J6-2) | (A1-2) |
| (J6-3) | (A2-1) |
| (J6-4) | (A2-2) |
| (J6-5) | (A2-3) |
| (J6-6) | (A2-4) |
| (J6-7) | (A2-5) |
| (J6-8) | (A3-1) |
| (J6-9) | (A3-2) |
| (J6-10) | (A3-3) |
| (J6-11) | (A4-1) |
| (J6-12) | (A4-2) |
| (J6-13) | (A4-3) |
| (J6-14) | (A5-1) |
| (J6-15) | (A5-2) |
| (J6-16) | (A5-3) |
| (J6-17) | (A6-1) |
| (J6-18) | (A6-2) |
| (J6-19) | (A6-3) |
| (J6-20) | (A7-1) |
| (J6-21) | (A7-2) |
| (J6-22) | (A7-3) |
| (J6-23) | (A8-1) |
| (J6-24) | (A8-2) |
| (J6-25) | (A8-3) |
| (J6-26) | (A9-1) |
| (J6-27) | (A9-2) |
| (J6-28) | (A9-3) |
| (J6-29) | (A10-1) |
| (J6-30) | (A10-2) |
| (J6-31) | (A10-3) |
| (J6-32) | (A11-1) |
| (J6-33) | (A11-2) |
| (J6-34) | (A11-3) |
| (J6-35) | (A12-1) |
| (J6-36) | (A12-2) |
TABLE 6-continued
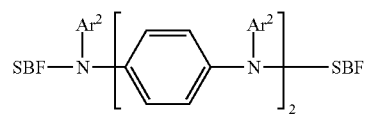
(J6)
| Compound | Ar² |
|---|---|
| (J6-37) | (A12-3) |
| (J6-38) | (A12-4) |
| (J6-39) | (A12-5) |
| (J6-40) | (A12-6) |
| (J6-41) | (A12-7) |
| (J6-42) | (A12-8) |
| (J6-43) | (A12-9) |
| (J6-44) | (A12-10) |
| (J6-45) | (A12-11) |
| (J6-46) | (A13-1) |
| (J6-47) | (A13-2) |
| (J6-48) | (A13-3) |
| (J6-49) | (A13-4) |
| (J6-50) | (A13-5) |
| (J6-51) | (A13-6) |
| (J6-52) | (A13-7) |
| (J6-53) | (A13-8) |
| (J6-54) | (A13-9) |
| (J6-55) | (A13-10) |
| (J6-56) | (A13-11) |
| (J6-57) | (A13-12) |
| (J6-58) | (A13-13) |
| (J6-59) | (A13-14) |
| (J6-60) | (A13-15) |
| (J6-61) | (A13-16) |
| (J6-62) | (A13-17) |
| (J6-63) | (A13-18) |
| (J6-64) | (A13-19) |
| (J6-65) | (A13-20) |
| (J6-66) | (A13-21) |
| (J6-67) | (A13-22) |
| (J6-68) | (A13-23) |
| (J6-69) | (A13-24) |
| (J6-70) | (A14-1) |
| (J6-71) | (A14-2) |
| (J6-72) | (A14-3) |
| (J6-73) | (A14-4) |
| (J6-74) | (A15-1) |
| (J6-75) | (A15-2) |
| (J6-76) | (A15-3) |
| (J6-77) | (A15-4) |
| (J6-78) | (A17-1) |
| (J6-79) | (A17-2) |
| (J6-80) | (A17-3) |
| (J6-81) | (A17-4) |
| (J6-82) | (A17-5) |
| (J6-83) | (A17-6) |
| (J6-84) | (A17-7) |
| (J6-85) | (A17-8) |
| (J6-86) | (A17-9) |
| (J6-87) | (A17-10) |
| (J6-88) | (A17-11) |
| (J6-89) | (A17-12) |
| (J6-90) | (A18-1) |
| (J6-91) | (A18-2) |

TABLE 7
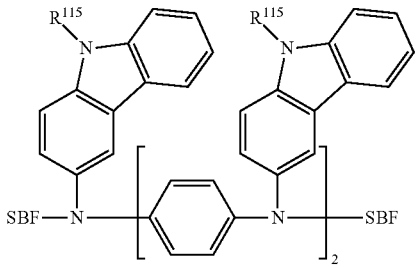
(J7)
| Compound | R[155] |
|---|---|
| (J7-1) | (N1) |
| (J7-2) | (N2) |
| (J7-3) | (N3) |
| (J7-4) | (N4) |
| (J7-5) | (N5) |
| (J7-6) | (N6) |
| (J7-7) | (N7) |
| (J7-8) | (N8) |
| (J7-9) | (N9) |
| (J7-10) | (N10) |
| (J7-11) | (N11) |
| (J7-12) | (N12) |
| (J7-13) | (N13) |
| (J7-14) | (N14) |
| (J7-15) | (N15) |
| (J7-16) | (N16) |
| (J7-17) | (N17) |
| (J7-18) | (N18) |
| (J7-19) | (N19) |
| (J7-20) | (N20) |
| (J7-21) | (N21) |
| (J7-22) | (N22) |
| (J7-23) | (N23) |
| (J7-24) | (N24) |
| (J7-25) | (N25) |
| (J7-26) | (N26) |
| (J7-27) | (N27) |
| (J7-28) | (N28) |
| (J7-29) | (N29) |
| (J7-30) | (N30) |
| (J7-31) | (N31) |
| (J7-32) | (N32) |
| (J7-33) | (N33) |
| (J7-34) | (N34) |
| (J7-35) | (N35) |
| (J7-36) | (N36) |
| (J7-37) | (N37) |
| (J7-38) | (N38) |
| (J7-39) | (N39) |
| (J7-40) | (N40) |
| (J7-41) | (N41) |
| (J7-42) | (N42) |
| (J7-43) | (N43) |
| (J7-44) | (N44) |
| (J7-45) | (N45) |
| (J7-46) | (N46) |
| (J7-47) | (N47) |
| (J7-48) | (N48) |
| (J7-49) | (N49) |
| (J7-50) | (N50) |
| (J7-51) | (N51) |
| (J7-52) | (N52) |
| (J7-53) | (N53) |
| (J7-54) | (N54) |
| (J7-55) | (N55) |
| (J7-56) | (N56) |
| (J7-57) | (N57) |
| (J7-58) | (N58) |
| (J7-59) | (N59) |
| (J7-60) | (N60) |
| (J7-61) | (N61) |
| (J7-62) | (N62) |
| (J7-63) | (N63) |
TABLE 7-continued
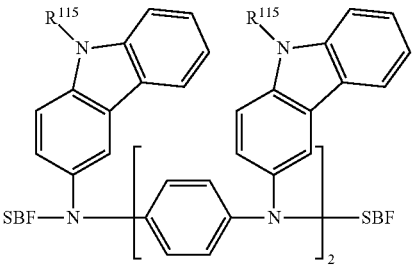
(J7)
| Compound | R[155] |
|---|---|
| (J7-64) | (N64) |
| (J7-65) | (N65) |
| (J7-66) | (N66) |
| (J7-67) | (N67) |
| (J7-68) | (N68) |
| (J7-69) | (N69) |
| (J7-70) | (N70) |
| (J7-71) | (N71) |
| (J7-72) | (N72) |
| (J7-73) | (N73) |
| (J7-74) | (N74) |
| (J7-75) | (N75) |
| (J7-76) | (N76) |
| (J7-77) | (N77) |
| (J7-78) | (N78) |
| (J7-79) | —H |
| (J7-80) | —Me |
| (J7-81) | —Et |
| (J7-82) | —Pr$^n$ |
| (J7-83) | —Pr$^i$ |
| (J7-84) | —Bu$^n$ |
| (J7-85) | —Bu$^i$ |
| (J7-86) | —Bu$^s$ |
| (J7-87) | —Bu$^t$ |
TABLE 8
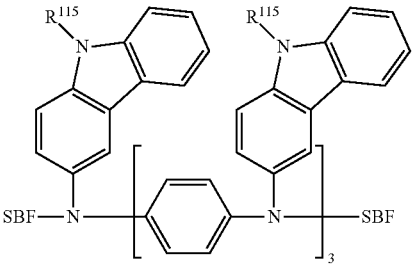
(J8)
| Compound | R[155] |
|---|---|
| (J8-1) | (N1) |
| (J8-2) | (N2) |
| (J8-3) | (N3) |
| (J8-4) | (N4) |
| (J8-5) | (N5) |
| (J8-6) | (N6) |
| (J8-7) | (N7) |
| (J8-8) | (N8) |
| (J8-9) | (N9) |
| (J8-10) | (N10) |
| (J8-11) | (N11) |
| (J8-12) | (N12) |
| (J8-13) | (N13) |
| (J8-14) | (N14) |
| (J8-15) | (N15) |
| (J8-16) | (N16) |
| (J8-17) | (N17) |
| (J8-18) | (N18) |

TABLE 8-continued
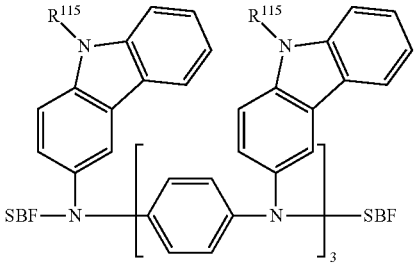
(J8)
| Compound | R[155] |
|---|---|
| (J8-19) | (N19) |
| (J8-20) | (N20) |
| (J8-21) | (N21) |
| (J8-22) | (N22) |
| (J8-23) | (N23) |
| (J8-24) | (N24) |
| (J8-25) | (N25) |
| (J8-26) | (N26) |
| (J8-27) | (N27) |
| (J8-28) | (N28) |
| (J8-29) | (N29) |
| (J8-30) | (N30) |
| (J8-31) | (N31) |
| (J8-32) | (N32) |
| (J8-33) | (N33) |
| (J8-34) | (N34) |
| (J8-35) | (N35) |
| (J8-36) | (N36) |
| (J8-37) | (N37) |
| (J8-38) | (N38) |
| (J8-39) | (N39) |
| (J8-40) | (N40) |
| (J8-41) | (N41) |
| (J8-42) | (N42) |
| (J8-43) | (N43) |
| (J8-44) | (N44) |
| (J8-45) | (N45) |
| (J8-46) | (N46) |
| (J8-47) | (N47) |
| (J8-48) | (N48) |
| (J8-49) | (N49) |
| (J8-50) | (N50) |
| (J8-51) | (N51) |
| (J8-52) | (N52) |
| (J8-53) | (N53) |
| (J8-54) | (N54) |
| (J8-55) | (N55) |
| (J8-56) | (N56) |
| (J8-57) | (N57) |
| (J8-58) | (N58) |
| (J8-59) | (N59) |
| (J8-60) | (N60) |
| (J8-61) | (N61) |
| (J8-62) | (N62) |
| (J8-63) | (N63) |
| (J8-64) | (N64) |
| (J8-65) | (N65) |
| (J8-66) | (N66) |
| (J8-67) | (N67) |
| (J8-68) | (N68) |
| (J8-69) | (N69) |
| (J8-70) | (N70) |
| (J8-71) | (N71) |
| (J8-72) | (N72) |
| (J8-73) | (N73) |
| (J8-74) | (N74) |
| (J8-75) | (N75) |
| (J8-76) | (N76) |
| (J8-77) | (N77) |
| (J8-78) | (N78) |
| (J8-79) | —H |
| (J8-80) | —Me |
| (J8-81) | —Et |
TABLE 8-continued
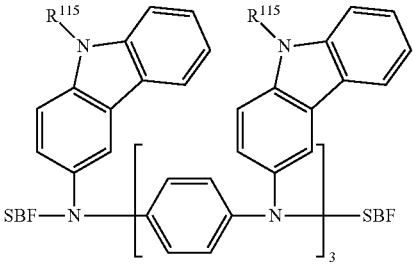
(J8)
| Compound | R[155] |
|---|---|
| (J8-82) | —Pr[n] |
| (J8-83) | —Pr[i] |
| (J8-84) | —Bu[n] |
| (J8-85) | —Bu[i] |
| (J8-86) | —Bu[s] |
| (J8-87) | —Bu[t] |
TABLE 9
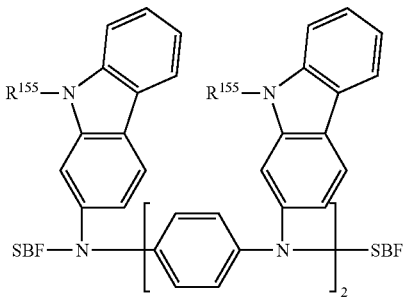
(J9)
| Compound | R[155] |
|---|---|
| (J9-1) | (N1) |
| (J9-2) | (N2) |
| (J9-3) | (N3) |
| (J9-4) | (N4) |
| (J9-5) | (N5) |
| (J9-6) | (N6) |
| (J9-7) | (N7) |
| (J9-8) | (N8) |
| (J9-9) | (N9) |
| (J9-10) | (N10) |
| (J9-11) | (N11) |
| (J9-12) | (N12) |
| (J9-13) | (N13) |
| (J9-14) | (N14) |
| (J9-15) | (N15) |
| (J9-16) | (N16) |
| (J9-17) | (N17) |
| (J9-18) | (N18) |
| (J9-19) | (N19) |
| (J9-20) | (N20) |
| (J9-21) | (N21) |
| (J9-22) | (N22) |
| (J9-23) | (N23) |
| (J9-24) | (N24) |
| (J9-25) | (N25) |
| (J9-26) | (N26) |
| (J9-27) | (N27) |
| (J9-28) | (N28) |
| (J9-29) | (N29) |
| (J9-30) | (N30) |
| (J9-31) | (N31) |
| (J9-32) | (N32) |
| (J9-33) | (N33) |
| (J9-34) | (N34) |

TABLE 9-continued (J9)

| Compound | R¹⁵⁵ |
|---|---|
| (J9-35) | (N35) |
| (J9-36) | (N36) |
| (J9-37) | (N37) |
| (J9-38) | (N38) |
| (J9-39) | (N39) |
| (J9-40) | (N40) |
| (J9-41) | (N41) |
| (J9-42) | (N42) |
| (J9-43) | (N43) |
| (J9-44) | (N44) |
| (J9-45) | (N45) |
| (J9-46) | (N46) |
| (J9-47) | (N47) |
| (J9-48) | (N48) |
| (J9-49) | (N49) |
| (J9-50) | (N50) |
| (J9-51) | (N51) |
| (J9-52) | (N52) |
| (J9-53) | (N53) |
| (J9-54) | (N54) |
| (J9-55) | (N55) |
| (J9-56) | (N56) |
| (J9-57) | (N57) |
| (J9-58) | (N58) |
| (J9-59) | (N59) |
| (J9-60) | (N60) |
| (J9-61) | (N61) |
| (J9-62) | (N62) |
| (J9-63) | (N63) |
| (J9-64) | (N64) |
| (J9-65) | (N65) |
| (J9-66) | (N66) |
| (J9-67) | (N67) |
| (J9-68) | (N68) |
| (J9-69) | (N69) |
| (J9-70) | (N70) |
| (J9-71) | (N71) |
| (J9-72) | (N72) |
| (J9-73) | (N73) |
| (J9-74) | (N74) |
| (J9-75) | (N75) |
| (J9-76) | (N76) |
| (J9-77) | (N77) |
| (J9-78) | (N78) |
| (J9-79) | —H |
| (J9-80) | —Me |
| (J9-81) | —Et |
| (J9-82) | —Pr$^n$ |
| (J9-83) | —Pr$^i$ |
| (J9-84) | —Bu$^n$ |
| (J9-85) | —Bu$^i$ |
| (J9-86) | —Bu$^s$ |
| (J9-87) | —Bu$^t$ |

TABLE 10

(J10)

| Compound | R¹⁵⁵ |
|---|---|
| (J10-1) | (N1) |
| (J10-2) | (N2) |
| (J10-3) | (N3) |
| (J10-4) | (N4) |
| (J10-5) | (N5) |
| (J10-6) | (N6) |
| (J10-7) | (N7) |
| (J10-8) | (N8) |
| (J10-9) | (N9) |
| (J10-10) | (N10) |
| (J10-11) | (N11) |
| (J10-12) | (N12) |
| (J10-13) | (N13) |
| (J10-14) | (N14) |
| (J10-15) | (N15) |
| (J10-16) | (N16) |
| (J10-17) | (N17) |
| (J10-18) | (N18) |
| (J10-19) | (N19) |
| (J10-20) | (N20) |
| (J10-21) | (N21) |
| (J10-22) | (N22) |
| (J10-23) | (N23) |
| (J10-24) | (N24) |
| (J10-25) | (N25) |
| (J10-26) | (N26) |
| (J10-27) | (N27) |
| (J10-28) | (N28) |
| (J10-29) | (N29) |
| (J10-30) | (N30) |
| (J10-31) | (N31) |
| (J10-32) | (N32) |
| (J10-33) | (N33) |
| (J10-34) | (N34) |
| (J10-35) | (N35) |
| (J10-36) | (N36) |
| (J10-37) | (N37) |
| (J10-38) | (N38) |
| (J10-39) | (N39) |
| (J10-40) | (N40) |
| (J10-41) | (N41) |
| (J10-42) | (N42) |
| (J10-43) | (N43) |
| (J10-44) | (N44) |
| (J10-46) | (N45) |
| (J10-45) | (N46) |
| (J10-47) | (N47) |
| (J10-48) | (N48) |
| (J10-49) | (N49) |
| (J10-50) | (N50) |
| (J10-51) | (N51) |
| (J10-52) | (N52) |
| (J10-53) | (N53) |
| (J10-54) | (N54) |
| (J10-55) | (N55) |
| (J10-56) | (N56) |
| (J10-57) | (N57) |
| (J10-58) | (N58) |
| (J10-59) | (N59) |
| (J10-60) | (N60) |
| (J10-61) | (N61) |
| (J10-62) | (N62) |

TABLE 10-continued
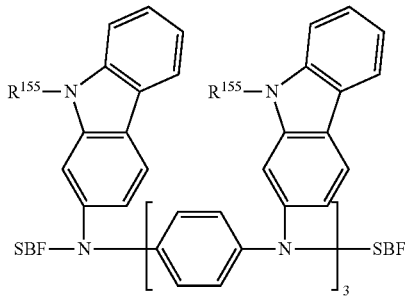
(J10)
| Compound | R¹⁵⁵ |
|---|---|
| (J10-63) | (N63) |
| (J10-64) | (N64) |
| (J10-65) | (N65) |
| (J10-66) | (N66) |
| (J10-67) | (N67) |
| (J10-68) | (N68) |
| (J10-69) | (N69) |
| (J10-70) | (N70) |
| (J10-71) | (N71) |
| (J10-72) | (N72) |
| (J10-73) | (N73) |
| (J10-74) | (N74) |
| (J10-75) | (N75) |
TABLE 10-continued
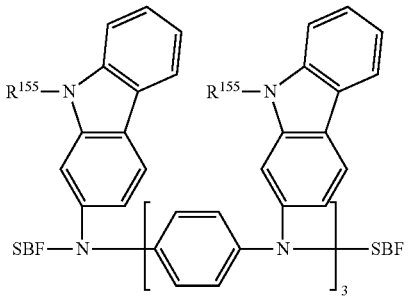
(J10)
| Compound | R¹⁵⁵ |
|---|---|
| (J10-76) | (N76) |
| (J10-77) | (N77) |
| (J10-78) | (N78) |
| (J10-79) | —H |
| (J10-80) | —Me |
| (J10-81) | —Et |
| (J10-82) | —Pr$^n$ |
| (J10-83) | —Pr$^i$ |
| (J10-84) | —Bu$^n$ |
| (J10-85) | —Bu$^i$ |
| (J10-86) | —Bu$^s$ |
| (J10-87) | —Bu$^t$ |
TABLE 11
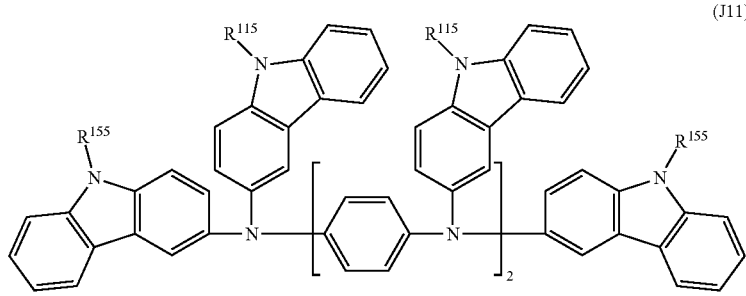
(J11)
| Compound | R¹⁵⁵ |
|---|---|
| (J11-1) | (N1) |
| (J11-2) | (N2) |
| (J11-3) | (N3) |
| (J11-4) | (N4) |
| (J11-5) | (N5) |
| (J11-6) | (N6) |
| (J11-7) | (N7) |
| (J11-8) | (N8) |
| (J11-9) | (N9) |
| (J11-10) | (N10) |
| (J11-11) | (N11) |
| (J11-12) | (N12) |
| (J11-13) | (N13) |
| (J11-14) | (N14) |
| (J11-15) | (N15) |
| (J11-16) | (N16) |
| (J11-17) | (N17) |
| (J11-18) | (N18) |
| (J11-19) | (N19) |
| (J11-20) | (N20) |
| (J11-21) | (N21) |
| (J11-22) | (N22) |
| (J11-23) | (N23) |
| (J11-24) | (N24) |
| (J11-25) | (N25) |
| (J11-26) | (N26) |
| (J11-27) | (N27) |

TABLE 11-continued
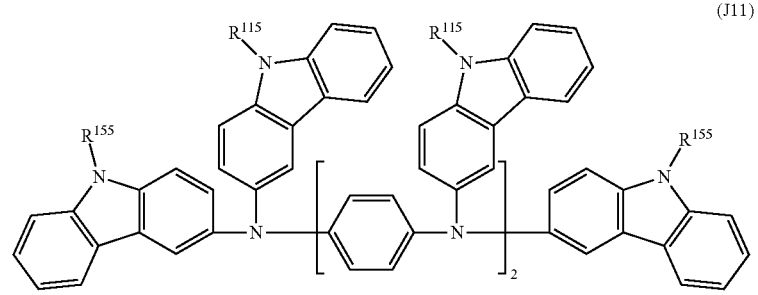
(J11)
| Compound | $R^{155}$ |
|---|---|
| (J11-28) | (N28) |
| (J11-29) | (N29) |
| (J11-30) | (N30) |
| (J11-31) | (N31) |
| (J11-32) | (N32) |
| (J11-33) | (N33) |
| (J11-34) | (N34) |
| (J11-35) | (N35) |
| (J11-36) | (N36) |
| (J11-37) | (N37) |
| (J11-38) | (N38) |
| (J11-39) | (N39) |
| (J11-40) | (N40) |
| (J11-41) | (N41) |
| (J11-42) | (N42) |
| (J11-43) | (N43) |
| (J11-44) | (N44) |
| (J11-45) | (N45) |
| (J11-46) | (N46) |
| (J11-47) | (N47) |
| (J11-48) | (N48) |
| (J11-49) | (N49) |
| (J11-50) | (N50) |
| (J11-51) | (N51) |
| (J11-52) | (N52) |
| (J11-53) | (N53) |
| (J11-54) | (N54) |
| (J11-55) | (N55) |
| (J11-56) | (N56) |
| (J11-57) | (N57) |
| (J11-58) | (N58) |
| (J11-59) | (N59) |
| (J11-60) | (N60) |
| (J11-61) | (N61) |
| (J11-62) | (N62) |
| (J11-63) | (N63) |
| (J11-64) | (N64) |
| (J11-65) | (N65) |
| (J11-66) | (N66) |
| (J11-67) | (N67) |
| (J11-68) | (N68) |
| (J11-69) | (N69) |
| (J11-70) | (N70) |
| (J11-71) | (N71) |
| (J11-72) | (N72) |
| (J11-73) | (N73) |
| (J11-74) | (N74) |
| (J11-75) | (N75) |
| (J11-76) | (N76) |
| (J11-77) | (N77) |
| (J11-78) | (N78) |
| (J11-79) | —H |
| (J11-80) | —Me |
| (J11-81) | —Et |
| (J11-82) | —Pr$^n$ |
| (J11-83) | —Pr$^i$ |
| (J11-84) | —Bu$^n$ |
| (J11-85) | —Bu$^i$ |
| (J11-86) | —Bu$^s$ |
| (J11-87) | —Bu$^t$ |

TABLE 12
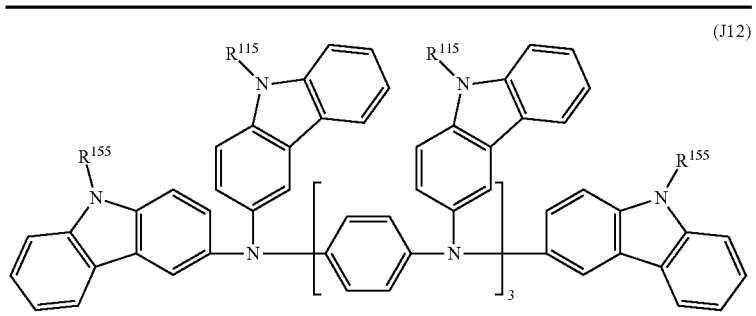
(J12)
| Compound | R¹⁵⁵ |
|---|---|
| (J12-1) | (N1) |
| (J12-2) | (N2) |
| (J12-3) | (N3) |
| (J12-4) | (N4) |
| (J12-5) | (N5) |
| (J12-6) | (N6) |
| (J12-7) | (N7) |
| (J12-8) | (N8) |
| (J12-9) | (N9) |
| (J12-10) | (N10) |
| (J12-11) | (N11) |
| (J12-12) | (N12) |
| (J12-13) | (N13) |
| (J12-14) | (N14) |
| (J12-15) | (N15) |
| (J12-16) | (N16) |
| (J12-17) | (N17) |
| (J12-18) | (N18) |
| (J12-19) | (N19) |
| (J12-20) | (N20) |
| (J12-21) | (N21) |
| (J12-22) | (N22) |
| (J12-23) | (N23) |
| (J12-24) | (N24) |
| (J12-25) | (N25) |
| (J12-26) | (N26) |
| (J12-27) | (N27) |
| (J12-28) | (N28) |
| (J12-29) | (N29) |
| (J12-30) | (N30) |
| (J12-31) | (N31) |
| (J12-32) | (N32) |
| (J12-33) | (N33) |
| (J12-34) | (N34) |
| (J12-35) | (N35) |
| (J12-36) | (N36) |
| (J12-37) | (N37) |
| (J12-38) | (N38) |
| (J12-39) | (N39) |
| (J12-40) | (N40) |
| (J12-41) | (N41) |
| (J12-42) | (N42) |
| (J12-43) | (N43) |
| (J12-44) | (N44) |
| (J12-45) | (N45) |
| (J12-46) | (N46) |
| (J12-47) | (N47) |
| (J12-48) | (N48) |
| (J12-49) | (N49) |
| (J12-50) | (N50) |
| (J12-51) | (N51) |
| (J12-52) | (N52) |
| (J12-53) | (N53) |
| (J12-54) | (N54) |
| (J12-55) | (N55) |
| (J12-56) | (N56) |
| (J12-57) | (N57) |
| (J12-58) | (N58) |
| (J12-59) | (N59) |
| (J12-60) | (N60) |
| (J12-61) | (N61) |
| (J12-62) | (N62) |
| (J12-63) | (N63) |

TABLE 12-continued
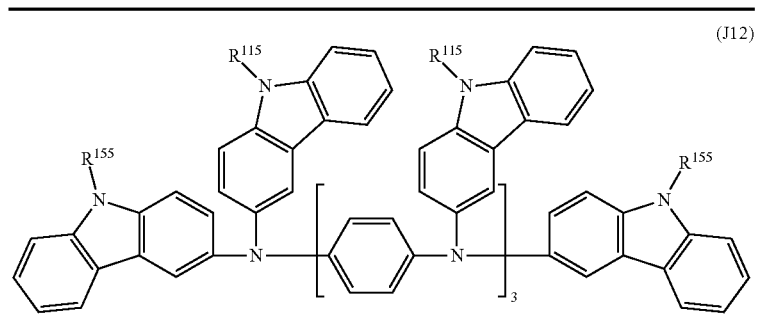
(J12)
| Compound | R[155] |
|---|---|
| (J12-64) | (N64) |
| (J12-65) | (N65) |
| (J12-66) | (N66) |
| (J12-67) | (N67) |
| (J12-68) | (N68) |
| (J12-69) | (N69) |
| (J12-70) | (N70) |
| (J12-71) | (N71) |
| (J12-72) | (N72) |
| (J12-73) | (N73) |
| (J12-74) | (N74) |
| (J12-75) | (N75) |
| (J12-76) | (N76) |
| (J12-77) | (N77) |
| (J12-78) | (N78) |
| (J12-79) | —H |
| (J12-80) | —Me |
| (J12-81) | —Et |
| (J12-82) | —Pr$^n$ |
| (J12-83) | —Pr$^i$ |
| (J12-84) | —Bu$^n$ |
| (J12-85) | —Bu$^i$ |
| (J12-86) | —Bu$^s$ |
| (J12-87) | —Bu$^t$ |
TABLE 13
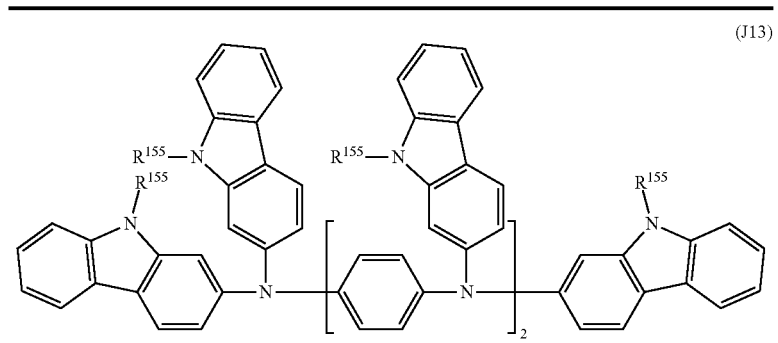
(J13)
| Compound | R[155] |
|---|---|
| (J13-1) | (N1) |
| (J13-2) | (N2) |
| (J13-3) | (N3) |
| (J13-4) | (N4) |
| (J13-5) | (N5) |
| (J13-6) | (N6) |
| (J13-7) | (N7) |
| (J13-8) | (N8) |
| (J13-9) | (N9) |
| (J13-10) | (N10) |
| (J13-11) | (N11) |
| (J13-12) | (N12) |
| (J13-13) | (N13) |
| (J13-14) | (N14) |
| (J13-15) | (N15) |

TABLE 13-continued
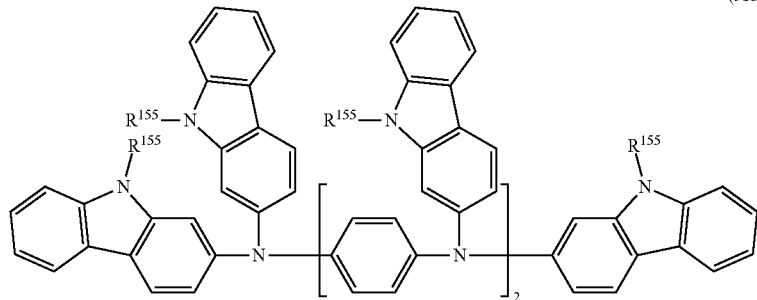
(J13)
| Compound | R¹⁵⁵ |
|---|---|
| (J13-16) | (N16) |
| (J13-17) | (N17) |
| (J13-18) | (N18) |
| (J13-19) | (N19) |
| (J13-20) | (N20) |
| (J13-21) | (N21) |
| (J13-22) | (N22) |
| (J13-23) | (N23) |
| (J13-24) | (N24) |
| (J13-25) | (N25) |
| (J13-26) | (N26) |
| (J13-27) | (N27) |
| (J13-28) | (N28) |
| (J13-29) | (N29) |
| (J13-30) | (N30) |
| (J13-31) | (N31) |
| (J13-32) | (N32) |
| (J13-33) | (N33) |
| (J13-34) | (N34) |
| (J13-35) | (N35) |
| (J13-36) | (N36) |
| (J13-37) | (N37) |
| (J13-38) | (N38) |
| (J13-39) | (N39) |
| (J13-40) | (N40) |
| (J13-41) | (N41) |
| (J13-42) | (N42) |
| (J13-43) | (N43) |
| (J13-44) | (N44) |
| (J13-45) | (N45) |
| (J13-46) | (N46) |
| (J13-47) | (N47) |
| (J13-48) | (N48) |
| (J13-49) | (N49) |
| (J13-50) | (N50) |
| (J13-51) | (N51) |
| (J13-52) | (N52) |
| (J13-53) | (N53) |
| (J13-54) | (N54) |
| (J13-55) | (N55) |
| (J13-56) | (N56) |
| (J13-57) | (N57) |
| (J13-58) | (N58) |
| (J13-59) | (N59) |
| (J13-60) | (N60) |
| (J13-61) | (N61) |
| (J13-62) | (N62) |
| (J13-63) | (N63) |
| (J13-64) | (N64) |
| (J13-65) | (N65) |
| (J13-66) | (N86) |
| (J13-67) | (N67) |
| (J13-68) | (N68) |
| (J13-68) | (N69) |
| (J13-70) | (N70) |
| (J13-71) | (N71) |
| (J13-72) | (N72) |
| (J13-73) | (N73) |
| (J13-74) | (N74) |
| (J13-76) | (N75) |
| (J13-76) | (N76) |

TABLE 13-continued
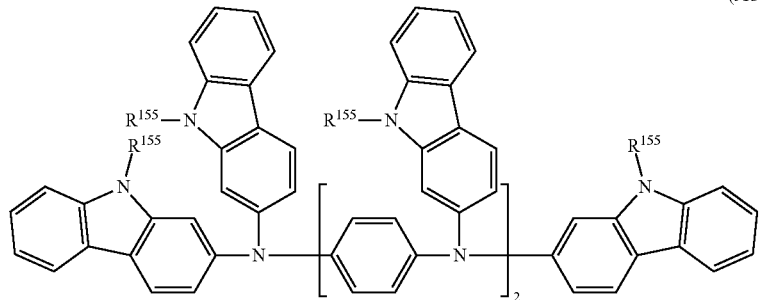
(J13)
| Compound | $R^{155}$ |
|---|---|
| (J13-77) | (N77) |
| (J13-78) | (N78) |
| (J13-79) | —H |
| (J13-80) | —Me |
| (J13-81) | —Et |
| (J13-82) | —Pr$^n$ |
| (J13-83) | —Pr$^i$ |
| (J13-84) | —Bu$^n$ |
| (J13-85) | —Bu$^i$ |
| (J13-86) | —Bu$^s$ |
| (J13-87) | —Bu$^t$ |
TABLE 14
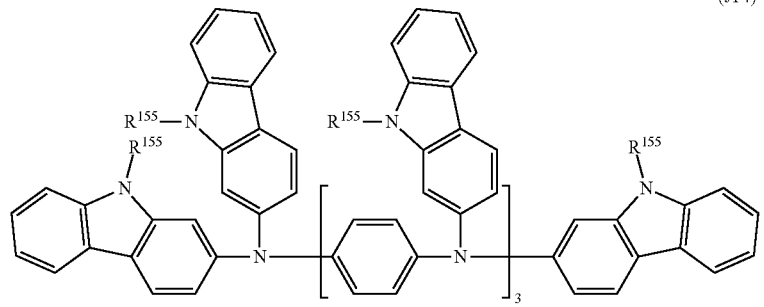
(J14)
| Compound | $R^{155}$ |
|---|---|
| (J14-1) | (N1) |
| (J14-2) | (N2) |
| (J14-3) | (N3) |
| (J14-4) | (N4) |
| (J14-5) | (N5) |
| (J14-6) | (N6) |
| (J14-7) | (N7) |
| (J14-8) | (N8) |
| (J14-9) | (N9) |
| (J14-10) | (N10) |
| (J14-11) | (N11) |
| (J14-12) | (N12) |
| (J14-13) | (N13) |
| (J14-14) | (N14) |
| (J14-15) | (N15) |
| (J14-16) | (N16) |
| (J14-17) | (N17) |
| (J14-18) | (N18) |
| (J14-19) | (N19) |
| (J14-20) | (N20) |
| (J14-21) | (N21) |
| (J14-22) | (N22) |
| (J14-23) | (N23) |
| (J14-24) | (N24) |
| (J14-25) | (N25) |
| (J14-26) | (N26) |
| (J14-27) | (N27) |

TABLE 14-continued
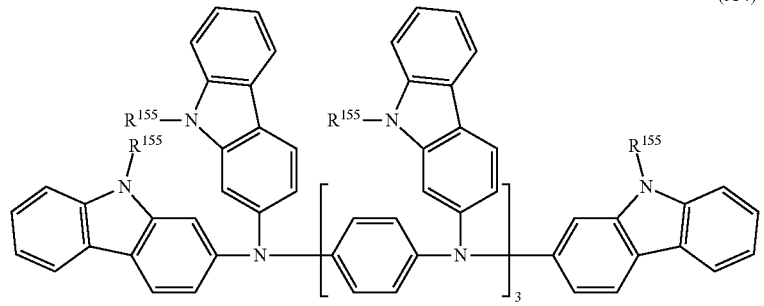
(J14)
| Compound | $R^{155}$ |
|---|---|
| (J14-28) | (N28) |
| (J14-29) | (N29) |
| (J14-30) | (N30) |
| (J14-31) | (N31) |
| (J14-32) | (N32) |
| (J14-33) | (N33) |
| (J14-34) | (N34) |
| (J14-35) | (N35) |
| (J14-36) | (N36) |
| (J14-37) | (N37) |
| (J14-38) | (N38) |
| (J14-39) | (N39) |
| (J14-40) | (N40) |
| (J14-41) | (N41) |
| (J14-42) | (N42) |
| (J14-43) | (N43) |
| (J14-44) | (N44) |
| (J14-45) | (N45) |
| (J14-46) | (N46) |
| (J14-47) | (N47) |
| (J14-48) | (N48) |
| (J14-49) | (N49) |
| (J14-50) | (N50) |
| (J14-51) | (N51) |
| (J14-52) | (N52) |
| (J14-53) | (N53) |
| (J14-54) | (N54) |
| (J14-55) | (N55) |
| (J14-56) | (N56) |
| (J14-57) | (N57) |
| (J14-58) | (N58) |
| (J14-59) | (N59) |
| (J14-60) | (N60) |
| (J14-61) | (N61) |
| (J14-62) | (N62) |
| (J14-63) | (N63) |
| (J14-64) | (N64) |
| (J14-65) | (N65) |
| (J14-56) | (N66) |
| (J14-67) | (N67) |
| (J14-68) | (N68) |
| (J14-69) | (N69) |
| (J14-70) | (N70) |
| (J14-71) | (N71) |
| (J14-72) | (N72) |
| (J14-73) | (N73) |
| (J14-74) | (N74) |
| (J14-75) | (N75) |
| (J14-76) | (N76) |
| (J14-77) | (N77) |
| (J14-78) | (N78) |
| (J14-79) | —H |
| (J14-80) | —Me |
| (J14-81) | —Et |
| (J14-82) | —$Pr^n$ |
| (J14-83) | —$Pr^i$ |
| (J14-84) | —$Bu^n$ |
| (J14-85) | —$Bu^i$ |
| (J14-86) | —$Bu^s$ |
| (J14-87) | —$Bu^t$ |

TABLE 15

(J15)

$$Ar^5-N(Ar^5)-[C_6H_4-N(Ar^5)-Ar^5]_2$$

| Compound | Ar$^5$ |
|---|---|
| (J15-1) | (A1-1) |
| (J15-2) | (A1-2) |
| (J15-3) | (A2-1) |
| (J15-4) | (A2-2) |
| (J15-5) | (A2-3) |
| (J15-6) | (A2-4) |
| (J15-7) | (A2-5) |
| (J15-8) | (A3-1) |
| (J15-9) | (A3-2) |
| (J15-10) | (A3-3) |
| (J15-11) | (A4-1) |
| (J15-12) | (A4-2) |
| (J15-13) | (A4-3) |
| (J15-14) | (A5-1) |
| (J15-15) | (A5-2) |
| (J15-16) | (A5-3) |
| (J15-17) | (A6-1) |
| (J15-18) | (A6-2) |
| (J15-19) | (A6-3) |
| (J15-20) | (A7-1) |
| (J15-21) | (A7-2) |
| (J15-22) | (A7-3) |
| (J15-23) | (A8-1) |
| (J15-24) | (A8-2) |
| (J15-25) | (A8-3) |
| (J15-26) | (A9-1) |
| (J15-27) | (A9-2) |
| (J15-28) | (A9-3) |
| (J15-29) | (A10-1) |
| (J15-30) | (A10-2) |
| (J15-31) | (A10-3) |
| (J15-32) | (A11-1) |
| (J15-33) | (A11-2) |
| (J15-34) | (A11-3) |
| (J15-35) | (A12-1) |
| (J15-36) | (A12-2) |
| (J15-37) | (A12-3) |
| (J15-38) | (A12-4) |
| (J15-39) | (A12-5) |
| (J15-40) | (A12-6) |
| (J15-41) | (A12-7) |
| (J15-42) | (A12-8) |
| (J15-43) | (A12-9) |
| (J15-44) | (A12-10) |
| (J15-45) | (A12-11) |
| (J15-46) | (A13-1) |
| (J15-47) | (A13-2) |
| (J15-48) | (A13-3) |
| (J15-49) | (A13-4) |
| (J15-50) | (A13-5) |
| (J15-51) | (A13-6) |
| (J15-52) | (A13-7) |
| (J15-53) | (A13-8) |
| (J15-54) | (A13-9) |
| (J15-55) | (A13-10) |
| (J15-56) | (A13-11) |
| (J15-57) | (A13-12) |
| (J15-58) | (A13-13) |
| (J15-59) | (A13-14) |
| (J15-60) | (A13-15) |
| (J15-61) | (A13-16) |
| (J15-62) | (A13-17) |
| (J15-63) | (A13-18) |
| (J15-64) | (A13-19) |
| (J15-65) | (A13-20) |
| (J15-66) | (A13-21) |
| (J15-67) | (A13-22) |
| (J15-68) | (A13-23) |
| (J15-69) | (A13-24) |
| (J15-70) | (A14-1) |
| (J15-71) | (A14-2) |

TABLE 15-continued (J15)

| Compound | Ar$^5$ |
|---|---|
| (J15-72) | (A14-3) |
| (J15-73) | (A14-4) |
| (J15-74) | (A15-1) |
| (J15-75) | (A15-2) |
| (J15-76) | (A15-3) |
| (J15-77) | (A15-4) |
| (J15-78) | (A17-1) |
| (J15-79) | (A17-2) |
| (J15-80) | (A17-3) |
| (J15-81) | (A17-4) |
| (J15-82) | (A17-5) |
| (J15-83) | (A17-6) |
| (J15-84) | (A17-7) |
| (J15-85) | (A17-8) |
| (J15-86) | (A17-9) |
| (J15-87) | (A17-10) |
| (J15-88) | (A17-11) |
| (J15-89) | (A17-12) |
| (J15-90) | (A18-1) |
| (J15-91) | (A18-2) |

TABLE 16

(J16)

$$Ar^5-N(Ar^5)-[C_6H_4-N(Ar^5)-Ar^5]_3$$

| Compound | Ar$^5$ |
|---|---|
| (J16-1) | (A1-1) |
| (J16-2) | (A1-2) |
| (J16-3) | (A2-1) |
| (J16-4) | (A2-2) |
| (J16-5) | (A2-3) |
| (J16-6) | (A2-4) |
| (J16-7) | (A2-5) |
| (J16-8) | (A3-1) |
| (J16-9) | (A3-2) |
| (J16-10) | (A3-3) |
| (J16-11) | (A4-1) |
| (J16-12) | (A4-2) |
| (J16-13) | (A4-3) |
| (J16-14) | (A5-1) |
| (J16-15) | (A5-2) |
| (J16-16) | (A5-3) |
| (J16-17) | (A6-1) |
| (J16-18) | (A6-2) |
| (J16-19) | (A6-3) |
| (J16-20) | (A7-1) |
| (J16-21) | (A7-2) |
| (J16-22) | (A7-3) |
| (J16-23) | (A8-1) |

TABLE 16-continued
(J16)
$$Ar^5-N(Ar^5)-[\text{phenylene}]-N(Ar^5)-Ar^5]_3$$
| Compound | Ar⁵ |
|---|---|
| (J16-24) | (A8-2) |
| (J16-25) | (A8-3) |
| (J16-26) | (A9-1) |
| (J16-27) | (A9-2) |
| (J16-28) | (A9-3) |
| (J16-29) | (A10-1) |
| (J16-30) | (A10-2) |
| (J16-31) | (A10-3) |
| (J16-32) | (A11-1) |
| (J16-33) | (A11-2) |
| (J16-34) | (A11-3) |
| (J16-35) | (A12-1) |
| (J16-36) | (A12-2) |
| (J16-37) | (A12-3) |
| (J16-38) | (A12-4) |
| (J16-39) | (A12-5) |
| (J16-40) | (A12-6) |
| (J16-41) | (A12-7) |
| (J16-42) | (A12-8) |
| (J16-43) | (A12-9) |
| (J16-44) | (A12-10) |
| (J16-45) | (A12-11) |
| (J16-46) | (A13-1) |
| (J16-47) | (A13-2) |
| (J16-48) | (A13-3) |
| (J16-49) | (A13-4) |
| (J16-50) | (A13-5) |
| (J16-51) | (A13-6) |
TABLE 16-continued
(J16)
| Compound | Ar⁵ |
|---|---|
| (J16-52) | (A13-7) |
| (J16-53) | (A13-8) |
| (J16-54) | (A13-9) |
| (J16-55) | (A13-10) |
| (J16-56) | (A13-11) |
| (J16-57) | (A13-12) |
| (J16-58) | (A13-13) |
| (J16-59) | (A13-14) |
| (J16-60) | (A13-15) |
| (J16-61) | (A13-16) |
| (J16-62) | (A13-17) |
| (J16-63) | (A13-18) |
| (J16-64) | (A13-19) |
| (J16-65) | (A13-20) |
| (J16-66) | (A13-21) |
| (J16-67) | (A13-22) |
| (J16-68) | (A13-23) |
| (J16-69) | (A13-24) |
| (J16-70) | (A14-1) |
| (J16-71) | (A14-2) |
| (J16-72) | (A14-3) |
| (J16-73) | (A14-4) |
| (J16-74) | (A15-1) |
| (J16-75) | (A15-2) |
| (J16-76) | (A15-3) |
| (J16-77) | (A15-4) |
| (J16-78) | (A17-1) |
| (J16-79) | (A17-2) |
| (J16-80) | (A17-3) |
| (J16-81) | (A17-4) |
| (J16-82) | (A17-5) |
| (J16-83) | (A17-6) |
| (J16-84) | (A17-7) |
| (J16-85) | (A17-8) |
| (J16-86) | (A17-9) |
| (J16-87) | (A17-10) |
| (J16-88) | (A17-11) |
| (J16-89) | (A17-12) |
| (J16-90) | (A18-1) |
| (J16-91) | (A18-2) |
TABLE 17
(J17)
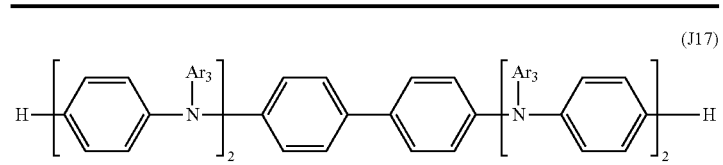
| Compound | Ar³ |
|---|---|
| (J17-1) | (C1') |
| (J17-2) | (C2') |
| (J17-3) | (C3') |
| (J17-4) | (C4') |
| (J17-5) | (C5') |
| (J17-6) | (C6') |
| (J17-7) | (C7') |
| (J17-8) | (C8') |

TABLE 18

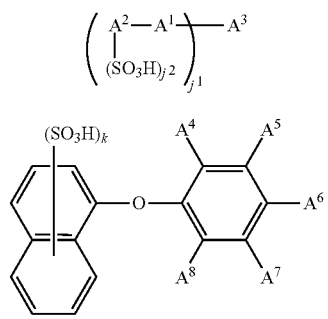

| Compound | Ar³ |
|---|---|
| (J18-1) | (C1') |
| (J18-2) | (C2') |
| (J18-3) | (C3') |
| (J18-4) | (C4') |
| (J18-5) | (C5') |
| (J18-6) | (C6') |
| (J18-7) | (C7') |
| (J18-8) | (C8') |

The content of the charge transporting substance in the varnish of the invention is suitably set while taking into account the viscosity, surface tension and other properties of the varnish and the thickness and other properties of the thin film to be formed, with the content in the varnish generally being from about 0.1 to about 10.0 wt %. To increase the coatability of the varnish, the content is preferably from about 0.5 to about 5.0 wt %, and more preferably from about 1.0 to about 3.0 wt %.

From the standpoint of further enhancing the charge transportability of the thin film to be obtained, the charge-transporting thin film-forming varnish of the invention may include a dopant. The dopant is not particularly limited, although an arylsulfonic acid is preferred. Exemplary arylsulfonic acids include those of formula (4) or (5).

[Chemical Formula 43]

$$\left( \begin{array}{c} A^2—A^1 \\ | \\ (SO_3H)_{j2} \end{array} \right)_{j1} A^3 \quad (4)$$

$$\begin{array}{c} (SO_3H)_k \quad A^4 \quad A^5 \\ \phantom{xx} \\ \phantom{xx}—O—\phantom{xx}—A^6 \\ A^8 \quad A^7 \end{array} \quad (5)$$

In formula (4), $A^1$ represents —O— or —S—, with —O— being preferred. $A^2$ represents a naphthalene ring or an anthracene ring, with a naphthalene ring being preferred. $A^3$ represents a divalent to tetravalent perfluorobiphenyl group and the subscript $j^1$ represents the number of bonds between $A^1$ and $A^3$, this being an integer that satisfies the condition $2 \leq j^1 \leq 4$. It is preferable for $A^3$ to be a divalent perfluorobiphenyl group, and for $j^1$ to be 2. The subscript $j^2$ represents the number of sulfonic acid groups that are bonded to $A^2$, this being an integer that satisfies the condition $1 \leq j^2 \leq 4$, and preferably 2.

In formula (5), $A^4$ to $A^8$ are each independently a hydrogen atom, a halogen atom, a cyano group, an alkyl group of 1 to 20 carbon atoms, a halogenated alkyl group of 1 to 20 carbon atoms or a halogenated alkenyl group of 2 to 20 carbon atoms. At least three of $A^4$ to $A^8$ are halogen atoms. The subscript k represents the number of sulfonic acid groups that are bonded to the naphthalene ring, this being an integer that satisfies the condition 1 s k s 4, preferably from 2 to 4, and more preferably 2.

Examples of halogenated alkyl groups of 1 to 20 carbon atoms include trifluoromethyl, 2,2,2-trifluoroethyl, 1,1,2,2,2-pentafluoroethyl, 3,3,3-trifluoropropyl, 2,2,3,3,3-pentafluoropropyl, 1,1,2,2,3,3,3-heptafluoropropyl, 4,4,4-trifluorobutyl, 3,3,4,4,4-pentafluorobutyl, 2,2,3,3,4,4,4-heptafluorobutyl and 1,1,2,2,3,3,4,4,4-nonafluorobutyl groups. Examples of halogenated alkenyl groups of 2 to 20 carbon atoms include perfluorovinyl, 1-perfluoropropenyl, perfluoroallyl and perfluorobutenyl groups.

The halogen atoms and alkyl groups of 1 to 20 carbons are exemplified in the same way as above, although the halogen atoms are preferably fluorine atoms.

Of these, $A^4$ to $A^8$ are each preferably a hydrogen atom, a halogen atom, a cyano group, an alkyl group of 1 to 10 carbon atoms, a halogenated alkyl group of 1 to 10 carbon atoms or a halogenated alkenyl group of 2 to 10 carbon atoms, with at least three of $A^4$ to $A^8$ being fluorine atoms; more preferably a hydrogen atom, a fluorine atom, a cyano group, an alkyl group of 1 to 5 carbon atoms, a fluorinated alkyl group of 1 to 5 carbon atoms or a fluorinated alkenyl group of 2 to 5 carbon atoms, with at least three of $A^4$ to A8 being fluorine atoms; and even more preferably a hydrogen atom, a fluorine atom, a cyano group, a perfluoroalkyl group of 1 to 5 carbon atoms or a perfluoroalkenyl group of 1 to 5 carbon atoms, with $A^4$, $A^5$ and $A^8$ being fluorine atoms.

As used herein, "perfluoroalkyl group" refers to an alkyl group in which all the hydrogen atoms are substituted with fluorine atoms, and "perfluoroalkenyl group" refers to an alkenyl group in which all the hydrogen atoms are substituted with fluorine atoms.

Illustrative examples of the above-described arylsulfonic acids include, but are not limited to, the following.

[Chemical Formula 44]

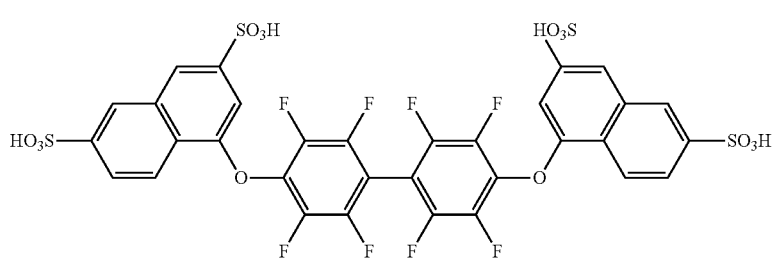

(b-1)

-continued

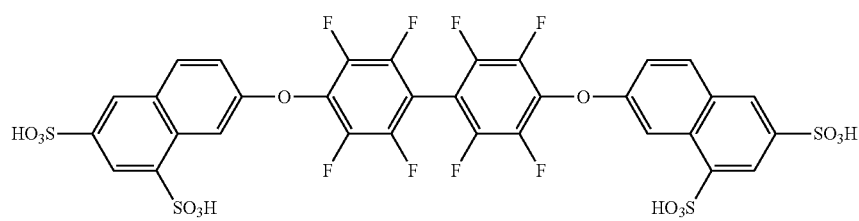
(b-2)

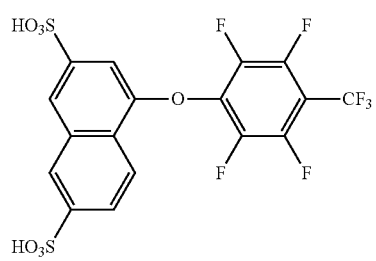
(b-3)

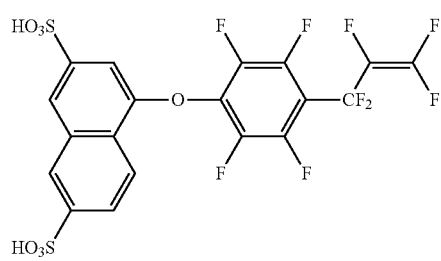
(b-4)

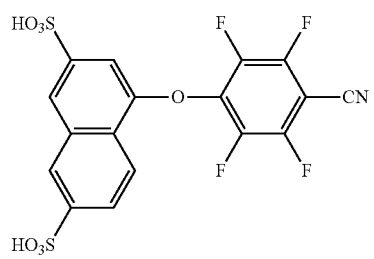
(b-5)

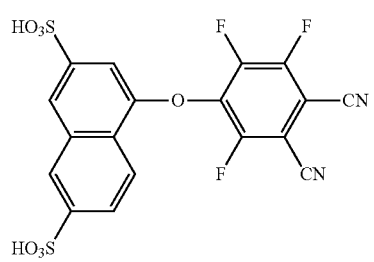
(b-6)

The dopant content in the varnish of the invention is suitably set while taking into account, for example, the type and amount of the charge-transporting substance. However, expressed as a weight ratio with respect to the charge-transporting substance, the content is generally from about 0.5 to about 10.

Other ingredients may be included in the charge-transporting thin film-forming varnish of the invention, such as an organic silane compound (e.g., trimethoxysilane, triethoxysilane) for such purposes as to adjust the properties of the charge-transporting thin film to be obtained, or a fluorine atom-containing oligoaniline derivative for such purposes as to increase the hole injecting ability of the thin film. The contents of such other ingredients in the charge-transporting thin film-forming varnish of the invention are not particularly limited so long as including these ingredients does not detract from the advantageous effects of the invention, and are determined according to the nature, function and other aspects of the other ingredients. For example, for fluorine atom-containing oligoaniline derivatives, the content with respect to the charge-transporting substance is generally from about 5 wt % to about 50 wt %, and preferably from about 10 wt % to about 30 wt %.

Preferred examples of such fluorine atom-containing oligoaniline derivatives include those of formula (6) below.

[Chemical Formula 45]

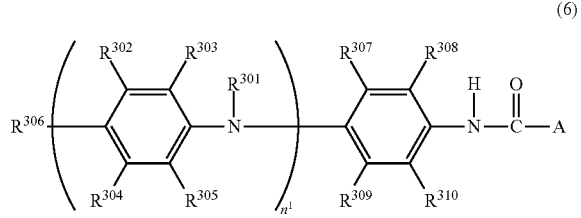

(6)

In this formula, $R^{301}$ is a hydrogen atom, or an alkyl group of 1 to 20 carbon atoms which may be substituted with Z. Z is a halogen atom, a nitro group, a cyano group, an aldehyde group, a hydroxyl group, a thiol group, a sulfonic acid group, a carboxyl group, an aryl group of 6 to 20 carbon atoms which may be substituted with Z' or a heteroaryl group of 2 to 20 carbon atoms which may be substituted with Z'. Z' is a halogen atom, a nitro group, a cyano group, an aldehyde group, a hydroxyl group, a thiol group, a sulfonic acid group or a carboxyl group.

$R^{302}$ to $R^{310}$ are each independently a hydrogen atom, a halogen atom, a nitro group, a cyano group, or an alkyl group of 1 to 20 carbon atoms, alkenyl group of 2 to 20 carbon atoms, alkynyl group of 2 to 20 carbon atoms, aryl group of 6 to 20 carbon atoms or heteroaryl group of 2 to 20 carbon atoms which may be substituted with a halogen atom.

The halogen atom, alkyl group of 1 to 20 carbon atoms, alkenyl group of 2 to 20 carbon atoms, alkynyl group of 2 to 20 carbon atoms, aryl group of 6 to 20 carbon atoms and heteroaryl group of 2 to 20 carbon atoms are exemplified in the same way as described above.

Taking into account the solubility of the fluorine atom-containing oligoaniline derivative in organic solvents, $R^{301}$ is preferably a hydrogen atom or an alkyl group of 1 to 10 carbon atoms which may be substituted with Z, more preferably a hydrogen atom or an alkyl group of 1 to 4 carbon atoms which may be substituted with Z, and most preferably a hydrogen atom. When the fluorine atom-containing oligoaniline derivative has a plurality of $R^{301}$ groups, they may each be the same or may differ.

Taking into account the solubility of the fluorine atom-containing oligoaniline derivative in organic solvents, $R^{302}$ to $R^{310}$ are preferably hydrogen atoms, halogen atoms, nitro groups, cyano groups or alkyl groups of 1 to 10 carbon atoms which may be substituted with halogen atoms, more preferably hydrogen atoms, halogen atoms or alkyl groups of 1 to 4 carbon atoms which may be substituted with halogen atoms, and most preferably hydrogen atoms. When the fluorine atom-containing oligoaniline derivative has a plurality of $R^{302}$ to $R^{305}$ groups, they may each be the same or may differ.

In formula (6), A is a fluoroalkyl group of 1 to 20 carbon atoms, fluorocycloalkyl group of 3 to 20 carbon atoms, fluorobicycloalkyl group of 4 to 20 carbon atoms, fluoroalkenyl group of 2 to 20 carbon atoms or fluoroalkynyl group of 2 to 20 carbon atoms which may be substituted with a cyano group, a chlorine atom, a bromine atom, an iodine atom, a nitro group or a fluoroalkoxy group of 1 to 20 carbon atoms; a fluoroaryl group which may be substituted with a cyano group, a chlorine atom, a bromine atom, an iodine atom, a nitro group, an alkyl group of 1 to 20 carbon atoms, a fluoroalkyl group of 1 to 20 carbon atoms or a fluoroalkoxy group of 1 to 20 carbon atoms; an aryl group of 6 to 20 carbon atoms which is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms, and which may be substituted with a cyano group, a halogen atom or a fluoroalkoxy group of 1 to 20 carbon atoms; a fluoroaralkyl group of 7 to 20 carbon atoms which may be substituted with a cyano group, a chlorine atom, a bromine atom, an iodine atom, a nitro group, a fluoroalkoxy group of 1 to 20 carbon atoms, a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms; or an aralkyl group of 7 to 20 carbon atoms which is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms, and which may be substituted with a cyano group, a halogen atom or a fluoroalkoxy group of 1 to 20 carbon atoms.

The fluoroalkyl group is not particularly limited, provided that it is a linear or branched alkyl group in which at least one hydrogen atom on a carbon atom is substituted with a fluorine atom. Illustrative examples include fluoromethyl, difluoromethyl, trifluoromethyl, 1-fluoroethyl, 2-fluoroethyl, 1,2-difluoroethyl, 1,1-difluoroethyl, 2,2-difluoroethyl, 1,1,2-trifluoroethyl, 1,2,2-trifluoroethyl, 2,2,2-trifluoroethyl, 1,1,2,2-tetrafluoroethyl, 1,2,2,2-tetrafluoroethyl, 1,1,2,2,2-pentafluoroethyl, 1-fluoropropyl, 2-fluoropropyl, 3-fluoropropyl, 1,1-difluoropropyl, 1,2-difluoropropyl, 1,3-difluoropropyl, 2,2-difluoropropyl, 2,3-difluoropropyl, 3,3-difluoropropyl, 1,1,2-trifluoropropyl, 1,1,3-trifluoropropyl, 1,2,3-trifluoropropyl, 1,3,3-trifluoropropyl, 2,2,3-trifluoropropyl, 2,3,3-trifluoropropyl, 3,3,3-trifluoropropyl, 1,1,2,2-tetrafluoropropyl, 1,1,2,3-tetrafluoropropyl, 1,2,2,3-tetrafluoropropyl, 1,3,3,3-tetrafluoropropyl, 2,2,3,3-tetrafluoropropyl, 2,3,3,3-tetrafluoropropyl, 1,1,2,2,3-pentafluoropropyl, 1,2,2,3,3-pentafluoropropyl, 1,1,3,3,3-pentafluoropropyl, 1,2,3,3,3-pentafluoropropyl, 2,2,3,3,3-pentafluoropropyl and heptafluoropropyl groups.

The fluorocycloalkyl group is not particularly limited, provided that it is a cycloalkyl group in which at least one hydrogen atom on a carbon atom is substituted with a fluorine atom. Illustrative examples include 1-fluorocyclopropyl, 2-fluorocyclopropyl, 2,2-difluorocyclopropyl, 2,2,3,3-tetrafluorocyclopropyl, pentafluorocyclopropyl, 2,2-difluorocyclobutyl, 2,2,3,3-tetrafluorocyclobutyl, 2,2,3,3,4,4-hexafluorocyclobutyl, heptafluorocyclobutyl, 1-fluorocyclopentyl, 3-fluorocyclopentyl, 3,3-difluorocyclopentyl, 3,3,4,4-tetrafluorocyclopentyl, nonafluorocyclopentyl, 1-fluorocyclohexyl, 2-fluorocyclohexyl, 4-fluorocyclohexyl, 4,4-difluorocyclohexyl, 2,2,3,3-tetrafluorocyclohexyl, 2,3,4,5,6-pentafluorocyclohexyl and undecafluorocyclohexyl groups.

The fluorobicycloalkyl group is not particularly limited, provided that it is a bicycloalkyl group in which at least one hydrogen atom on a carbon atom is substituted with a fluorine atom. Illustrative examples include 3-fluorobicyclo[1.1.0]butan-1-yl, 2,2,4,4-tetrafluorobicyclo[1.1.0]butan-1-yl, pentafluorobicyclo[1.1.0]butan-1-yl, 3-fluorobicyclo[1.1.1]pentan-1-yl, 2,2,4,4,5-pentafluorobicyclo[1.1.1]pentan-1-yl, 2,2,4,4,5,5-hexafluorobicyclo[1.1.1]pentan-1-yl, 5-fluorobicyclo[3.1.0]hexan-6-yl, 6-fluorobicyclo[3.1.0]hexan-6-yl, 6,6-difluorobicyclo[3.1.0]hexan-2-yl, 2,2,3,3,5,5,6,6-octafluorobicyclo[2.2.0]hexan-1-yl, 1-fluorobicyclo[2.2.1]heptan-2-yl, 3-fluorobicyclo[2.2.1]heptan-2-yl, 4-fluorobicyclo[2.2.1]heptan-1-yl, 5-fluorobicyclo[3.1.1]heptan-1-yl, 1,3,3,4,5,5,6,6,7,7-decafluorobicyclo[2.2.1]heptan-2-yl, undecafluorobicyclo[2.2.1]heptan-2-yl, 3-fluorobicyclo[2.2.2]octan-1-yl and 4-fluorobicyclo[2.2.2]octan-1-yl groups.

The fluoroalkenyl group is not particularly limited, provided that it is an alkenyl group in which at least one hydrogen atom on a carbon atom is substituted with a fluorine atom. Illustrative examples include 1-fluoroethenyl, 2-fluoroethenyl, 1,2-difluoroethenyl, 1,2,2-trifluoroethenyl, 2,3,3-trifluoro-1-propenyl, 3,3,3-trifluoro-1-propenyl, 2,3,3,3-tetrafluoro-1-propenyl, pentafluoro-1-propenyl, 1-fluoro-2-propenyl, 1,1-difluoro-2-propenyl, 2,3-difluoro-2-propenyl, 3,3-difluoro-2-propenyl, 2,3,3-trifluoro-2-propenyl, 1,2,3,3-tetrafluoro-2-propenyl and pentafluoro-2-propenyl groups.

The fluoroalkynyl group is not particularly limited, provided that it is an alkynyl group in which at least one hydrogen atom on a carbon atom is substituted with a fluorine atom. Illustrative examples include fluoroethynyl, 3-fluoro-1-propynyl, 3,3-difluoro-1-propynyl, 3,3,3-trifluoro-1-propynyl, 1-fluoro-2-propynyl and 1,1-difluoro-2-propynyl groups.

The fluoroaryl group is not particularly limited, provided that it is an aryl group in which at least one hydrogen atom on a carbon atom is substituted with a fluorine atom. Illustrative examples include 2-fluorophenyl, 3-fluorophenyl, 4-fluorophenyl, 2,3-difluorophenyl, 2,4-difluorophenyl, 2,5-difluorophenyl, 2,6-difluorophenyl, 3,4-difluorophenyl, 3,5-difluorophenyl, 2,3,4-trifluorophenyl, 2,3,5-trifluorophenyl, 2,3,6-trifluorophenyl, 2,4,5-trifluorophenyl, 2,4,6-trifluorophenyl, 3,4,5-trifluorophenyl, 2,3,4,5-tetrafluorophenyl, 2,3,4,6-tetrafluorophenyl, 2,3,5,6-tetrafluorophenyl, pentafluorophenyl, 2-fluoro-1-naphthyl, 3-fluoro-1-naphthyl, 4-fluoro-1-naphthyl, 6-fluoro-1-naphthyl, 7-fluoro-1-naphthyl, 8-fluoro-1-naphthyl, 4,5-difluoro-1-naphthyl, 5,7-difluoro-1-naphthyl, 5,8-difluoro-1-naphthyl, 5,6,7,8-tetrafluoro-1-naphthyl, heptafluoro-1-naphthyl, 1-fluoro-2-naphthyl, 5-fluoro-2-naphthyl, 6-fluoro-2-naphthyl, 7-fluoro-2-naphthyl, 5,7-difluoro-2-naphthyl and heptafluoro-2-naphthyl groups.

Taking into account the balance between the solubility of the fluorine atom-containing oligoaniline derivative in organic solvents and the availability of the starting materials for the fluorine atom-containing oligoaniline derivative, the fluoroaryl group is preferably a phenyl group which is substituted with 3 or more fluorine atoms and may be substituted with a cyano group, a chlorine atom, a bromine atom, an iodine atom, a nitro group, an alkyl group of 1 to 20 carbon atoms, a fluoroalkyl group of 1 to 20 carbon atoms or a fluoroalkoxy group of 1 to 20 carbon atoms.

The fluoroalkoxy group is not particularly limited, provided that it is an alkoxy group in which at least one hydrogen atom on a carbon atom is substituted with a fluorine atom. Illustrative examples include fluoromethoxy, difluoromethoxy, trifluoromethoxy, 1-fluoroethoxy, 2-fluoroethoxy, 1,2-difluoroethoxy, 1,1-difluoroethoxy, 2,2-difluoroethoxy, 1,1,2-trifluoroethoxy, 1,2,2-trifluoroethoxy, 2,2,2-trifluoroethoxy, 1,1,2,2-tetrafluoroethoxy, 1,2,2,2-tetrafluoroethoxy, 1,1,2,2,2-pentafluoroethoxy, 1-fluoropropoxy, 2-fluoropropoxy, 3-fluoropropoxy, 1,1-difluoropropoxy, 1,2-difluoropropoxy, 1,3-difluoropropoxy, 2,2-difluoropropoxy, 2,3-difluoropropoxy, 3,3-difluoropropoxy, 1,1,2-trifluoropropoxy, 1,1,3-trifluoropropoxy, 1,2,3-trifluoropropoxy, 1,3,3-trifluoropropoxy, 2,2,3-trifluoropropoxy, 2,3,3-trifluoropropoxy, 3,3,3-trifluoropropoxy, 1,1,2,2-tetrafluoropropoxy, 1,1,2,3-tetrafluoropropoxy, 1,2,2,3-tetrafluoropropoxy, 1,3,3,3-tetrafluoropropoxy, 2,2,3,3-tetrafluoropropoxy, 2,3,3,3-tetrafluoropropoxy, 1,1,2,2,3-pentafluoropropoxy, 1,2,2,3,3-pentafluoropropoxy, 1,1,3,3,3-pentafluoropropoxy, 1,2,3,3,3-pentafluoropropoxy, 2,2,3,3,3-pentafluoropropoxy and heptafluoropropoxy groups.

The aryl group of 6 to 20 carbon atoms which is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms and which may be substituted with a cyano group, a halogen atom or a fluoroalkoxy group of 1 to 20 carbon atoms (which aryl group is also referred to below, for the sake of convenience, as a "substituted aryl group") is not particularly limited provided that it is an aryl group in which at least one hydrogen atom on a carbon atom is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms. Illustrative examples include 2-(trifluoromethyl)phenyl, 3-(trifluoromethyl)phenyl, 4-(trifluoromethyl)phenyl, 4-ethoxy-3-(trifluoromethyl)phenyl, 3-fluoro-4-trifluoromethylphenyl, 4-fluoro-3-trifluoromethylphenyl, 4-fluoro-2-trifluoromethylphenyl, 2-fluoro-5-(trifluoromethyl)phenyl, 3-fluoro-5-(trifluoromethyl)phenyl, 3,5-di(trifluoromethyl)phenyl, 2,4,6-tri(trifluoromethyl)phenyl, 4-(pentafluoroethyl)phenyl, 4-(3,3,3-trifluoropropyl)phenyl, 2,3,5,6-tetrafluoro-4-trifluoromethylphenyl, 4-(perfluorovinyl)phenyl, 4-(perfluoropropenyl)phenyl and 4-(perfluorobutenyl)phenyl groups.

Taking into account the balance between the solubility of the fluorine atom-containing oligoaniline derivative in organic solvents and the availability of the starting materials for the fluorine atom-containing oligoaniline derivative, the substituted aryl group is preferably a phenyl group which is substituted with a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms and which may be substituted with a cyano group, a halogen atom or a fluoroalkoxy group of 1 to 20 carbon atoms (which phenyl group is also referred to below, for the sake of convenience, as a "substituted phenyl group"); more preferably a phenyl group which is substituted with 1 to 3 trifluoromethyl groups; and even more preferably a p-trifluoromethylphenyl group.

The fluoroaralkyl group is not particularly limited, provided that it is an aralkyl group in which at least one hydrogen atom on a carbon atom is substituted with a fluorine atom. Illustrative examples include 2-fluorobenzyl, 3-fluorobenzyl, 4-fluorobenzyl, 2,3-difluorobenzyl, 2,4-difluorobenzyl, 2,5-difluorobenzyl, 2,6-difluorobenzyl, 3,4-difluorobenzyl, 3,5-difluorobenzyl, 2,3,4-trifluorobenzyl, 2,3,5-trifluorobenzyl, 2,3,6-trifluorobenzyl, 2,4,5-trifluorobenzyl, 2,4,6-trifluorobenzyl, 2,3,4,5-tetrafluorobenzyl, 2,3,4,6-tetrafluorobenzyl, 2,3,5,6-tetrafluorobenzyl and 2,3,4,5,6-pentafluorobenzyl groups.

The aralkyl group of 7 to 20 carbon atoms which is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms, and which may be substituted with a cyano group, a halogen atom or a fluoroalkoxy group of 1 to 20 carbon atoms, is not particularly limited, provided that it is an aralkyl group in which at least one hydrogen atom on a carbon atom is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms. Illustrative examples include 2-trifluoromethylbenzyl, 3-trifluoromethylbenzyl, 4-trifluoromethylbenzyl, 2,4-di(trifluoromethyl)benzyl, 2,5-di(trifluoromethyl)benzyl, 2,6-di(trifluoromethyl)benzyl, 3,5-di(trifluoromethyl)benzyl and 2,4,6-tri(trifluoromethyl)benzyl groups.

Of these, A is preferably the above-described fluoroalkyl group of 1 to 20 carbon atoms which may be substituted, the above-described fluoroaryl group of 6 to 20 carbon atoms which may be substituted or the above-described substituted aryl group; more preferably the above-described fluoroaryl group of 6 to 20 carbon atoms which may be substituted or the above-described substituted aryl group; even more preferably the above-described fluorophenyl group which may be substituted or the above-described substituted phenyl group; and still more preferably the above-described trifluorophenyl group which may be substituted, the above-described tetrafluorophenyl group which may be substituted, the above-described pentafluorophenyl group which may be substituted, or a phenyl group substituted with from 1 to 3 trifluoromethyl groups.

Illustrative examples of preferred groups as A include, but are not limited to, the following.

[Chemical Formula 46]

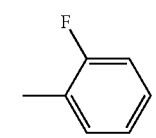
(A-1)

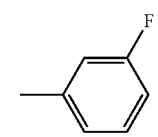
(A-2)

(A-3)

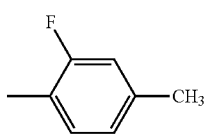
(A-4)

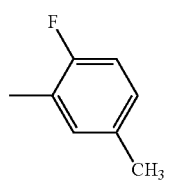
(A-5)

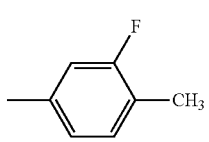
(A-6)

-continued

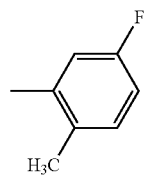
(A-7)

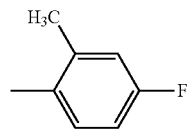
(A-8)

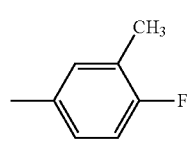
(A-9)

[Chemical Formula 47]

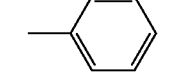
(A-10)

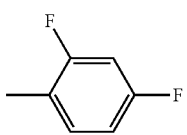
(A-11)

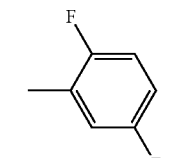
(A-12)

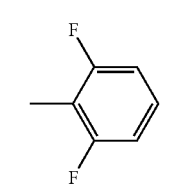
(A-13)

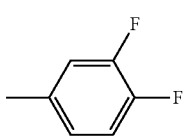
(A-14)

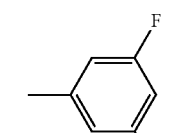
(A-15)

(A-16)

-continued (A-17) (A-27) (A-18) (A-28) (A-19) (A-29) (A-20) (A-30) (A-21) (A-31) (A-22) (A-32) (A-23) (A-33) (A-24) (A-34) (A-25) (A-35) (A-26)

[Chemical Formula 48]
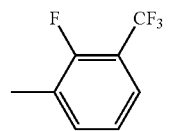 (A-36)
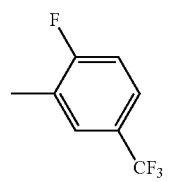 (A-37)
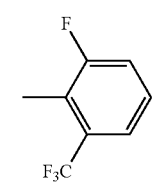 (A-38)
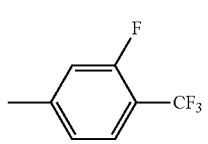 (A-39)
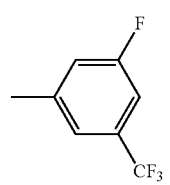 (A-40)
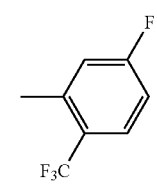 (A-41)
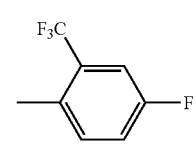 (A-42)
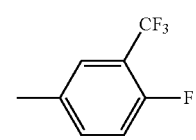 (A-43)
[Chemical Formula 49]
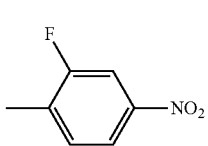 (A-44)
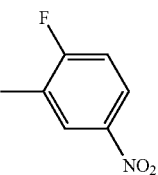 (A-45)
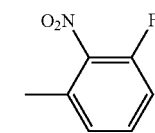 (A-46)
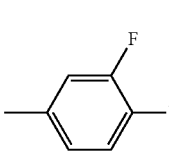 (A-47)
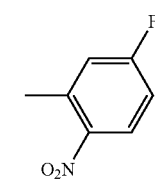 (A-48)
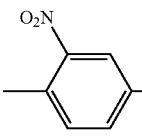 (A-49)
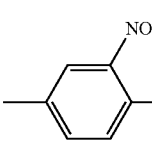 (A-50)
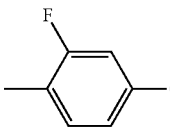 (A-51)
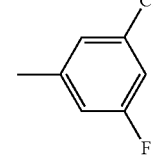 (A-52)
[Chemical Formula 50]
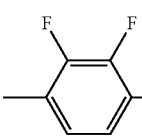 (A-53)
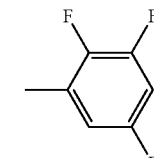 (A-54)

[Chemical Formula 51]

-continued

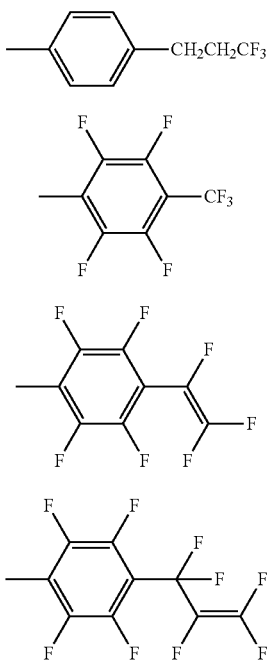

(A-74)

(A-75)

(A-76)

(A-77)

Also, in formula (6), $n^1$ is an integer from 1 to 20, preferably from 2 to 10, more preferably from 2 to 8, even more preferably from 3 to 5, and still more preferably 3 or 4.

The fluorine atom-containing oligoaniline derivative can be synthesized by, as shown in Scheme A below, reacting an amine compound of formula (7) with a fluorine atom-containing acid halide of formula (8). At this time, in order to have the reaction proceed more efficiently, the reaction is preferably carried out in the presence of a base.

Scheme A

[Chemical Formula 52]

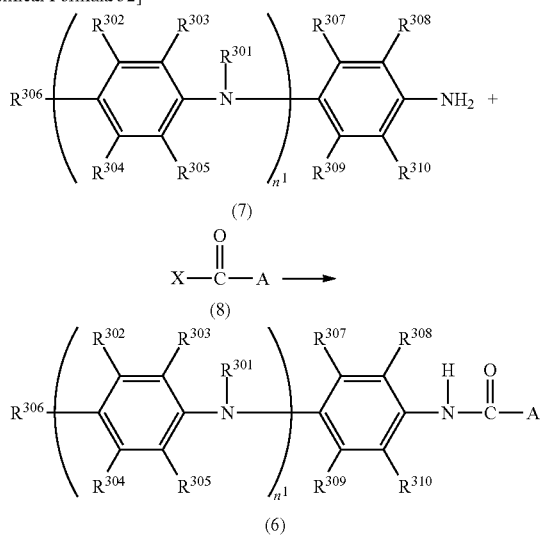

In these formulas, $R^{301}$ to $R^{310}$, A and $n^1$ are as defined above. X is a halogen atom such as a fluorine, chlorine, bromine or iodine atom, although a chlorine or bromine atom is preferred.

The amine compound of formula (7) is exemplified by, but not limited to, amine compounds of the following formulas.

[Chemical Formula 53]

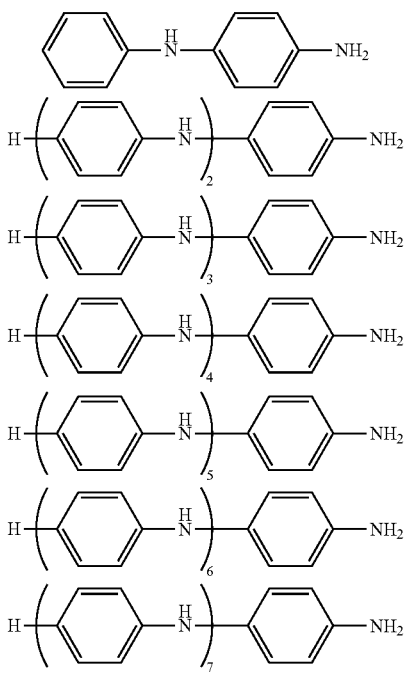

Illustrative examples of the fluorine atom-containing acid halide of formula (8) include, but are not limited to, 2-fluorobenzoyl chloride, 3-fluorobenzoyl chloride, 4-fluorobenzoyl chloride, 2-fluoro-4-methylbenzoyl chloride, 2-fluoro-5-methylbenzoyl chloride, 3-fluoro-4-methylbenzoyl chloride, 3-fluoro-6-methylbenzoyl chloride, 4-fluoro-2-methylbenzoyl chloride, 4-fluoro-3-methylbenzoyl chloride, 2,3-difluorobenzoyl chloride, 2,4-difluorobenzoyl chloride, 2,5-difluorobenzoyl chloride, 2,6-difluorobenzoyl chloride, 3,4-difluorobenzoyl chloride, 3,5-difluorobenzoyl chloride, 3-chloro-2-fluorobenzoyl chloride, 4-chloro-2-fluorobenzoyl chloride, 5-chloro-2-fluorobenzoyl chloride, 2-chloro-6-fluorobenzoyl chloride, 2-chloro-3-fluorobenzoyl chloride, 2-chloro-4-fluorobenzoyl chloride, 2-chloro-5-fluorobenzoyl chloride, 3-chloro-4-fluorobenzoyl chloride, 3-chloro-5-fluorobenzoyl chloride, 3-bromo-2-fluorobenzoyl chloride, 4-bromo-2-fluorobenzoyl chloride, 5-bromo-2-fluorobenzoyl chloride, 2-bromo-6-fluorobenzoyl chloride, 2-bromo-3-fluorobenzoyl chloride, 2-bromo-4-fluorobenzoyl chloride, 2-bromo-5-fluorobenzoyl chloride, 3-bromo-4-fluorobenzoyl chloride, 3-bromo-5-fluorobenzoyl chloride, 2-fluoro-5-iodobenzoyl chloride, 2-fluoro-6-iodobenzoyl chloride, 2-fluoro-3-(trifluoromethyl)benzoyl chloride, 2-fluoro-5-(trifluoromethyl)benzoyl chloride, 2-fluoro-6-(trifluoromethyl)benzoyl chloride, 3-fluoro-4-(trifluoromethyl)benzoyl chloride, 3-fluoro-5-(trifluoromethyl)benzoyl chloride, 3-fluoro-6-(trifluoromethyl)benzoyl chloride, 4-fluoro-2-(trifluoromethyl)benzoyl chloride, 4-fluoro-3-(trifluoromethyl)benzoyl chloride, 2-fluoro-4-nitrobenzoyl chloride, 2-fluoro-5-nitrobenzoyl chloride, 3-fluoro-2-nitrobenzoyl chloride, 3-fluoro-4-nitrobenzoyl chloride, 3-fluoro-6-nitrobenzoyl chloride, 4-fluoro-2-nitrobenzoyl chloride, 4-fluoro-3-nitrobenzoyl chloride, 4-cyano-2-fluorobenzoyl chloride, 3-cyano-5-fluorobenzoyl chloride, 2,3,4-trifluorobenzoyl chloride, 2,3,5-trifluorobenzoyl chloride, 2,3,6-trifluorobenzoyl chloride, 2,4,5-trifluorobenzoyl chloride, 2,4,6-trifluorobenzoyl chloride, 3,4,5-trifluorobenzoyl chloride, 4-chloro-2,4-difluorobenzoyl chloride, 2,4-dichloro-5-fluoro-4-nitrobenzoyl chloride, 2,4,5-trifluoro-3-methyl-6-nitrobenzoyl chloride, 2,3,4,5-tetrafluorobenzoyl chloride, 2,3,5,6-tetrafluorobenzoyl chloride, 2,3,5,6-tetrafluoro-4-methylbenzoyl chloride, 2,3,4,5-tetrafluoro-6-nitrobenzoyl chloride, 2,3,4,5,6-pentafluorobenzoyl chloride, 2-(trifluoromethyl)benzoyl chloride, 3-(trifluoromethyl)benzoyl chloride, 4-(trifluoromethyl)benzoyl chloride, 3-trifluoromethyl-4-ethoxybenzoyl chloride, 3,5-bis(trifluoromethyl)benzoyl chloride, 2,4,6-tris(trifluoromethyl)benzoyl chloride, 4-(pentafluoroethyl)benzoyl chloride, 4-(3-tetrafluoropropyl)benzoyl chloride, 2,3,5,6-tetrafluoro-4-(trifluoromethyl)benzoyl chloride, 2,3,5,6-tetrafluoro-4-(trifluorovinyl)benzoyl chloride and 2,3,5,6-tetrafluoro-4-(pentafluoroallyl)benzoyl chloride.

Exemplary bases include alkoxides such as sodium tert-butoxide (t-BuONa) and potassium tert-butoxide; fluoride salts such as lithium fluoride, potassium fluoride and cesium fluoride; carbonates such as sodium carbonate, potassium carbonate, sodium bicarbonate and potassium bicarbonate; and amines such as trimethylamine, triethylamine, diisopropylethylamine, tetramethylethylenediamine, pyridine, morpholine, N-methylmorpholine, quinuclidine, 1,4-diazabicyclo[2.2.2]octane and 4-dimethylaminopyridine. The base is not particularly limited, provided that it is one which can be used in this type of reaction. In particular, bases such as triethylamine, pyridine and diisopropylethylamine are suitable because they are easy to handle.

The reaction solvent is preferably an aprotic polar organic solvent, examples of which include N,N-dimethylformamide, N,N-dimethylacetamide, N-methylpyrrolidone, 1,3-dimethyl-2-imidazolidinone, dimethylsulfoxide, tetrahydrofuran and dioxane. From the standpoint of the ease of removing the reaction solvent following the reaction, N,N-dimethylformamide, N,N-dimethylacetamide, tetrahydrofuran and dioxane are preferred.

The reaction temperature is suitably set within the range from the melting point to the boiling point of the solvent while taking into account the types and amounts of the starting compounds and the catalyst used, and is typically from about 0° C. to about 200° C., and preferably from 20 to 150° C. The reaction time varies with such factors as the types and amounts of the starting compounds and catalyst used and the reaction temperature, and therefore cannot be strictly specified, although the reaction time is typically from about 1 hour to about 24 hours.

Following reaction completion, the target fluorine atom-containing oligoaniline can be obtained by work-up in the usual manner.

The fluorine atom-containing acid halide of formula (8) can be obtained by reacting the corresponding fluorine atom-containing carboxylic acid with an electrophilic halogenating agent such as thionyl chloride, oxalyl chloride, phosphoryl chloride, sulfuryl chloride, phosphorus trichloride or phosphorus pentachloride. The corresponding fluorine atom-containing carboxylic acid may be a commercially available product, or may be synthesized by a known method (such as the methods described in, for example, JP-A H09-67303, JP-A H09-67304 or JP-A 2002-284733).

Illustrative examples of fluorine atom-containing oligoaniline derivatives of formula (6) include, but are not limited to, those shown below. In the tables that follow, "$R^{301}$ to $R^{310}$", "A" and "$n^1$" represent specific entities in formula (6) for the compounds shown on the respective lines of the table. For example, the compound of formula (E-1) and the compound of formula (E-198) are respectively as follows.

[Chemical Formula 54]

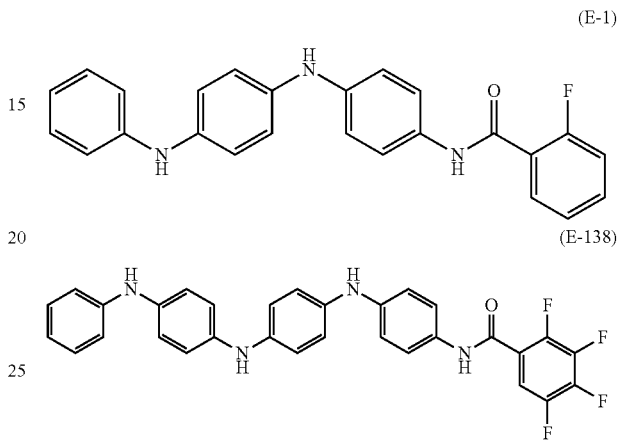

TABLE 19

| Compound | $R^{301}$~$R^{310}$ | A | $n^1$ |
|---|---|---|---|
| (E-1) | H | (A-1) | 2 |
| (E-2) | H | (A-2) | 2 |
| (E-3) | H | (A-3) | 2 |
| (E-4) | H | (A-4) | 2 |
| (E-5) | H | (A-5) | 2 |
| (E-6) | H | (A-6) | 2 |
| (E-7) | H | (A-7) | 2 |
| (E-8) | H | (A-8) | 2 |
| (E-9) | H | (A-9) | 2 |
| (E-10) | H | (A-10) | 2 |
| (E-11) | H | (A-11) | 2 |
| (E-12) | H | (A-12) | 2 |
| (E-13) | H | (A-13) | 2 |
| (E-14) | H | (A-14) | 2 |
| (E-15) | H | (A-15) | 2 |
| (E-16) | H | (A-16) | 2 |
| (E-17) | H | (A-17) | 2 |
| (E-18) | H | (A-18) | 2 |
| (E-19) | H | (A-19) | 2 |
| (E-20) | H | (A-20) | 2 |
| (E-21) | H | (A-21) | 2 |
| (E-22) | H | (A-22) | 2 |
| (E-23) | H | (A-23) | 2 |
| (E-24) | H | (A-24) | 2 |
| (E-25) | H | (A-25) | 2 |
| (E-26) | H | (A-26) | 2 |
| (E-27) | H | (A-27) | 2 |
| (E-28) | H | (A-28) | 2 |
| (E-29) | H | (A-29) | 2 |
| (E-30) | H | (A-30) | 2 |
| (E-31) | H | (A-31) | 2 |
| (E-32) | H | (A-32) | 2 |
| (E-33) | H | (A-33) | 2 |
| (E-34) | H | (A-34) | 2 |
| (E-35) | H | (A-35) | 2 |
| (E-36) | H | (A-36) | 2 |
| (E-37) | H | (A-37) | 2 |
| (E-38) | H | (A-38) | 2 |
| (E-39) | H | (A-39) | 2 |
| (E-40) | H | (A-40) | 2 |
| (E-41) | H | (A-41) | 2 |

TABLE 19-continued

| Compound | $R^{301}$~$R^{310}$ | A | $n^1$ |
|---|---|---|---|
| (E-42) | H | (A-42) | 2 |
| (E-43) | H | (A-43) | 2 |
| (E-44) | H | (A-44) | 2 |
| (E-45) | H | (A-45) | 2 |
| (E-46) | H | (A-46) | 2 |
| (E-47) | H | (A-47) | 2 |
| (E-48) | H | (A-48) | 2 |
| (E-49) | H | (A-49) | 2 |
| (E-50) | H | (A-50) | 2 |
| (E-51) | H | (A-51) | 2 |
| (E-52) | H | (A-52) | 2 |
| (E-53) | H | (A-53) | 2 |
| (E-54) | H | (A-54) | 2 |
| (E-55) | H | (A-55) | 2 |
| (E-56) | H | (A-56) | 2 |
| (E-57) | H | (A-57) | 2 |
| (E-58) | H | (A-58) | 2 |
| (E-59) | H | (A-59) | 2 |
| (E-60) | H | (A-60) | 2 |
| (E-61) | H | (A-61) | 2 |
| (E-62) | H | (A-62) | 2 |
| (E-63) | H | (A-63) | 2 |
| (E-64) | H | (A-64) | 2 |
| (E-65) | H | (A-65) | 2 |
| (E-66) | H | (A-66) | 2 |
| (E-67) | H | (A-67) | 2 |
| (E-68) | H | (A-68) | 2 |
| (E-69) | H | (A-69) | 2 |
| (E-70) | H | (A-70) | 2 |
| (E-71) | H | (A-71) | 2 |
| (E-72) | H | (A-72) | 2 |
| (E-73) | H | (A-73) | 2 |
| (E-74) | H | (A-74) | 2 |
| (E-75) | H | (A-75) | 2 |
| (E-76) | H | (A-76) | 2 |
| (E-77) | H | (A-77) | 2 |

TABLE 20

| Compound | $R^{301}$~$R^{310}$ | A | $n^1$ |
|---|---|---|---|
| (E-78) | H | (A-1) | 3 |
| (E-79) | H | (A-2) | 3 |
| (E-80) | H | (A-3) | 3 |
| (E-81) | H | (A-4) | 3 |
| (E-82) | H | (A-5) | 3 |
| (E-83) | H | (A-6) | 3 |
| (E-84) | H | (A-7) | 3 |
| (E-85) | H | (A-8) | 3 |
| (E-86) | H | (A-9) | 3 |
| (E-87) | H | (A-10) | 3 |
| (E-88) | H | (A-11) | 3 |
| (E-89) | H | (A-12) | 3 |
| (E-90) | H | (A-13) | 3 |
| (E-91) | H | (A-14) | 3 |
| (E-92) | H | (A-15) | 3 |
| (E-93) | H | (A-16) | 3 |
| (E-94) | H | (A-17) | 3 |
| (E-95) | H | (A-18) | 3 |
| (E-96) | H | (A-19) | 3 |
| (E-97) | H | (A-20) | 3 |
| (E-98) | H | (A-21) | 3 |
| (E-99) | H | (A-22) | 3 |
| (E-100) | H | (A-23) | 3 |
| (E-101) | H | (A-24) | 3 |
| (E-102) | H | (A-25) | 3 |
| (E-103) | H | (A-26) | 3 |
| (E-104) | H | (A-27) | 3 |
| (E-105) | H | (A-28) | 3 |
| (E-106) | H | (A-29) | 3 |
| (E-107) | H | (A-30) | 3 |
| (E-108) | H | (A-31) | 3 |
| (E-109) | H | (A-32) | 3 |
| (E-110) | H | (A-33) | 3 |
| (E-111) | H | (A-34) | 3 |

TABLE 20-continued

| Compound | $R^{301}$~$R^{310}$ | A | $n^1$ |
|---|---|---|---|
| (E-112) | H | (A-35) | 3 |
| (E-113) | H | (A-36) | 3 |
| (E-114) | H | (A-37) | 3 |
| (E-115) | H | (A-38) | 3 |
| (E-116) | H | (A-39) | 3 |
| (E-117) | H | (A-40) | 3 |
| (E-118) | H | (A-41) | 3 |
| (E-119) | H | (A-42) | 3 |
| (E-120) | H | (A-43) | 3 |
| (E-121) | H | (A-44) | 3 |
| (E-122) | H | (A-45) | 3 |
| (E-123) | H | (A-46) | 3 |
| (E-124) | H | (A-47) | 3 |
| (E-125) | H | (A-48) | 3 |
| (E-126) | H | (A-49) | 3 |
| (E-127) | H | (A-50) | 3 |
| (E-128) | H | (A-51) | 3 |
| (E-129) | H | (A-52) | 3 |
| (E-130) | H | (A-53) | 3 |
| (E-131) | H | (A-54) | 3 |
| (E-132) | H | (A-55) | 3 |
| (E-133) | H | (A-56) | 3 |
| (E-134) | H | (A-57) | 3 |
| (E-135) | H | (A-58) | 3 |
| (E-136) | H | (A-59) | 3 |
| (E-137) | H | (A-60) | 3 |
| (E-138) | H | (A-61) | 3 |
| (E-139) | H | (A-62) | 3 |
| (E-140) | H | (A-63) | 3 |
| (E-141) | H | (A-64) | 3 |
| (E-142) | H | (A-65) | 3 |
| (E-143) | H | (A-66) | 3 |
| (E-144) | H | (A-67) | 3 |
| (E-145) | H | (A-68) | 3 |
| (E-146) | H | (A-69) | 3 |
| (E-147) | H | (A-70) | 3 |
| (E-148) | H | (A-71) | 3 |
| (E-149) | H | (A-72) | 3 |
| (E-150) | H | (A-73) | 3 |
| (E-151) | H | (A-74) | 3 |
| (E-152) | H | (A-75) | 3 |
| (E-153) | H | (A-76) | 3 |
| (E-154) | H | (A-77) | 3 |

TABLE 21

| Compound | $R^{301}$~$R^{310}$ | A | $n^1$ |
|---|---|---|---|
| (E-155) | H | (A-1) | 4 |
| (E-156) | H | (A-2) | 4 |
| (E-157) | H | (A-3) | 4 |
| (E-158) | H | (A-4) | 4 |
| (E-159) | H | (A-5) | 4 |
| (E-160) | H | (A-6) | 4 |
| (E-161) | H | (A-7) | 4 |
| (E-162) | H | (A-8) | 4 |
| (E-163) | H | (A-9) | 4 |
| (E-164) | H | (A-10) | 4 |
| (E-165) | H | (A-11) | 4 |
| (E-166) | H | (A-12) | 4 |
| (E-167) | H | (A-13) | 4 |
| (E-168) | H | (A-14) | 4 |
| (E-169) | H | (A-15) | 4 |
| (E-170) | H | (A-16) | 4 |
| (E-171) | H | (A-17) | 4 |
| (E-172) | H | (A-18) | 4 |
| (E-173) | H | (A-19) | 4 |
| (E-174) | H | (A-20) | 4 |
| (E-175) | H | (A-21) | 4 |
| (E-176) | H | (A-22) | 4 |
| (E-177) | H | (A-23) | 4 |
| (E-178) | H | (A-24) | 4 |
| (E-179) | H | (A-25) | 4 |
| (E-180) | H | (A-26) | 4 |
| (E-181) | H | (A-27) | 4 |

TABLE 21-continued

| Compound | $R^{301}$~$R^{310}$ | A | $n^1$ |
|---|---|---|---|
| (E-182) | H | (A-28) | 4 |
| (E-183) | H | (A-29) | 4 |
| (E-184) | H | (A-30) | 4 |
| (E-185) | H | (A-31) | 4 |
| (E-186) | H | (A-32) | 4 |
| (E-187) | H | (A-33) | 4 |
| (E-188) | H | (A-34) | 4 |
| (E-189) | H | (A-35) | 4 |
| (E-190) | H | (A-36) | 4 |
| (E-191) | H | (A-37) | 4 |
| (E-192) | H | (A-38) | 4 |
| (E-193) | H | (A-39) | 4 |
| (E-194) | H | (A-40) | 4 |
| (E-195) | H | (A-41) | 4 |
| (E-196) | H | (A-42) | 4 |
| (E-197) | H | (A-43) | 4 |
| (E-198) | H | (A-44) | 4 |
| (E-199) | H | (A-45) | 4 |
| (E-200) | H | (A-46) | 4 |
| (E-201) | H | (A-47) | 4 |
| (E-202) | H | (A-48) | 4 |
| (E-203) | H | (A-49) | 4 |
| (E-204) | H | (A-50) | 4 |
| (E-205) | H | (A-51) | 4 |
| (E-206) | H | (A-52) | 4 |
| (E-207) | H | (A-53) | 4 |
| (E-208) | H | (A-54) | 4 |
| (E-209) | H | (A-55) | 4 |
| (E-210) | H | (A-56) | 4 |
| (E-211) | H | (A-57) | 4 |
| (E-212) | H | (A-58) | 4 |
| (E-213) | H | (A-59) | 4 |
| (E-214) | H | (A-60) | 4 |
| (E-215) | H | (A-61) | 4 |
| (E-216) | H | (A-62) | 4 |
| (E-217) | H | (A-63) | 4 |
| (E-218) | H | (A-64) | 4 |
| (E-219) | H | (A-65) | 4 |
| (E-220) | H | (A-66) | 4 |
| (E-221) | H | (A-67) | 4 |
| (E-222) | H | (A-68) | 4 |
| (E-223) | H | (A-69) | 4 |
| (E-224) | H | (A-70) | 4 |
| (E-225) | H | (A-71) | 4 |
| (E-226) | H | (A-72) | 4 |
| (E-227) | H | (A-73) | 4 |
| (E-228) | H | (A-74) | 4 |
| (E-229) | H | (A-75) | 4 |
| (E-230) | H | (A-76) | 4 |
| (E-231) | H | (A-77) | 4 |

A good solvent that is capable of fully dissolving the charge-transporting substance and the dopant may be used as the organic solvent employed when preparing the charge-transporting thin film-forming varnish.

Illustrative examples of such good solvents include, but are not limited to, organic solvents such as N,N-dimethylformamide, N,N-dimethylacetamide, N,N-dimethylbutylamide, N,N-diethylbutylamide, N,N-methylethylbutylamide, N,N-dimethylisobutylamide, N,N-diethylisobutylamide, N-ethyl-N-methylisobutylamide, N-methylpyrrolidone and 1,3-dimethyl-2-imidazolidinone. These solvents may be of one type used alone, or two or more may be used in admixture. The amount of use may be set to from 5 to 100 wt % of the solvent used in the varnish.

It is preferable for the charge-transporting substance, dopant and the like to all be completely dissolved in this solvent.

In this invention, in addition to the above-described organic solvent, other organic solvents may be included for such purposes as to increase the substrate wettability by the varnish, adjust the solvent surface tension, adjust the polarity, and adjust the boiling point. Illustrative examples of such other organic solvents include, but are not limited to, the following:

glycols such as diethylene glycol, triethylene glycol, tetraethylene glycol, dipropylene glycol, 1,2-ethanediol (ethylene glycol), 1,2-propanediol (propylene glycol), 1,2-butanediol, 2,3-butanediol, 1,3-butandiol, 1,4-butanediol, 1,5-pentanediol, 2-methyl-2,4-pentanediol (hexylene glycol), 1,3-octylene glycol and 3,6-octylene glycol;

triols such as glycerol;

alkylene glycol monoalkyl ethers, including ethylene glycol monoalkyl ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monoisobutyl ether and ethylene glycol monohexyl ether, and propylene glycol monoalkyl ethers such as propylene glycol monomethyl ether, propylene glycol monoethyl ether, propylene glycol monopropyl ether, propylene glycol monoisopropyl ether, propylene glycol monobutyl ether, propylene glycol monoisobutyl ether and propylene glycol monohexyl ether;

alkylene glycol monoaryl ethers, including ethylene glycol monoaryl ethers such as ethylene glycol monophenyl ether, and propylene glycol monoaryl ethers such as propylene glycol monophenyl ether;

alkylene glycol monoaralkyl ethers, including ethylene glycol monoaralkyl ethers such as ethylene glycol monobenzyl ether, and propylene glycol monoaralkyl ethers such as propylene glycol monobenzyl ether;

alkylene glycol alkoxyalkyl ethers, including ethylene glycol alkoxyalkyl ethers such as ethylene glycol butoxyethyl ether, and propylene glycol alkoxyalkyl ethers such as propylene glycol butoxyethyl ether;

alkylene glycol dialkyl ethers, including ethylene glycol dialkyl ethers such as ethylene glycol dimethyl ether, ethylene glycol diethyl ether, ethylene glycol dipropyl ether, ethylene glycol diisopropyl ether and ethylene glycol dibutyl ether, and propylene glycol dialkyl ethers such as propylene glycol dimethyl ether, propylene glycol diethyl ether, propylene glycol dipropyl ether, propylene glycol diisopropyl ether and propylene glycol dibutyl ether;

alkylene glycol monoalkyl ether acetates, including ethylene glycol monoalkyl ether acetates such as ethylene glycol monomethyl ether acetate, ethylene glycol monoethyl ether acetate, ethylene glycol monopropyl ether acetate, ethylene glycol monoisopropyl ether acetate and ethylene glycol monobutyl ether acetate, and propylene glycol monoalkyl ether acetates such as propylene glycol monomethyl ether acetate, propylene glycol monoethyl ether acetate, propylene glycol monopropyl ether acetate, propylene glycol monoisopropyl ether acetate and propylene glycol monobutyl ether acetate;

alkylene glycol monoacetates, including ethylene glycol monoacetates such as ethylene glycol monoacetate and propylene glycol monoacetates such as propylene glycol monoacetate;

alkylene glycol diacetates, including ethylene glycol diacetates such as ethylene glycol diacetate and propylene glycol diacetates such as propylene glycol diacetate;

dialkylene glycol monoalkyl ethers, including diethylene glycol monoalkyl ethers such as diethylene glycol monomethyl ether, diethylene glycol monoethyl ether, diethylene glycol monopropyl ether, diethylene glycol monoisopropyl ether, diethylene glycol monobutyl ether, diethylene glycol monoisobutyl ether and diethylene glycol monohexyl ether, and dipropylene glycol monoalkyl ethers such as dipropylene glycol monomethyl ether, dipropylene glycol monoethyl ether, dipropylene glycol monopropyl ether, dipropylene glycol monoisopropyl ether, dipropylene glycol monobutyl ether, dipropylene glycol monoisobutyl ether and dipropylene glycol monohexyl ether;

dialkylene glycol monoaryl ethers, including diethylene glycol monoaryl ethers such as diethylene glycol monophenyl ether, and dipropylene glycol monoaryl ethers such as dipropylene glycol monophenyl ether;

dialkylene glycol dialkyl ethers, including diethylene glycol dialkyl ethers such as diethylene glycol dimethyl ether, diethylene glycol diethyl ether, diethylene glycol dipropyl ether, diethylene glycol diisopropyl ether and diethylene glycol dibutyl ether, and dipropylene glycol dialkyl ethers such as dipropylene glycol dimethyl ether, dipropylene glycol diethyl ether, dipropylene glycol dipropyl ether, dipropylene glycol diisopropyl ether and dipropylene glycol dibutyl ether;

dialkylene glycol monoalkyl ether acetates, including diethylene glycol monoalkyl ether acetates such as diethylene glycol monomethyl ether acetate, diethylene glycol monoethyl ether acetate, diethylene glycol monopropyl ether acetate, diethylene glycol monoisopropyl ether acetate, diethylene glycol monobutyl ether acetate, diethylene glycol monoisobutyl ether acetate and diethylene glycol monohexyl ether acetate, and dipropylene glycol monoalkyl ether acetates such as dipropylene glycol monomethyl ether acetate, dipropylene glycol monoethyl ether acetate, dipropylene glycol monopropyl ether acetate, dipropylene glycol monoisopropyl ether acetate, dipropylene glycol monobutyl ether acetate, dipropylene glycol monoisobutyl ether acetate and dipropylene glycol monohexyl ether acetate;

trialkylene glycol monoalkyl ethers, including triethylene glycol monoalkyl ethers such as triethylene glycol monomethyl ether and triethylene glycol monoethyl ether, and tripropylene glycol monoalkyl ethers such as tripropylene glycol monomethyl ether and tripropylene glycol monoethyl ether;

trialkylene glycol dialkyl ethers, including triethylene glycol dialkyl ethers such as triethylene glycol dimethyl ether and triethylene glycol diethyl ether, and tripropylene glycol dialkyl ethers such as tripropylene glycol dimethyl ether and tripropylene glycol diethyl ether;

aliphatic alcohols, including linear aliphatic alcohols such as 1-propanol, 2-propanol, 1-butanol, 2-butanol, 1-pentanol, 1-hexanol, 1-heptanol, 1-nonanol, 1-decanol, 1-undecanol, 1-dodecanol and 1-tetradecanol, and cyclic aliphatic alcohols such as cyclohexanol and 2-methylcyclohexanol;

phenols such as phenol;

aromatic alcohols such as benzyl alcohol;

heterocycle-containing alcohols such as furfuryl alcohol;

hydrogenated heterocycle-containing alcohols such as tetrahydrofurfuryl alcohol;

dialkyl ethers such as diisopropyl ether, di-n-butyl ether and di-n-hexyl ether;

alkyl aryl ethers such as methyl phenyl ether, ethyl phenyl ether, n-butyl phenyl ether, benzyl (3-methylbutyl) ether, (2-methylphenyl) methyl ether, (3-methylphenyl) methyl ether and (4-methylphenyl) methyl ether;

alkyl aralkyl ethers such as ethyl benzyl ether;

cyclic alkyl monoethers such as 2-methylfuran, tetrahydrofuran and tetrahydropyran;

cyclic alkyl diethers such as 1,4-dioxane;

cyclic alkyl triethers such as trioxane;

diepoxyalkyl ethers such as diglycidyl ether;

alkyl esters exemplified by alkyl acetates, including linear or branched alkyl acetates such as ethyl acetate, n-propyl acetate, isopropyl acetate, n-butyl acetate, isobutyl acetate, s-butyl acetate, t-butyl acetate, n-pentyl acetate, (3-methylbutyl) acetate, n-hexyl acetate, (2-ethylbutyl) acetate and (2-ethylhexyl) acetate, and cyclic alkyl acetates such as cyclohexyl acetate and 2-methylcyclohexyl acetate; alkyl propionates, including linear or branched alkyl propionates such as ethyl propionate, n-propyl propionate, isopropyl propionate, n-butyl propionate, isobutyl propionate, s-butyl propionate, t-butyl propionate, n-pentyl propionate, (3-methylbutyl) propionate, n-hexyl propionate, (2-ethylbutyl) propionate and (2-ethylhexyl) propionate, and cyclic alkyl propionates such as cyclohexyl propionate and 2-methylcyclohexyl propionate; alkyl butyrates, including linear or branched alkyl butyrates such as ethyl butyrate, n-propyl butyrate, isopropyl butyrate, n-butyl butyrate, isobutyl butyrate, s-butyl butyrate, t-butyl butyrate, n-pentyl butyrate, (3-methylbutyl) butyrate, n-hexyl butyrate and (2-ethylbutyl) butyrate, (2-ethylhexyl) butyrate, and cyclic alkyl butyrates such as cyclohexyl butyrate and 2-methylcyclohexyl butyrate; and alkyl lactates, including linear or branched alkyl lactates such as ethyl lactate, n-propyl lactate, isopropyl lactate, n-butyl lactate, isobutyl lactate, s-butyl lactate, t-butyl lactate, n-pentyl lactate, (3-methylbutyl) lactate, n-hexyl lactate, (2-ethylbutyl) lactate and (2-ethylhexyl) lactate, and cyclic alkyl lactates such as cyclohexyl lactate and 2-methylcyclohexyl lactate;

aralkyl alkyl esters, including aralkyl acetates such as benzyl acetate, aralkyl propionates such as benzyl propionate, aralkyl butyrates such as benzyl butyrate, and aralkyl lactates such as benzyl lactate;

dialkyl ketones such as diethyl ketone, diisobutyl ketone, methyl ethyl ketone, methyl n-propyl ketone, methyl n-butyl ketone, methyl isobutyl ketone, methyl n-propyl ketone, methyl n-hexyl ketone, ethyl n-butyl ketone and di-n-propyl ketone;

cyclic alkenyl ketones such as isophorone;

cyclic alkyl ketones such as cyclohexanone;

hydroxydialkyl ketones such as 4-hydroxy-4-methyl-2-pentanone (diacetone alcohol);

heterocycle-containing aldehydes such as furfural;

linear or branched alkanes such as heptane, octane, 2,2,3-trimethylhexane, decane and dodecane;

alkylbenzenes such as toluene, xylene, o-xylene, m-xylene, p-xylene, mesitylene, tetralin and cyclohexylbenzene; and cyclic alkanes such as cyclohexane, methylcyclohexane and ethylcyclohexane. These solvents may be of one type used alone, or two or more may be used in admixture. The amount of use thereof is determined by the amount of good solvent to be used together. Depending on the type of charge-transporting substance, such other solvents may also have the function of a good solvent.

Of these, it is preferable to include, as other organic solvents aside from the good solvent, glycols, triols, alkylene glycol monoalkyl ethers, alkylene glycol dialkyl ethers, dialkylene glycol monoalkyl ethers or dialkylene glycol dialkyl ethers; more preferable to include glycols, alkylene glycol monoalkyl ethers or dialkylene glycol monoalkyl ethers; even more preferable to include diethylene glycol, triethylene glycol, dipropylene glycol, 1,2-ethanediol, 1,2-propanediol, 1,2-butanediol, 2,3-butanediol, 1,3-butanediol, 1,4-butanediol, ethylene glycol monomethyl ether, ethylene glycol monoethyl ether, ethylene glycol propyl ether, ethylene glycol isopropyl ether, ethylene glycol monobutyl ether, ethylene glycol monoisobutyl ether, propylene glycol monomethyl ether, propylene glycol monoethyl ether, propylene glycol monopropyl ether, propylene glycol monoisopropyl ether, propylene glycol monobutyl ether, propylene glycol monoisobutyl ether, diethylene glycol monomethyl ether, diethylene glycol monoethyl ether, diethylene glycol propyl ether, diethylene glycol isopropyl ether, diethylene glycol monobutyl ether, diethylene glycol monoisobutyl ether, dipropylene glycol monomethyl ether, dipropylene glycol monoethyl ether, dipropylene glycol monopropyl ether, dipropylene glycol monoisopropyl ether, dipropylene glycol monobutyl ether or dipropylene glycol monoisobutyl ether; and even more preferable to include diethylene glycol, triethylene glycol, dipropylene glycol, 1,2-ethanediol, 1,2-propanediol, 1,2-butanediol, 2,3-butanediol, 1,3-butanediol, 1,4-butanediol, ethylene glycol monomethyl ether, propylene glycol monomethyl ether, diethylene glycol monomethyl ether or dipropylene glycol monomethyl ether. By selecting the solvent to be used from among solvents such as these while taking into account the types and amounts of the charge-transporting substances and dopants, a varnish having the desired liquid properties can easily be prepared.

The varnish of the invention has a viscosity which is suitably set in accordance with the thickness and other properties of the thin films to be produced and the solids concentration, but is generally from 1 to 50 mPa·s at 25° C., and has a surface tension which is generally from 20 to 50 mN/m.

The method of preparing the charge transporting thin film-forming varnish is not particularly limited. Examples include the method of first dissolving the charge-transporting substance in a solvent and then successively adding thereto the dopant and the 2,2,6,6-tetraalkylpiperidine-N-oxyl derivative; and the method of dissolving a mixture of the charge-transporting substance, the dopant and the 2,2,6,6-tetraalkylpiperidine-N-oxyl derivative in a solvent.

In cases where a plurality of organic solvents are used, the charge-transporting substance, dopant and 2,2,6,6-tetraalkylpiperidine-N-oxy derivative may first be dissolved in a solvent that dissolves them well, after which the other solvents may be added thereto; alternatively, the charge-transporting substance, dopant, 2,2,6,6-tetraalkylpiperidine-N-oxy derivative may be dissolved, either successively or at the same time, in a mixture of the plurality of organic solvents.

In this invention, to reproducibly obtain high-flatness thin-films, it is desirable for the charge-transporting thin film-forming varnish to be prepared by dissolving the charge-transporting substance, dopant and the like in the organic solvent and then filtering the solution using, for example, a submicron-order filter.

A charge-transporting thin-film can be formed on a substrate by applying the charge-transporting thin film-forming varnish of the invention onto a substrate and baking the applied varnish.

Examples of methods for applying the varnish include, but are not particularly limited to, dipping, spin coating, transfer printing, roll coating, brush coating, ink-jet printing, spraying and slit coating. In order to reproducibly obtain charge-transporting thin films having a high flatness, spin coating, ink-jet printing and spraying are preferred. It is preferable to adjust the viscosity and surface tension of the varnish according to the method of application.

When using the varnish of the invention, in order to obtain thin films having a uniform film surface and a high charge transportability, it is essential to select the baking atmosphere (e.g., open-air atmosphere, inert gas such as nitrogen, or vacuum) while taking into account, for example, the types of charge-transporting substance, dopant and solvent to be included in the invention. However, in most instances, thin films that are uniform and have excellent charge transportability can be obtained by baking the varnish in an open-air atmosphere.

The baking temperature is suitably set in the range of about 100 to 260° C. while taking into account such factors as the intended use of the resulting thin film and the degree of charge transportability to be imparted to the thin film. When the thin film thus obtained is to be used as a hole-injecting layer in an organic EL device, the baking temperature is preferably from about 140° C. to about 250° C., and more preferably from about 150° C. to about 230° C. In particular, because a feature of the inventive varnish is that it can be fired at low temperatures below 200° C., and especially from 150 to 190° C., even when the varnish is fired at a relatively low temperature, a thin film of excellent charge transportability can be achieved. During baking, a temperature change in two or more steps may be applied for such purposes as to achieve more uniform film formability or to induce the reaction to proceed on the substrate. Heating may be carried out using a suitable apparatus such as a hot plate or an oven.

The thickness of the charge-transporting thin film is not particularly limited. However, when the thin film is to be used as a hole-injecting layer in an organic EL device, a film thickness of from 5 to 200 nm is preferred. Methods for changing the film thickness include, for example, changing the concentration of the charge-transporting substance and the like in the varnish and changing the amount of solution on the substrate during application.

The charge-transporting thin film of the invention can be suitably used as a hole-injecting layer in an organic EL device, although use as a charge-transporting functional layer such as a hole-injecting-and-transporting layer is also possible.

The organic EL device of the invention has a pair of electrodes and additionally has, between these electrodes, the above-described charge-transporting thin film of the invention.

Typical organic EL device configurations include, but are not limited to, configurations of (a) to (f) below. In these configurations, where necessary, an electron-blocking layer or the like may be provided between the light-emitting layer and the anode, and a hole-blocking layer or the like may be provided between the light-emitting layer and the cathode. Alternatively, the hole-injecting layer, hole-transporting layer or hole-injecting-and-transporting layer may also have the function of, for example, an electron-blocking layer; and the electron-injecting layer, electron-transporting layer or electron-injecting-and-transporting layer may also have the function of, for example, a hole-blocking layer.

(a) anode/hole-injecting layer/hole-transporting layer/light-emitting layer/electron-transporting layer/electron-injecting layer/cathode (b) anode/hole-injecting layer/hole-transporting layer/light-emitting layer/electron-injecting-and-transporting layer/cathode (c) anode/hole-injecting-and-transporting layer/light-emitting layer/electron-transporting layer/electron-injecting layer/cathode (d) anode/hole-injecting-and-transporting layer/light-emitting layer/electron-injecting-and-transporting layer/cathode (e) anode/hole-injecting layer/hole-transporting layer/light-emitting layer/cathode (f) anode/hole-injecting-and-transporting layer/light-emitting layer/cathode As used herein, "hole-injecting layer," "hole-transporting layer" and "hole-injecting-and-transporting layer" refer to layers which are formed between the light-emitting layer and the anode and which have the function of transporting holes from the anode to the light-emitting layer. When only one layer of hole-transporting material is provided between the light-emitting layer and the anode, this is a "hole-injecting-and-transporting layer"; when two or more layers of hole-transporting material are provided between the light-emitting layer and the anode, the layer that is closer to the anode is a "hole-injecting layer" and the other layer is a "hole-transporting layer." In particular, thin films having not only an ability to receive holes from the anode but also an excellent ability to inject holes into a hole-transporting layer and a light-emitting layer may be used as, respectively, a hole-injecting layer and a hole-injecting-and-transporting layer.

In addition, "electron-injecting layer," "electron-transporting layer" and "electron-injecting-and-transporting layer" refer to layers which are formed between the light-emitting layer and the cathode and which have the function of transporting electrons from the cathode to the light-emitting layer. When only one layer of electron-transporting material is provided between the light-emitting layer and the cathode, this is an "electron-injecting-and-transporting layer"; when two or more layers of electron-transporting material are provided between the light-emitting layer and the cathode, the layer that is closer to the cathode is an "electron-injecting layer" and the other layer is an "electron-transporting layer."

The "light-emitting layer" is an organic layer having a light-emitting function. When a doping system is used, this layer includes a host material and a dopant material. The function of the host material is primarily to promote the recombination of electrons and holes and to confine the resulting excitons within the emissive layer. The function of the dopant material is to cause the excitons obtained by recombination to efficiently luminesce. In the case of a phosphorescent device, the host material functions primarily to confine within the light-emitting layer the excitons generated by the dopant.

The materials and method employed to fabricate an organic EL device using the charge-transporting thin film-forming varnish of the invention are exemplified by, but not limited to, those described below.

The electrode substrate to be used is preferably cleaned beforehand by liquid washing with, for example, a cleaning agent, alcohol or pure water. When the substrate is an anode substrate, it is preferably subjected to surface treatment such as UV/ozone treatment or oxygen-plasma treatment just prior to use. However, surface treatment need not be carried out in cases where the anode material is composed primarily of organic substances.

An example of a method for producing the organic EL device of the invention in which a thin-film obtained from the charge-transporting thin film-forming varnish of the invention serves as a hole-injecting layer is described below.

Using the aforementioned method, a hole-injecting layer is formed on an electrode by applying the charge-transporting thin film-forming varnish of the invention onto an anode substrate, and baking the applied varnish. A hole-transporting layer, light-emitting layer, electron-transporting layer, electron-injecting layer and cathode are then provided in this order on the hole-injecting layer. The hole-transporting layer, light-emitting layer, electron-transporting layer and electron-injecting layer may be formed by either a vapor deposition process or a coating process (wet process), depending on the properties of the material to be used.

Illustrative examples of anode materials include transparent electrodes such as indium-tin oxide (ITO) and indium-zinc oxide (IZO), and metal anodes made of a metal such as aluminum or an alloy of such a metal. An anode material on which planarizing treatment has been carried out is preferred. Use can also be made of polythiophene derivatives and polyaniline derivatives having high charge transportability.

Examples of other metals making up the metal anode include, but are not limited to, scandium, titanium, vanadium, chromium, manganese, iron, cobalt, nickel, copper, zinc, gallium, yttrium, zirconium, niobium, molybdenum, ruthenium, rhodium, palladium, cadmium, indium, scandium, lanthanum, cerium, praseodymium, neodymium, promethium, samarium, europium, gadolinium, terbium, dysprosium, holmium, erbium, thulium, ytterbium, hafnium, thallium, tungsten, rhenium, osmium, iridium, platinum, gold, titanium, lead, bismuth, and alloys thereof.

Specific examples of hole-transporting layer-forming materials include the following hole-transporting low-molecular-weight materials: triarylamines such as (triphenylamine) dimer derivatives, [(triphenylamine) dimer] spirodimer, N,N'-bis(naphthalen-1-yl)-N,N'-bis(phenyl)benzidine (α-NPD), N,N'-bis(naphthalen-2-yl)-N,N'-bis(phenyl)benzidine, N,N'-bis(3-methylphenyl)-N,N'-bis(phenyl)benzidine, N,N'-bis(3-methylphenyl)-N,N'-bis(phenyl)-9,9-spirobifluorene, N,N'-bis(naphthalen-1-yl)-N,N'-bis(phenyl)-9,9-spirobifluorene, N,N'-bis(3-methylphenyl)-N,N'-bis(phenyl)-9,9-dimethylfluorene, N,N'-bis(naphthalen-1-yl)-N,N'-bis(phenyl)-9,9-dimethylfluorene, N,N'-bis(3-methylphenyl)-N,N'-bis(phenyl)-9,9-diphenylfluorene, N,N'-bis(naphthalen-1-yl)-N,N'-bis(phenyl)-9,9-diphenylfluorene, N,N'-bis(naphthalen-1-yl)-N,N'-bis(phenyl)-2,2'-dimethylbenzidine, 2,2',7,7'-tetrakis(N,N-diphenylamino)-9,9-spirobifluorene, 9,9-bis[4-(N,N-bis-biphenyl-4-ylamino)phenyl]-9H-fluorene, 9,9-bis[4-(N,N-bis-naphthalen-2-ylamino)phenyl]-9H-fluorene, 9,9-bis[4-(N-naphthalen-1-yl-N-phenylamino)phenyl]-9H-fluorene, 2,2',7,7'-tetrakis[N-naphthalenyl(phenyl)amino]-9,9-spirobifluorene, N,N'-bis(phenanthren-9-yl)-N,N'-bis(phenyl)benzidine, 2,2'-bis[N,N-bis(biphenyl-4-yl)amino]-9,9-spirobifluorene, 2,2'-bis(N,N-diphenylamino)-9,9-spirobifluorene, di[4-(N,N-di(p-tolyl)amino)phenyl]cyclohexane, 2,2',7,7'-tetra(N,N-di(p-tolyl))amino-9,9-spirobifluorene, N,N,N',N'-tetra-naphthalen-2-yl-benzidine, N,N,N',N'-tetra(3-methylphenyl)-3,3'-dimethylbenzidine, N,N'-di(naphthalenyl)-N,N'-di(naphthalen-2-yl)benzidine, N,N,N',N'-tetra(naphthalenyl)benzidine, N,N'-di(naphthalen-2-yl)-N,N'-diphenylbenzidine-1-4-diamine, $N^1,N^4$-diphenyl-$N^1,N^4$-di(m-tolyl)benzene-1,4-diamine, $N^2,N^2,N^6,N^6$-tetraphenylnaphthalene-2,6-diamine, tris(4-(quinolin-8-yl)phenyl)amine, 2,2'-bis(3-(N,N-di(p-tolyl)amino)phenyl)biphenyl, 4,4',4''-tris[3-methylphenyl(phenyl)amino]triphenylamine (m-MTDATA) and 4,4',4''-tris[1-naphthyl(phenyl)amino]triphenylamine (1-TNATA); and oligothiophenes such as 5,5''-bis-{4-[bis(4-methylphenyl)amino]phenyl}-2,2':5',2''-terthiophene (BMA-3T).

Specific examples of light-emitting layer-forming materials include tris(8-quinolinolate) aluminum(III) ($Alq_3$), bis(8-quinolinolate) zinc(II) ($Znq_2$), bis(2-methyl-8-quinolinolate)-4-(p-phenylphenolate) aluminum(III) (BAlq), 4,4'-bis(2,2-diphenylvinyl)biphenyl, 9,10-di(naphthalen-2-yl)anthracene, 2-t-butyl-9,10-di(naphthalen-2-yl)anthracene, 2,7-bis[9,9-di(4-methylphenyl)-fluoren-2-yl]-9,9-di(4-methylphenyl)fluorene, 2-methyl-9,10-bis(naphthalen-2-yl)

anthracene, 2-(9,9-spirobifluoren-2-yl)-9,9-spirobifluorene, 2,7-bis(9,9-spirobifluoren-2-yl)-9,9-spirobifluorene, 2-[9,9-di(4-methylphenyl)-fluoren-2-yl]-9,9-di(4-methylphenyl)fluorene, 2,2'-dipyrenyl-9,9-spirobifluorene, 1,3,5-tris(pyren-1-yl)benzene, 9,9-bis[4-(pyrenyl)phenyl]-9H-fluorene, 2,2'-bi(9,10-diphenylanthracene), 2,7-dipyrenyl-9,9-spirobifluorene, 1,4-di(pyren-1-yl)benzene, 1,3-di(pyren-1-yl)benzene, 6,13-di(biphenyl-4-yl)pentacene, 3,9-di(naphthalen-2-yl)perylene, 3,10-di(naphthalen-2-yl)perylene, tris[4-(pyrenyl)-phenyl]amine, 10,10'-di(biphenyl-4-yl)-9,9'-bianthracene, N,N'-di(naphthalen-1-yl)-N,N'-diphenyl[1,1':4',1":4",1'''-quaterphenyl]-4,4'''-diamine, 4,4'-di[10-(naphthalen-1-yl)anthracen-9-yl]biphenyl, dibenzo{[f,f']-4,4',7,7'-tetraphenyl}diindeno[1,2,3-cd:1',2',3'-lm]perylene, 1-(7-(9,9'-bianthracen-10-yl)-9,9-dimethyl-9H-fluoren-2-yl)pyrene, 1-(7-(9,9'-bianthracen-10-yl)-9,9-dihexyl-9H-fluoren-2-yl)pyrene, 1,3-bis(carbazol-9-yl)benzene, 1,3,5-tris(carbazol-9-yl)benzene, 4,4',4"-tris(carbazol-9-yl)triphenylamine, 4,4'-bis(carbazol-9-yl)biphenyl (CBP), 4,4'-bis(carbazol-9-yl)-2,2'-dimethylbiphenyl, 2,7-bis(carbazol-9-yl)-9,9-dimethylfluorene, 2,2',7,7'-tetrakis(carbazol-9-yl)-9,9-spirobifluorene, 2,7-bis(carbazol-9-yl)-9,9-di(p-tolyl)fluorene, 9,9-bis[4-(carbazol-9-yl)-phenyl]fluorene, 2,7-bis(carbazol-9-yl)-9,9-spirobifluorene, 1,4-bis(triphenylsilyl)benzene, 1,3-bis(triphenylsilyl)benzene, bis(4-N,N-diethylamino-2-methylphenyl)-4-methylphenylmethane, 2,7-bis(carbazol-9-yl)-9,9-dioctylfluorene, 4,4"-di(triphenylsilyl)-p-terphenyl, 4,4'-di(triphenylsilyl)biphenyl, 9-(4-t-butylphenyl)-3,6-bis(triphenylsilyl)-9H-carbazole, 9-(4-t-butylphenyl)-3,6-ditrityl-9H-carbazole, 9-(4-t-butylphenyl)-3,6-bis(9-(4-methoxyphenyl)-9H-fluoren-9-yl)-9H-carbazole, 2,6-bis(3-(9H-carbazol-9-yl)phenyl)pyridine, triphenyl(4-(9-phenyl-9H-fluoren-9-yl)phenyl)silane, 9,9-dimethyl-N,N-diphenyl-7-(4-(1-phenyl-1H-benzo[d]imidazol-2-yl)phenyl-9H-fluoren-2-amine, 3,5-bis(3-(9H-carbazol-9-yl)phenyl)pyridine, 9,9-spirobifluoren-2-yl-diphenyl-phosphine oxide, 9,9'-(5-triphenylsilyl)-1,3-phenylene)bis(9H-carbazole), 3-(2,7-bis(diphenylphosphoryl)-9-phenyl-9H-fluoren-9-yl)-9-phenyl-9H-carbazole, 4,4,8,8,12,12-hexa(p-tolyl)-4H-8H-12H-12C-azadibenzo[cd,mn]pyrene, 4,7-di(9H-carbazol-9-yl)-1,10-phenanthroline, 2,2'-bis(4-(carbazol-9-yl)phenyl)biphenyl, 2,8-bis(diphenylphosphoryl)dibenzo[b,d]thiophene, bis(2-methylphenyl)diphenylsilane, bis[3,5-di(9H-carbazol-9-yl)phenyl]diphenylsilane, 3,6-bis(carbazol-9-yl)-9-(2-ethylhexyl)-9H-carbazole, 3-(diphenylphosphoryl)-9-(4-(diphenylphosphoryl)phenyl)-9H-carbazole and 3,6-bis[(3,5-diphenyl)phenyl]-9-phenylcarbazole.

A light-emitting layer may be formed by co-vapor deposition of any of these materials with a light-emitting dopant.

Specific examples of light-emitting dopants include 3-(2-benzothiazolyl)-7-(diethylamino)coumarin, 2,3,6,7-tetrahydro-1,1,7,7-tetramethyl-1H,5H,11H-10-(2-benzothiazolyl)quinolidino-[9,9a,1gh]coumarin, quinacridone, N,N'-dimethyl-quinacridone, tris(2-phenylpyridine) iridium(III) (Ir(ppy)$_3$), bis(2-phenylpyridine)(acetylacetonate) iridium (III) (Ir(ppy)$_2$(acac)), tris[2-(p-tolyl)pyridine) iridium(III) (Ir(mppy)$_3$), 9,10-bis[N,N-di(p-tolyl)amino]anthracene, 9,10-bis[phenyl(m-tolyl)amino]anthracene, bis[2-(2-hydroxyphenyl)benzothiazolate] zinc(II), $N^{10},N^{10},N^{10},N^{10}$-tetra(p-tolyl)-9,9'-bianthracene-10,10'-diamine, $N^{10},N^{10},N^{10},N^{10}$-tetraphenyl-9,9'-bianthracene-10,10'-diamine, $N^{10},N^{10}$-diphenyl-$N^{10},N^{10}$-dinaphthalenyl-9,9'-bianthracene-10,10'-diamine, 4,4'-bis(9-ethyl-3-carbazovinylene)-1,1'-biphenyl, perylene, 2,5,8,11-tetra-t-butylperylene, 1,4-bis[2-(3-N-ethylcarbazolyl)vinyl]benzene, 4,4'-bis[4-(di-p-tolylamino)styryl]biphenyl, 4-(di-p-tolylamino)-4'-[(di-p-tolylamino)styryl]stilbene, bis[3,5-difluoro-2-(2-pyridyl)phenyl-(2-carboxypyridyl)] iridium(III), 4,4'-bis[4-(diphenylamino)styryl]biphenyl, bis(2,4-difluorophenylpyridinato)tetrakis(1-pyrazolyl)borate iridium(III), N,N'-bis(naphthalen-2-yl)-N,N'-bis(phenyl)-tris(9,9-dimethylfluorenylene), 2,7-bis{2-[phenyl(m-tolyl)amino]-9,9-dimethylfluoren-7-yl}-9,9-dimethylfluorene, N-(4-((E)-2-(6((E)-4-(diphenylamino)styryl)naphthalen-2-yl)vinyl)phenyl)-N-phenylbenzenamine, fac-iridium(III) tris(1-phenyl-3-methylbenzimidazolin-2-ylidene-C,C$^2$), mer-iridium(III) tris(1-phenyl-3-methylbenzimidazolin-2-ylidene-C,C$^2$), 2,7-bis[4-(diphenylamino)styryl]-9,9-spirobifluorene, 6-methyl-2-(4-(9-(4-(6-methylbenzo[d]thiazol-2-yl)phenyl)anthracen-10-yl)phenyl)-benzo[d]thiazole, 1,4-di[4-(N,N-diphenyl)amino]styrylbenzene, 1,4-bis(4-(9H-carbazol-9-yl)styryl)benzene, (E)-6-(4-(diphenylamino)styryl)-N,N-diphenylnaphthalen-2-amine, bis(2,4-difluorophenylpyridinato)(5-(pyridin-2-yl)-1H-tetrazolate) iridium(III), bis(3-trifluoromethyl-5-(2-pyridyl)pyrazole)((2,4-difluorobenzyl)diphenylphosphinate) iridium(III), bis(3-trifluoromethyl-5-(2-pyridyl)pyrazolate)(benzyldiphenylphosphinate) iridium(III), bis(1-(2,4-difluorobenzyl)-3-methylbenzimidazolium)(3-(trifluoromethyl)-5-(2-pyridyl)-1,2,4-triazolate) iridium(III), bis(3-trifluoromethyl-5-(2-pyridyl)pyrazolate)(4',6'-difluorophenylpyridinate) iridium (III), bis(4',6'-difluorophenylpyridinato)(3,5-bis(trifluoromethyl)-2-(2'-pyridyl)pyrrolate) iridium(III), bis(4',6'-difluorophenylpyridinato)(3-(trifluoromethyl)-5-(2-pyridyl)-1,2,4-triazolate) iridium (III), (Z)-6-mesityl-N-(6-mesitylquinolin-2(1H)-ylidene)quinoline-2-amine-BF$_2$, (E)-2-(2-(4-(dimethylamino)styryl)-6-methyl-4H-pyran-4-ylidene)malononitrile, 4-(dicyanomethylene)-2-methyl-6-julolidyl-9-enyl-4-H-pyran, 4-(dicyanomethylene)-2-methyl-6-(1,1,7,7-tetramethyljulolidyl-9-enyl)-4H-pyran, 4-(dicyanomethylene)-2-t-butyl-6-(1,1,7,7-tetramethyljulolidin-4-ylvinyl)-4H-pyran, tris(dibenzoylmethane)phenanthroline europium(III), 5,6,11,12-tetraphenylnaphthacene, bis(2-benzo[b]thiophen-2-yl-pyridine)(acetylacetonate) iridium(III), tris(1-phenylisoquinoline) iridium(III), bis(1-phenylisoquinoline)(acetylacetonate) iridium(III), bis[1-(9,9-dimethyl-9H-fluoren-2-yl)isoquinoline](acetylacetonate) iridium(III), bis[2-(9,9-dimethyl-9H-fluoren-2-yl)quinoline](acetylacetonate) iridium(III), tris[4,4'-di-t-butyl-(2,2')-bipyridine] ruthenium(III) bis(hexafluorophosphate), tris(2-phenylquinoline) iridium(III), bis(2-phenylquinoline)(acetylacetonate) iridium(III), 2,8-di-t-butyl-5,11-bis(4-t-butylphenyl)-6,12-diphenyltetracene, bis(2-phenylbenzothiazolate)(acetylacetonate) iridium(III), platinum 5,10,15,20-tetraphenyltetrabenzoporphyrin, osmium(II) bis(3-trifluoromethyl-5-(2-pyridine)pyrazolate)dimethylphenylphosphine, osmium(II) bis(3-trifluoromethyl)-5-(4-t-butylpy 1,2,4-triazolate)diphenylmethyl-phosphine, osmium(II) bis(3-(trifluoromethyl)-5-(2-pyridyl)-1,2,4-triazole)dimethylphenylphosphine, osmium(II) bis(3-(trifluoromethyl)-5-(4-t-butylpyridyl)-1,2,4-triazolate)dimethylphenylphosphine, bis[2-(4-n-hexylphenyl)quinoline](acetylacetonate) iridium(III), tris[2-(4-n-hexylphenyl)quinoline] iridium(III), tris[2-phenyl-4-methylquinoline] iridium(III), bis(2-phenylquinoline)(2-(3-methylphenyl)pyridinate) iridium(III), bis(2-(9,9-diethyl-fluoren-2-yl)-1-phenyl-1H-benzo[d]imidazolato)(acetylacetonate) iridium (III), bis(2-phenylpyridine)(3-(pyridin-2-yl)-2H-chromen-9-onate) iridium(III), bis(2-phenylquinoline)(2,2,6,6-tetramethylheptane-3,5-dionate) iridium(III), bis(phenylisoquinoline)(2,2,6,6-tetramethylheptane-3,5-dionate) iridium(III), iridium(III) bis(4-phenylthieno[3,2-c]

pyridinato-N,C²)acetylacetonate, (E)-2-(2-t-butyl-6-(2-(2,6, 6-trimethyl-2,4,5,6-tetrahydro-1H-pyrrolo[3,2,1-ij]quinolin-8-yl)vinyl)-4H-pyran-4-ylidene)malononitrile, bis(3-trifluoromethyl-5-(1-isoquinolyl)pyrazolate) (methyldiphenylphosphine) ruthenium, bis[(4-n-hexylphenyl)isoquinoline](acetylacetonate) iridium(III), platinum(II) octaethylporphin, bis(2-methyldibenzo[f,h]quinoxaline)(acetylacetonate) iridium(III) and tris[(4-n-hexylphenyl)isoquinoline] iridium(III).

Specific examples of electron-transporting layer-forming materials include lithium 8-hydroxyquinolinate, 2,2',2"-(1, 3,5-benzinetriyl)-tris(1-phenyl-1-H-benzimidazole), 2-(4-biphenyl)-5-(4-t-butylphenyl)-1,3,4-oxadiazole, 2,9-dimethyl-4,7-diphenyl-1,10-phenanthroline, 4,7-diphenyl-1,10-phenanthroline, bis(2-methyl-8-quinolinolate)-4-(phenylphenolato)aluminum, 1,3-bis[2-(2,2'-bipyridin-6-yl)-1,3,4-oxadiazo-5-yl]benzene, 6,6'-bis[5-(biphenyl-4-yl)-1,3,4-oxadiazo-2-yl]-2,2'-bipyridine, 3-(4-biphenyl)-4-phenyl-5-t-butylphenyl-1,2,4-triazole, 4-(naphthalen-1-yl)-3,5-diphenyl-4H-1,2,4-triazole, 2,9-bis(naphthalen-2-yl)-4, 7-diphenyl-1,10-phenanthroline, 2,7-bis[2-(2,2'-bipyridin-6-yl)-1,3,4-oxadiazo-5-yl]-9,9-dimethylfluorene, 1,3-bis[2-(4-t-butylphenyl)-1,3,4-oxadiazo-5-yl]benzene, tris(2,4,6-trimethyl-3-(pyridin-3-yl)phenyl)borane, 1-methyl-2-(4-(naphthalen-2-yl)phenyl)-1H-imidazo[d,5f][1,10] phenanthroline, 2-(naphthalen-2-yl)-4,7-diphenyl-1,10-phenanthroline, phenyldipyrenylphosphine oxide, 3,3',5,5'-tetra[(m-pyridyl)-phen-3-yl]biphenyl, 1,3,5-tris[(3-pyridyl)-phen-3-yl]benzene, 4,4'-bis(4,6-diphenyl-1,3,5-triazin-2-yl) biphenyl, 1,3-bis[3,5-di(pyridin-3-yl)phenyl]benzene, bis (10-hydroxybenzo[h]quinolinato)beryllium, diphenylbis(4-(pyridin-3-yl)phenyl)silane and 3,5-di(pyren-1-yl)pyridine.

Examples of electron-injecting layer-forming materials include lithium oxide ($Li_2O$), magnesium oxide (MgO), alumina ($Al_2O_3$), lithium fluoride (LiF), sodium fluoride (NaF), magnesium fluoride ($MgF_2$), cesium fluoride (CsF), strontium fluoride ($SrF_2$), molybdenum trioxide ($MoO_3$), aluminum, lithium acetylacetonate Li(acac), lithium acetate and lithium benzoate.

Examples of cathode materials include aluminum, magnesium-silver alloys, aluminum-lithium alloys, lithium, sodium, potassium and cesium.

In cases where the thin film obtained from the charge-transporting thin film-forming varnish of the invention is a hole-injecting layer, another example of a method of producing the organic EL device of the invention is as follows.

An organic EL device having a charge-transporting thin film formed using the charge-transporting thin film-forming varnish of the invention can be produced by, in the above-described organic EL device producing method, successively forming a hole-transporting layer and a light-emitting layer instead of carrying out vacuum evaporation operations for a hole-transporting layer, a light-emitting layer, an electron-transporting layer and an electron-injecting layer. Specifically, the charge-transporting thin film-forming varnish of the invention is applied onto an anode substrate, and a hole-injecting layer is formed by the above-described method. A hole-transporting layer and a light-emitting layer are then successively formed thereon, following which a cathode material is vapor-deposited on top, thereby giving an organic EL device.

The cathode and anode materials used here may be similar to those described above, and similar cleaning treatment and surface treatment may be carried out.

The method of forming the hole-transporting polymer layer and the light-emitting polymer layer is exemplified by a film-forming method that involves adding a solvent to a hole-transporting polymer material or a light-emitting polymer material, or to the material obtained by adding a dopant to either of these, thereby dissolving or uniformly dispersing the material, and then applying the resulting solution or dispersion onto, respectively, the hole-injecting layer or the hole-transporting polymer layer and subsequently baking the applied layer.

Examples of hole-transporting polymer materials include poly[(9,9-dihexylfluorenyl-2,7-diyl)-co-(N,N'-bis{p-butylphenyl}-1,4-diaminophenylene)], poly[(9,9-dioctylfluorenyl-2,7-diyl)-co-(N,N'-bis{p-butylphenyl}-1,1'-biphenylene-4,4-diamine)], poly[(9,9-bis{1'-penten-5'-yl}fluorenyl-2,7-diyl)-co-(N,N'-bis{p-butylphenyl}-1,4-diaminophenylene)], poly[N,N'-bis(4-butylphenyl)-N,N'-bis (phenyl)-benzidine] end-capped with polysilsesquioxane and poly[(9,9-dioctylfluorenyl-2,7-diyl)-co-(4,4'-(N-(p-butylphenyl))diphenylamine)].

Examples of light-emitting polymer materials include polyfluorene derivatives such as poly(9,9-dialkylfluorene) (PDAF), poly(phenylene vinylene) derivatives such as poly (2-methoxy-5-(2'-ethylhexoxy)-1,4-phenylene vinylene) (MEH-PPV), polythiophene derivatives such as poly(3-alkylthiophene) (PAT), and polyvinylcarbazole (PVCz).

Examples of the solvent include toluene, xylene and chloroform. Examples of the method of dissolution or uniform dispersion include stirring, stirring under applied heat, and ultrasonic dispersion.

Examples of the coating method include, but are not particularly limited to, inkjet printing, spraying, dipping, spin coating, transfer printing, roll coating and brush coating. Coating is preferably carried out in an inert gas atmosphere such as nitrogen or argon.

Examples of the baking method include methods that involve heating in an oven or on a hot plate, either within an inert gas atmosphere or in a vacuum.

An example is described below of a method for producing the organic EL device of the invention in a case where the thin film obtained from the charge-transporting thin film-forming varnish of the invention is a hole-injecting-and-transporting layer.

A hole-injecting-and-transporting layer is formed on an anode substrate, and a light-emitting layer, an electron-transporting layer, an electron-injecting layer and a cathode are provided in this order on the hole-injecting-and-transporting layer. Methods of forming the light-emitting layer, electron-transporting layer and electron-injecting layer, and specific examples of each, are exemplified in the same way as above.

The anode material, the light-emitting layer, the light-emitting dopant, the materials which form the electron-transporting layer and the electron-blocking layer, and the cathode material are exemplified in the same way as above.

A hole-blocking layer, an electron-blocking layer or the like may be optionally provided between the electrodes and any of the above layers. By way of illustration, an example of a material that forms an electron-blocking layer is tris (phenylpyrazole)iridium.

The materials which make up the anode, the cathode and the layers formed therebetween differ according to whether a device provided with a bottom emission structure or a top emission structure is to be fabricated, and so are suitably selected while taking this into account.

Typically, in a device having a bottom emission structure, a transparent anode is used on the substrate side and light is extracted from the substrate side, whereas in a device having a top emission structure, a reflective anode made of metal is used and light is extracted from a transparent electrode (cathode) in the opposite direction from the substrate. For example, with regard to the anode material, when fabricating a device having a bottom emission structure, a transparent anode of (ITO) or the like is used, and when fabricating a device having a top emission structure, a reflective anode of Al/Nd or the like is used.

To prevent deterioration in the device characteristics, the organic EL device of the invention may be sealed in the usual manner with, if necessary, a desiccant or the like.

EXAMPLES

Working Examples and Comparative Examples are given below to more concretely illustrate the invention, although the invention is not limited by these Examples. The equipment used was as follows.
(1) Substrate Cleaning: Substrate cleaning machine (reduced-pressure plasma system), from Choshu Industry Co., Ltd.
(2) Varnish Coating: MS-A100 Spin Coater, from Mikasa Co., Ltd.
(3) Film Thickness Measurement: Surfcorder ET-4000 microfigure measuring instrument, from Kosaka Laboratory, Ltd.
(4) Organic EL Device Fabrication: C-E2L1G1-N Multi-function Vapor Deposition System, from Choshu Industry Co., Ltd.
(5) Measurement of Organic EL Device Brightness: I-V-L Measurement System from Tech World, Inc.
(6) Measurement of Organic EL Device Lifetime (Measurement of Brightness Half-Life): PEL-105S Organic EL Brightness Life Evaluation System, from EHC K.K.

[1] Preparation of Charge-Transporting Thin Film-Forming Varnish

Working Example 1-1

The following were dissolved in 8 g of 1,3-dimethyl-2-imidazolidinone (DMI): 0.165 g of the arylamine derivative of formula (f) below, 0.325 g of the arylsulfonic acid of formula (b-1) below and 0.0245 g of TEMPO (Tokyo Chemical Industry Co., Ltd.). To this were added 12 g of cyclohexanol (CHA) and 4 g of propylene glycol (PG), and stirring was carried out. The resulting solution was filtered using a PTFE filter having a pore size of 0.2 µm, thereby giving a varnish. The arylamine derivative was synthesized by the method described in WO 2013/084664, and the arylsulfonic acid was synthesized by the method described in WO 2006/025342.

[Chemical Formula 55]

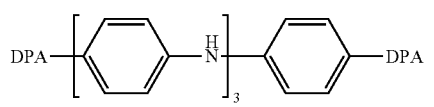

(f)

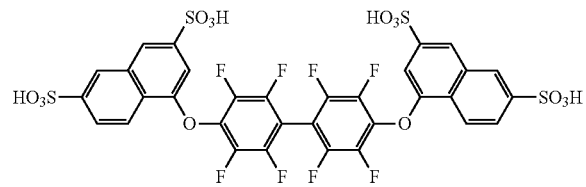

(b-1)

Here, DPA is as defined above.

Comparative Example 1-1A

The following were dissolved in 8 g of DMI: 0.165 g of the arylamine derivative of formula (f) and 0.325 g of the arylsulfonic acid of formula (b-1). To this were added 12 g of CHA and 4 g of PG, and stirring was carried out. The resulting solution was filtered using a PTFE filter having a pore size of 0.2 m, thereby giving a varnish.

Comparative Example 1-1B

Aside from using, instead of TEMPO, 0.0245 g of 2-aza-adamantane-N-oxyl (AZADO), which is an organic oxidizing agent widely used in the same way as TEMPO, a varnish was obtained by the same method as in Working Example 1. The AZADO was synthesized while referring to WO 2010/123115, WO 2006/001387, and J. Am. Chem. Soc., 2006, 128(26), pp. 8412-8413 and the supporting information therefor.

Working Example 2-1

The following were dissolved in 3.3 g of DMI: 0.147 g of the arylamine derivative of formula (J11-79) below, 0.162 g of the arylsulfonic acid of formula (b-1), and 0.0186 g of TEMPO (Tokyo Chemical Industry Co., Ltd.). To this were added 4 g of 2,3-butanediol (2,3-BD) and 2.7 g of dipropylene glycol monomethyl ether (DPM), and stirring was carried out. The resulting solution was filtered using a PTFE filter having a pore size of 0.2 µm, thereby giving a varnish. The arylamine derivative was synthesized by the method described in WO 2015/050253.

[Chemical Formula 56]

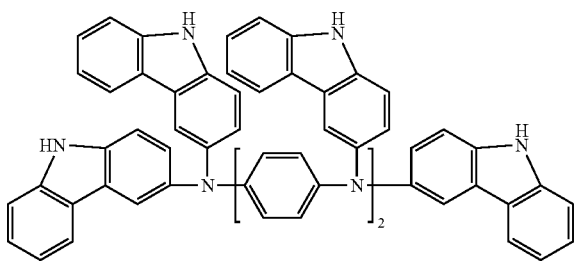

(J11-79)

Comparative Example 2-1

The following were dissolved in 3.3 g of DMI: 0.147 g of the arylamine derivative of formula (J11-79) and 0.162 g of the arylsulfonic acid of formula (b-1). To this were added 4 g of 2,3-BD and 2.7 g of DPM, and stirring was carried out. The resulting solution was filtered using a PTFE filter having a pore size of 0.2 µm, thereby giving a varnish.

Working Example 3-1

The following were dissolved in 3.3 g of DMI: 0.084 g of the arylamine derivative of formula (f), 0.013 g of the fluorine atom-containing oligoaniline derivative of formula (E-138) below, 0.208 g of the arylsulfonic acid of formula (b-1) and 0.0216 g of TEMPO (Tokyo Chemical Industry Co., Ltd.). To this were added 4 g of 2,3-BD and 2.7 g of DPM, and stirring was carried out. The resulting solution was filtered using a PTFE filter having a pore size of 0.2 μm, thereby giving a varnish.

[Chemical Formula 57]

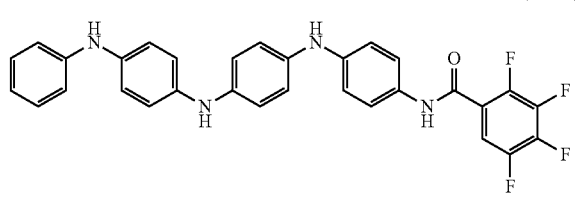

(E-138)

Comparative Example 3-1

The following were dissolved in 3.3 g of DMI: 0.084 g of the arylamine derivative of formula (f), 0.013 g of the fluorine atom-containing oligoaniline derivative of formula (E-138) and 0.208 g of the arylsulfonic acid of formula (b-1). To this were added 4 g of 2,3-BD and 2.7 g of DPM, and stirring was carried out. The resulting solution was filtered using a PTFE filter having a pore size of 0.2 μm, thereby giving a varnish.

The fluorine atom-containing oligoaniline derivative of formula (E-138) was synthesized by the following method.

[Chemical Formula 54]

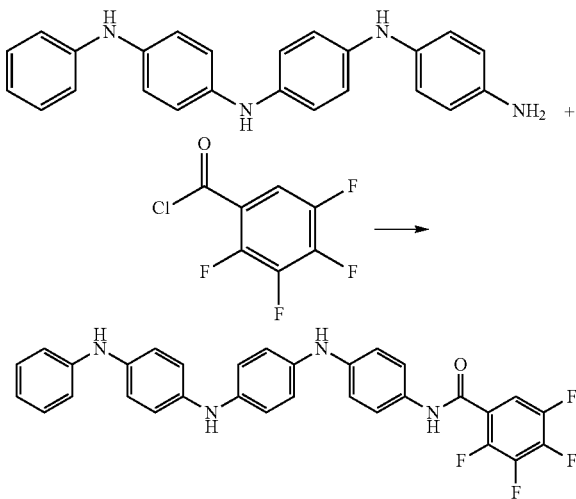

A flask was charged with 3.0 g of tetraaniline, 1.91 g of 2,3,4,5-tetrafluorobenzoyl chloride and 60 g of N,N-dimethylacetamide, following which the interior of the flask was flushed with nitrogen and the contents were stirred for one hour at room temperature.

Following the completion of stirring, 30 mL of an aqueous solution of sodium hydroxide (5 mol/L) was added and the contents were additionally stirred for 30 minutes. Ethyl acetate and saturated saline water were mixed into the reaction mixture, and liquid-liquid extraction to pH 7 was carried out three times. The resulting organic layer was dried over sodium sulfate, following which vacuum concentration was carried out. Next, 15 mL of THF was added to the liquid concentrate. This solution was added dropwise to 210 mL of isopropyl alcohol, and the resulting slurry was stirred at room temperature for 30 minutes.

Last of all, the slurry solution was filtered, and the filtrate was dried, thereby giving the target fluorine atom-containing oligoaniline derivative (yield, 2.94 g). The results of $^1$H-NMR measurement are shown below.

$^1$H-NMR (400 MHz, DMSO-d6) δ [ppm]:
10.35 (s, 1H), 7.83 (s, 1H), 7.79-7.68 (m, 3H), 7.49 (d, J=8.0 Hz, 2H), 7.15 (t, J=8.0 Hz, 2H), 7.01-6.90 (m, 12H), 6.68 (t, J=8.0 Hz, 1H)

[2] Fabrication of Organic EL Devices and Evaluation of Device Characteristics

Working Example 1-2

The varnish obtained in Working Example 1-1 was coated onto an ITO substrate using a spin coater, subsequently dried for 1 minute at 80° C., and then baked for 15 minutes at 180° C. in open air, thereby forming a uniform 30 nm thin film on an ITO substrate. A glass substrate with dimensions of 25 mm×25 mm×0.7 mm (t) and having indium-tin oxide (ITO) patterned on the surface to a film thickness of 150 nm was used as the ITO substrate. Prior to use, impurities on the surface were removed with an $O_2$ plasma cleaning system (150 W, 30 seconds).

Using a vapor deposition system (degree of vacuum, 1.0×10$^{-5}$ Pa), a 30 nm film of α-NPD was then formed at a deposition rate of 0.2 nm/s on the ITO substrate where the thin film was formed. CBP and Ir(PPy)$_3$ were subsequently co-deposited. Co-deposition was carried out to a thickness of 40 nm while controlling the deposition rate so that the Ir(PPy)$_3$ concentration becomes 6%. Next, thin films of BAlq, lithium fluoride and aluminum were successively deposited, giving an organic EL device. At this time, vapor deposition was carried out at a rate of 0.2 nm/s for BAlq and aluminum, and at a rate of 0.02 nm/s for lithium fluoride. The film thicknesses were set to, respectively, 20 nm, 0.5 nm and 100 nm.

To prevent the device characteristics from deteriorating due to the influence of oxygen, moisture and the like in air, the organic EL device was sealed with sealing substrates, following which the characteristics were evaluated. Sealing was carried out by the following procedure. The organic EL device was placed between sealing substrates in a nitrogen atmosphere having an oxygen concentration of not more than 2 ppm and a dew point of not more than −85° C., and the sealing substrates were laminated together using an adhesive (XNR5516Z-B1, from Nagase ChemteX Corporation). At this time, a desiccant (HD-0'/1010W-40, from Dynic Corporation) was placed, together with the organic EL device, within the sealing substrates. The laminated sealing substrates were irradiated with UV light (wavelength, 365 nm; dosage, 6,000 mJ/cm$^2$) and then annealed at 80° C. for 1 hour to cure the adhesive.

Comparative Examples 1-2A, 1-2B

Aside from using the varnishes obtained in Comparative Example 1-1A or Comparative Example 1-1B instead of the varnish obtained in Working Example 1-1, organic EL devices were fabricated in the same way as in Working Example 1-2.

The characteristics of the fabricated devices were evaluated. Table 22 shows the driving voltage, current density and current efficiency when the devices were made to luminesce at a brightness of 2,000 cd/m$^2$. Table 23 shows the current density, brightness and current efficiency when the devices were driven at 9V. Table 24 shows the half-life of the device brightness (initial brightness, 5,000 cd/m²).

TABLE 22

|  | Driving voltage (V) | Current density (mA/cm²) | Current efficiency (cd/A) |
| --- | --- | --- | --- |
| Working Example 1-2 | 8.73 | 6.7 | 30.1 |
| Comparative Example 1-2A | 8.99 | 6.8 | 29.2 |
| Comparative Example 1-2B | 9.37 | 7.2 | 27.8 |

TABLE 23

|  | Current density (mA/cm²) | Brightness (cd/m²) | Current efficiency (cd/A) |
| --- | --- | --- | --- |
| Working Example 1-2 | 8.3 | 2,480 | 29.9 |
| Comparative Example 1-2A | 6.0 | 1,730 | 28.5 |
| Comparative Example 1-2B | 5.5 | 1,540 | 27.9 |

TABLE 24

|  | Brightness half-life (hours) |
| --- | --- |
| Working Example 1-2 | 340 |
| Comparative Example 1-2B | 250 |

As shown in Tables 22 and 23, compared with the device having a thin film obtained from a varnish not containing TEMPO (Comparative Example 1-2A) and the device having a thin film obtained from a varnish containing AZADO (Comparative Example 1-2B), the device having a thin film obtained from a TEMPO-containing varnish had a lower driving voltage when made to luminesce at the same brightness, and the brightness when made to luminesce at the same driving voltage was improved. Moreover, as shown in Table 24, the device having a thin film obtained from a TEMPO-containing varnish also had an excellent durability.

Working Example 2-2

The varnish obtained in Working Example 2-1 was coated onto an ITO substrate using a spin coater, subsequently dried for 1 minute at 80° C., and then baked for 15 minutes at 180° C. in open air, thereby forming a uniform 65 nm thin film on an ITO substrate. A glass substrate with dimensions of 25 mm×25 mm×0.7 mm (t) and having indium-tin oxide (ITO) patterned on the surface to a film thickness of 150 nm was used as the ITO substrate. Prior to use, impurities on the surface were removed with an $O_2$ plasma cleaning system (150 W, 30 seconds).

Using a vapor deposition system (degree of vacuum, $1.0×10^{-5}$ Pa), a 30 nm film of α-NPD was then formed at a deposition rate of 0.2 nm/s on the ITO substrate where the thin film was formed. CBP and $Ir(PPy)_3$ were subsequently co-deposited. Co-deposition was carried out to a thickness of 40 nm while controlling the deposition rate so that the $Ir(PPy)_3$ concentration becomes 6%. Next, thin films of Balq, lithium fluoride and aluminum were successively deposited, giving an organic EL device. At this time, vapor deposition was carried out at a rate of 0.2 nm/s for Balq and aluminum, and at a rate of 0.02 nm/s for lithium fluoride. The film thicknesses were set to, respectively, 20 nm, 0.5 nm and 100 nm.

To prevent the device characteristics from deteriorating due to the influence of oxygen, moisture and the like in air, the organic EL device was sealed with sealing substrates, following which the characteristics were evaluated. Sealing was carried out by the same procedure as in Working Example 1-2.

Comparative Example 2-2

Aside from using the varnish obtained in Comparative Example 2-1 instead of the varnish obtained in Working Example 2-1, an organic EL device was fabricated in the same way as in Working Example 2-2.

The characteristics of the fabricated devices were evaluated. Table 25 shows the driving voltage, current density and current efficiency when the devices were made to luminesce at a brightness of 5,000 cd/m². Table 26 shows the current density, brightness and current efficiency when the devices were driven at 9V. Table 27 shows the half-life of the device brightness (initial brightness, 5,000 cd/m²).

TABLE 25

|  | Driving voltage (V) | Current density (mA/cm²) | Current efficiency (cd/A) |
| --- | --- | --- | --- |
| Working Example 2-2 | 9.54 | 17.1 | 29.3 |
| Comparative Example 2-2 | 9.60 | 17.4 | 28.7 |

TABLE 26

|  | Current density (mA/cm²) | Brightness (cd/m²) | Current efficiency (cd/A) |
| --- | --- | --- | --- |
| Working Example 2-2 | 10.7 | 3,190 | 29.8 |
| Comparative Example 2-2 | 10.3 | 3,030 | 29.3 |

TABLE 27

|  | Brightness half-life (hours) |
| --- | --- |
| Working Example 2-2 | 410 |
| Comparative Example 2-2 | 350 |

As shown in Tables 25 and 26, compared with the device having a thin film obtained from a varnish not containing TEMPO, the device having a thin film obtained from a TEMPO-containing varnish had a lower driving voltage when made to luminesce at the same brightness, and the brightness when made to luminesce at the same driving voltage was improved. Moreover, as shown in Table 27, the device having a thin film obtained from a TEMPO-containing varnish also had an excellent durability.

Working Example 3-2

Aside from using the varnish obtained in Working Example 3-1 instead of the varnish obtained in Working Example 2-1, an organic EL device was fabricated in the same way as in Working Example 2-2.

Comparative Example 3-2

Aside from using the varnish obtained in Comparative Example 3-1 instead of the varnish obtained in Working Example 2-1, an organic EL device was fabricated in the same way as in Working Example 2-2.

The characteristics of the fabricated devices were evaluated. Table 28 shows the driving voltage, current density and current efficiency when the devices were made to luminesce at a brightness of 5,000 cd/m². Table 29 shows the current density, brightness and current efficiency when the devices were driven at 9V. Table 30 shows the half-life of the device brightness (initial brightness, 5,000 cd/m²).

TABLE 28

|  | Driving voltage (V) | Current density (mA/cm²) | Current efficiency (cd/A) |
|---|---|---|---|
| Working Example 3-2 | 9.57 | 17.1 | 29.3 |
| Comparative Example 3-2 | 9.59 | 17.4 | 28.7 |

TABLE 29

|  | Current density (mA/cm²) | Brightness (cd/m²) | Current efficiency (cd/A) |
|---|---|---|---|
| Working Example 3-2 | 10.7 | 3,160 | 29.7 |
| Comparative Example 3-2 | 11.0 | 3,210 | 29.2 |

TABLE 30

|  | Brightness half-life (hours) |
|---|---|
| Working Example 3-2 | 240 |
| Comparative Example 3-2 | 130 |

As shown in Tables 28 to 30, even when a fluorine atom-containing oligoaniline derivative was included, the device having the thin film obtained from the varnish of the invention exhibited good EL characteristics and also had an excellent durability.

The invention claimed is:

1. A charge-transporting thin film-forming varnish comprising a 2,2,6,6-tetraalkylpiperidine-N-oxyl derivative of formula (T1), a charge-transporting substance and an organic solvent

[Chemical Formula 1]

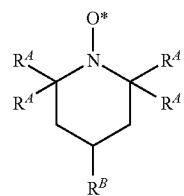

(T1)

(wherein each $R^A$ is independently an alkyl group of 1 to 20 carbon atoms; and $R^B$ is a hydrogen atom, a hydroxyl group, an amino group, a carboxyl group, a cyano group, an oxo group, an isocyanato group, an alkoxy group of 1 to 20 carbon atoms, an alkylcarbonyloxy group of 2 to 20 carbon atoms, an arylcarbonyloxy group of 7 to 20 carbon atoms, an alkylcarbonylamino group of 2 to 20 carbon atoms or an arylcarbonylamino group of 7 to 20 carbon atoms), wherein the charge-transporting thin film-forming varnish further comprises a dopant.

2. The charge-transporting thin film-forming varnish of claim 1, wherein the 2,2,6,6-tetraalkylpiperidine-N-oxyl derivative is 2,2,6,6-tetramethylpiperidine-N-oxyl.

3. The charge-transporting thin film-forming varnish of claim 1 or 2, wherein the charge-transporting substance comprises a charge-transporting compound having a molecular weight of from 200 to 9,500.

4. The charge-transporting thin film-forming varnish of claim 1, wherein the charge-transporting substance comprises at least one compound selected from the group consisting of arylamine derivatives and thiophene derivatives having a molecular weight of from 200 to 9,500.

5. The charge-transporting thin film-forming varnish of claim 1, further comprising a fluorine atom-containing oligoaniline derivative.

6. The charge-transporting thin film-forming varnish of claim 5, wherein the fluorine atom-containing oligoaniline derivative is a compound of formula (6)

[Chemical Formula 2]

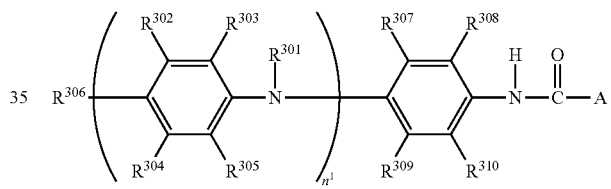

(6)

(wherein $R^{301}$ is a hydrogen atom, an alkyl group of 1 to 20 carbon atoms which may be substituted with Z wherein Z is a hydrogen atom, a nitro group, a cyano group, an aldehyde group, a hydroxyl group, a thiol group, a sulfonic acid group or a carboxyl group, an aryl group of 6 to 20 carbon atoms which may be substituted with Z' or a heteroaryl group of 2 to 20 carbon atoms which may be substituted with Z' wherein Z' is a halogen atom, a nitro group, a cyano group, an aldehyde group, a hydroxyl group, a thiol group, a sulfonic acid group or a carboxyl group;

$R^{302}$ to $R^{310}$ are each independently a hydrogen atom, a halogen atom, a nitro group, a cyano group, or an alkyl group of 1 to 20 carbon atoms, alkenyl group of 2 to 20 carbon atoms, alkynyl group of 2 to 20 carbon atoms, aryl group of 6 to 20 carbon atoms or heteroaryl group of 2 to 20 carbon atoms which may be substituted with a halogen atom;

A is a fluoroalkyl group of 1 to 20 carbon atoms, fluorocycloalkyl group of 3 to 20 carbon atoms, fluorobicycloalkyl group of 4 to 20 carbon atoms, fluoroalkenyl group of 2 to 20 carbon atoms or fluoroalkynyl group of 2 to 20 carbon atoms which may be substituted with a cyano group, a chlorine atom, a bromine atom, an iodine atom, a nitro group or a fluoroalkoxy group of 1 to 20 carbon atoms, a fluoroaryl group of 6 to 20 carbon atoms which may be substituted with a cyano group, a chlorine atom, a bromine atom, an iodine atom, a nitro group, an alkyl group of 1 to 20 carbon atoms, a fluoroalkyl group of 1 to 20 carbon atoms or a fluoroalkoxy group of 1 to 20 carbon atoms, an aryl group of 6 to 20 carbon atoms which is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms and may be substituted with a cyano group, a halogen atom or a fluoroalkoxy group of 1 to 20 carbon atoms, a fluoroaralkyl group of 7 to 20 carbon atoms which may be substituted with a cyano group, a chlorine atom, a bromine atom, an iodine atom, a nitro group, a fluoroalkoxy group of 1 to 20 carbon atoms, a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms, or an aralkyl group of 7 to 20 carbon atoms which is substituted with a fluoroalkyl group of 1 to 20 carbon atoms, a fluorocycloalkyl group of 3 to 20 carbon atoms, a fluorobicycloalkyl group of 4 to 20 carbon atoms, a fluoroalkenyl group of 2 to 20 carbon atoms or a fluoroalkynyl group of 2 to 20 carbon atoms and may be substituted with a cyano group, a halogen atom or a fluoroalkoxy group of 1 to 20 carbon atoms; and $n^1$ is an integer from 1 to 20).

7. The charge-transporting thin film-forming varnish of claim 1, wherein the dopant comprises an arylsulfonic acid.

8. A charge-transporting thin film produced using the charge-transporting thin film-forming varnish of claim 1.

9. An organic electroluminescent device comprising the charge-transporting thin film of claim 8.

10. A method for producing a charge-transporting thin film, characterized by using the charge-transporting thin film-forming varnish of claim 1.

11. A method for manufacturing an organic electroluminescent device, characterized by using the charge-transporting thin film-forming varnish claim 1.

12. The method of claim 11, wherein the varnish is used for forming a hole injecting layer in said organic electroluminescent device.

13. A method for reducing the driving voltage of an organic electroluminescent device having a charge-transporting thin film produced using a charge-transporting thin film-forming varnish, which method is characterized by using the charge-transporting thin film-forming varnish of claim 1 as said charge-transporting thin film-forming varnish.

14. A method for increasing the brightness of an organic electroluminescent device having a charge-transporting thin film produced using a charge-transporting thin film-forming varnish, which method is characterized by using the charge-transporting thin film-forming varnish of claim 1 as said charge-transporting thin film-forming varnish.

15. A method for increasing the brightness longevity of an organic electroluminescent device having a charge-transporting thin film produced using a charge-transporting thin film-forming varnish, which method is characterized by using the charge-transporting thin film-forming varnish of claim 1 as said charge-transporting thin film-forming varnish.

16. The charge-transporting thin film-forming varnish of claim 1 wherein $R^B$ is a hydrogen atom, a hydroxyl group, an amino group, a carboxyl group, a cyano group, an oxo group, an isocyanato group, or an alkoxy group of 1 to 20 carbon atoms.

* * * * *